United States Patent
Hasskamp et al.

(10) Patent No.: US 12,487,279 B2
(45) Date of Patent: Dec. 2, 2025

(54) HOUSING WITH VERTICAL BACKSTOP

(71) Applicant: Johnstech International Corporation, Minneapolis, MN (US)

(72) Inventors: Melissa Hasskamp, Minneapolis, MN (US); David Skodje, Minneapolis, MN (US); Mike Andres, Inver Grove Heights, MN (US)

(73) Assignee: JOHNSTECH INTERNATIONAL CORPORATION, Minneapolis, MN (US)

( * ) Notice: Subject to any disclaimer, the term of this patent is extended or adjusted under 35 U.S.C. 154(b) by 296 days.

(21) Appl. No.: 18/051,627

(22) Filed: Nov. 1, 2022

(65) Prior Publication Data
US 2023/0184826 A1 Jun. 15, 2023

Related U.S. Application Data

(60) Provisional application No. 63/373,886, filed on Aug. 30, 2022, provisional application No. 63/263,485, filed on Nov. 3, 2021.

(51) Int. Cl.
*G01R 31/28* (2006.01)
*G01R 1/073* (2006.01)

(52) U.S. Cl.
CPC ..... *G01R 31/2886* (2013.01); *G01R 1/07314* (2013.01)

(58) Field of Classification Search
CPC ............ G01R 31/2886; G01R 1/07314; F01R 31/2886
See application file for complete search history.

(56) References Cited

U.S. PATENT DOCUMENTS

| | | | | |
|---|---|---|---|---|
| 5,562,492 | A | * 10/1996 | Kubo | H05K 7/1069 439/526 |
| 5,639,247 | A | 6/1997 | Johnson et al. | |
| 5,841,640 | A | * 11/1998 | Shibata | H05K 7/1023 439/70 |
| 5,947,749 | A | 9/1999 | Rathburn | |

(Continued)

FOREIGN PATENT DOCUMENTS

| CN | 111239592 A | 6/2020 |
|---|---|---|
| EM | 009197452-0001 | 11/2022 |

(Continued)

OTHER PUBLICATIONS

Grainger. Link: https://grainger.com/product/GE-Replacement-Contact-Kit-4-6AMX1?searchQuery=55-152313G009&searchBar=true&tier=Tier+6. Visited Feb. 23, 2024. GE Replacement Contact Kit, 2 pages (Year: 2024).

(Continued)

*Primary Examiner* — Paresh Patel
(74) *Attorney, Agent, or Firm* — HSML P.C.

(57) ABSTRACT

A contactor assembly for a testing system for testing integrated circuit devices includes a contact, and a housing having a contact slot. The contact is receivable in the contact slot. The contact includes a tip, a body, and a tail; and is configured to be in a free state, a preload state, and an actuated state. The housing includes a housing backstop. When the contact is in the preload state, a contact backstop of the contact is biased against the housing backstop.

20 Claims, 35 Drawing Sheets

(56) References Cited

U.S. PATENT DOCUMENTS

| | | | |
|---|---|---|---|
| 6,244,874 B1 * | 6/2001 | Tan | H01R 12/714 439/70 |
| 6,854,981 B2 | 2/2005 | Nelson | |
| 7,059,866 B2 | 6/2006 | Gilk | |
| 7,445,465 B2 * | 11/2008 | Lopez | G01R 1/0466 439/72 |
| D589,902 S | 4/2009 | Peng | |
| D590,350 S | 4/2009 | Zhang | |
| D604,701 S | 11/2009 | Hemmi | |
| 7,632,105 B2 * | 12/2009 | Yan | H01R 13/428 439/862 |
| 7,632,106 B2 | 12/2009 | Nakamura | |
| 7,639,026 B2 | 12/2009 | Shell et al. | |
| D614,581 S | 4/2010 | Hemmi | |
| 7,771,220 B2 | 8/2010 | Osato et al. | |
| 7,819,672 B2 | 10/2010 | Osato | |
| 7,914,295 B2 | 3/2011 | Nakamura et al. | |
| D711,836 S | 8/2014 | Johnson | |
| D719,923 S | 12/2014 | Johnson | |
| D727,269 S | 4/2015 | Johnson | |
| D749,525 S | 2/2016 | Johnson | |
| D749,526 S | 2/2016 | Johnson | |
| 9,274,141 B1 * | 3/2016 | Andres | G01R 31/2887 |
| D772,818 S | 11/2016 | Tate | |
| 10,114,039 B1 | 10/2018 | Johnson | |
| D852,756 S | 7/2019 | Huang | |
| 2004/0033705 A1 * | 2/2004 | Nelson | H01R 13/2435 439/66 |
| 2007/0032128 A1 * | 2/2007 | Lopez | G01R 1/0466 439/525 |
| 2007/0236236 A1 | 10/2007 | Shell et al. | |
| 2007/0272924 A1 | 11/2007 | Yung-Sing | |
| 2009/0053912 A1 | 2/2009 | Lopez et al. | |
| 2010/0120265 A1 | 5/2010 | Nakamura et al. | |
| 2014/0127953 A1 | 5/2014 | Foong et al. | |
| 2016/0161528 A1 | 6/2016 | Edwards et al. | |
| 2016/0370406 A1 | 12/2016 | Johnson et al. | |
| 2018/0067145 A1 | 3/2018 | Andres | |
| 2020/0300892 A1 * | 9/2020 | Nasu | G01R 1/06722 |
| 2020/0400718 A1 * | 12/2020 | Skodje | G01R 1/0466 |

FOREIGN PATENT DOCUMENTS

| | | | |
|---|---|---|---|
| EM | 009197452-0002 | 11/2022 | |
| EM | 009197452-0003 | 11/2022 | |
| EM | 009197452-0004 | 11/2022 | |
| EM | 009197452-0005 | 11/2022 | |
| EM | 009197452-0006 | 11/2022 | |
| KR | 2003039645 Y1 * | 1/2004 | G01R 1/0433 |
| WO | WO-2012133740 A1 * | 10/2012 | G01R 1/0466 |

OTHER PUBLICATIONS

Grainger. Link: https://grainger.com/product/44F380?gucid=N:N:FPL:Free:GGL:CSM-1946:tew63h3:20501231. Visited Feb. 23, 2024. Siemens Replacement Contact Kit, Item 44F380Mfr. Model 75BF14. 2 pages (Year: 2024).

Contact Techology. Link: https://contactechnologies.com/Electical-Contacts.htm. Visited Feb. 22, 2024. Customized Electrical Contacts Produced by Means of Powder Metallurgy, 3 pages (Year: 2024).

Restriction Requirement issued in Design U.S. Appl. No. 29/843,097, Feb. 28, 2024 (15 pages).

International Search Report and Written Opinion, International Patent Application No. PCT/US22/79030, Feb. 7, 2023 (9 pages).

Extended European Search Report, European Patent Application No. 22890973.5, Aug. 25, 2025 (15 pages).

* cited by examiner

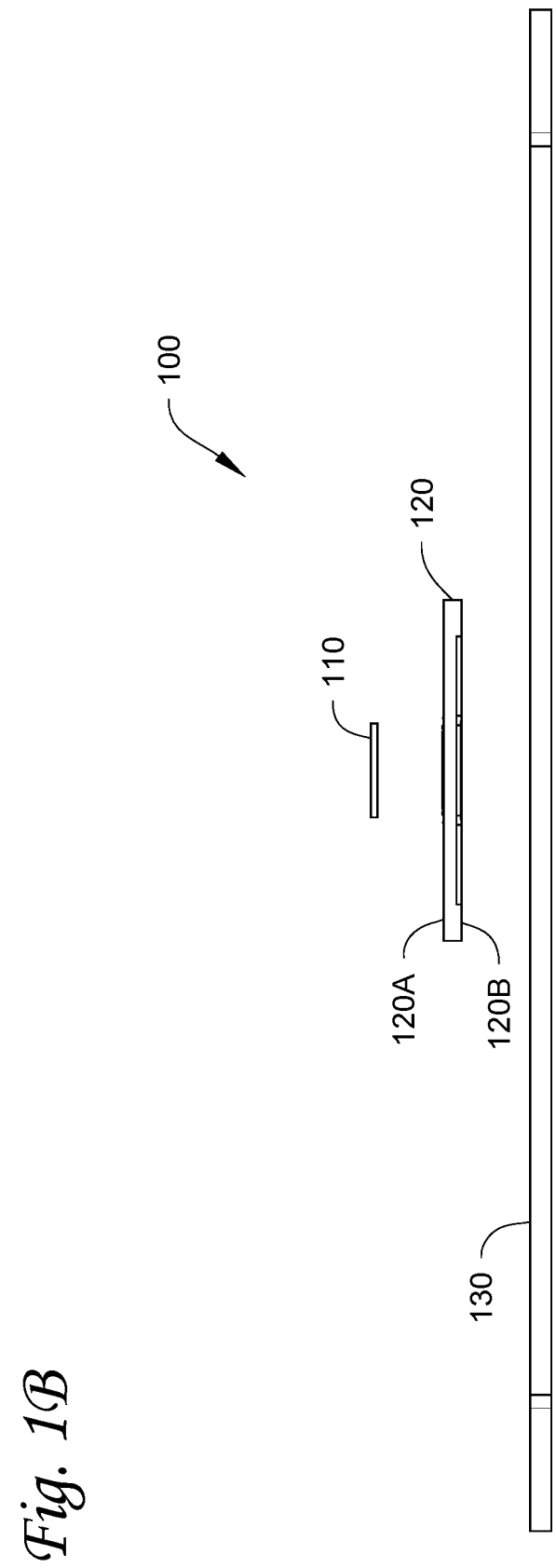

HOUSING WITH VERTICAL BACKSTOP

TECHNICAL FIELD

This disclosure relates generally to the field of testing microcircuits (e.g., chips such as semiconductor devices, integrated circuits, etc.). More specifically, the disclosure relates to a contactor assembly having a housing with a vertical backstop capability for contact position in a testing system.

BACKGROUND

The manufacturing processes for microcircuits cannot guarantee that every microcircuit is fully functional. Dimensions of individual microcircuits are microscopic and process steps very complex, so small or subtle failures in a manufacturing process can often result in defective devices. Mounting a defective microcircuit on a circuit board is relatively costly. Installation usually involves soldering the microcircuit onto the circuit board. Once mounted on a circuit board, removing a microcircuit is problematic because the very act of melting the solder for a second time may ruin the circuit board. Thus, if the microcircuit is defective, the circuit board itself is probably ruined as well, meaning that the entire value added to the circuit board at that point is lost. For all these reasons, a microcircuit is usually tested before installation on a circuit board. Each microcircuit must be tested in a way that identifies all defective devices, but yet does not improperly identify good devices as defective. Either kind of error, if frequent, adds substantial overall cost to the circuit board manufacturing process.

Microcircuit test equipment itself is quite complex. First of all, the test equipment must make accurate and low resistance temporary and non-destructive electrical contact with each of the closely spaced microcircuit contacts. Because of the small size of microcircuit contacts and the spacing between them, even small errors in making the contact will result in incorrect connections. A further problem in microcircuit test equipment arises in automated testing. Testing equipment may test one hundred devices a minute, or even more. The sheer number of tests cause wear on the tester contacts making electrical connections to the microcircuit terminals during testing. This wear dislodges conductive debris from both the tester contacts and the device under test (DUT) terminals that contaminates the testing equipment and the DUTs themselves. The debris eventually results in poor electrical connections during testing and false indications that the DUT is defective. The debris adhering to the microcircuits may result in faulty assembly unless the debris is removed from the microcircuits. Removing debris adds cost and introduces another source of defects in the microcircuits themselves.

Other considerations exist as well. Inexpensive tester contacts that perform well are advantageous. Minimizing the time required to replace them is also desirable, since test equipment is expensive. If the test equipment is off line for extended periods of normal maintenance, the cost of testing an individual microcircuit increases. Test equipment in current use has an array of test contacts that mimic the pattern of the microcircuit terminal array. The array of test contacts is supported in a structure that precisely maintains the alignment of the contacts relative to each other. An alignment board or plate or template can be used to align the microcircuit itself with the test contacts. The test contacts and the alignment board can be mounted on a load board having conductive pads that make electrical connection to the test contacts. The load board pads are connected to circuit paths that carry the signals and power between the test equipment electronics and the test contacts.

Each of the array of test contacts that electrically connect to the microcircuit signal and power (S&P) terminals may be referred to as a contactor assembly that includes a housing and a contact (may also be referred to as a pin) biased by e.g., a pair of elastomers. In one particular application, when the contact is in operation, a flat portion of the contact tail of the contact is against the load board (a printed circuit board "PCB"), and a tail-stop (e.g., an inner end wall) of the housing may keep the contact properly positioned in place.

It is beneficial for the contact tip to traverse on the surface of the DUT during DUT actuation to wipe off non-conducting oxides and debris from the DUT and the contact tip to improve electrical contact. The traverse movement that creates a mark on the DUT can be referred to as a "scrub" or "wipe". Control of a size of the scrub mark can allow contact use on smaller pads. In some applications, the housing of the contactor assembly may have an up-stop, and the contact of the contactor assembly may have an up-stop protrusion geometry. The up-stop protrusion geometry may have a flat surface that is parallel to the up-stop shoulder of the housing while the contact is resting in the unactuated position. During actuation, the DUT may push the contact off the housing up-stop while the contact rotates, constrained by the tail-stop of the housing. The length of the scrub on the DUT can be from the location of a DUT to contact tip interface in a preload state, to the interface location in a test state (e.g., an actuated state). The contact may have a self-cleaning wiping action that moves contaminants away from a lead of the DUT, thus improving the electrical connection between the contact and the DUT lead. Contact scrub and contact DUT wipe are terms that can be used interchangeably herein.

Since such contact up-stop protrusion is flat and level at an unactuated position by design with plane-on-plane contact, manufacturing variation in the contact protrusion geometry can change the levelness of the contact protrusion in an unactuated position. The contact manufacturing variation can cause the interface of the contact with the housing to move around significantly depending on whether the contact up-stop protrusion is angled up or down. For accurate positioning of the contact tip, the plane-on-plane up-stop condition should be met with no angular difference between the contact up-stop and housing up-stop. Variation in the location of the up-stop interface can multiply the error out to the contact tip to DUT interface for height and location variation which can be further from the center of rotation of the contact.

Due to the fit of the contact width in the contact slot of the housing, the contact may shift to one side of the slot, in this case the contact up-stop protrusion edge can interface with the front edge of the up-stop of the housing. The curved edge on curved edge interface may translate any manufacturing deviation in the X, Y, or Z plane into both contact tip location and height error.

Another issue with such horizontal up-stop is the impact of housing gap on the position of the contact tip in a preload state, which may set the start location of a DUT wipe. Housing gap can be the nearly vertical separation of the housing and the load board due to forces within the contactor assembly, including elastomer interference with the load board, and contact preload forces. The magnitude of the housing gap may depend on a few inputs including but not limited to the number of contacts, fit of elastomer in the slots, durometer of the elastomer, flexural modulus of the housing, flexural modulus of the load board, distances between fastener hardware, test temperature, handler hardware, and/or elastomer assembly variation. Housing gap can cause a mostly vertical shift of the housing away from the load board in the center of the contactor, while maintaining housing contact with the load board near the fasteners. As such, the housing gap may shift the housing, including the up-stop feature, vertically away from the load board. During preload, with the contactor assembly mounted to the load board, the contact can rotate up away from the ideal nominal position. With the contact rotation up, the contact tip start position can shift towards the tail of the contact, so that when the DUT first touches the contact tip, the interface may be shifted towards the outside edge of the DUT lead, when compared to nominal. The wipe start location variation due to the housing gap may prevent the contactor assembly from being used on shorter pads, and may cause interference with DUT pad edge burr. It will be appreciated that a "burr" may be created on a QFN or DFN DUT when the DUT perimeter is sawn to final dimension. For example, as a cutting tool reciprocates on the edge of the DUT through the pad, it may leave a raised ridge on the edge of the pad pulling lower layers of copper and nickel above the pad gold layer. It may be desirable for the contact tip to avoid scrub on the burr since it may transport the nickel and copper contaminates of the burr to the surface of the DUT pad causing potential DUT solderability issues downstream.

BRIEF SUMMARY

Embodiments disclosed herein provide a solution that addresses each of the above-mentioned problems. Embodiments disclosed herein may provide a contactor assembly with a vertical backstop. In such embodiments, the contact of the contactor assembly can have reduced electrical stubs areas adjacent to the electrical path which can improve return loss and/or insertion loss. In addition, the contacts adjacent to other contacts can have reduced projected overlap area, resulting in improved crosstalk performance. Furthermore, the contact and contact slot of the housing of the contactor assembly can be scaled down for a shorter electrical length without the removal of (1) the backstop to set the DUT wipe start location more accurately, and (2) the contact retention which hold the contact in place when in a free state of the contactor assembly. Moreover, the vertical orientation of the backstop and proximity to the contact tip can minimize the impact of the housing gap on DUT wipe start position, to fit the DUT wipe on a smaller length DUT pads.

A contactor assembly for a testing system for testing integrated circuit devices is disclosed. The contactor assembly includes a contact having a tip, a body, a tail having a tail radius, and a contact backstop. The contactor assembly further includes a housing having a contact slot. The contact is receivable in the contact slot. The contact is configured to be in a free state, a preload state, and an actuated state. The contact slot includes a tail stop. The contact backstop protrudes from the contact body. When the contact is in the preload state, the contact backstop extends in a length direction of the housing generally perpendicular to the height direction and is biased against a backstop.

Also disclosed is a testing system for testing integrated circuit devices. The testing system includes a device under test having at least one terminal, a load board having at least one terminal, and a contactor assembly. The contactor assembly includes a contact having a tip, a body, a tail having a tail radius, and a contact backstop. The contactor assembly further includes a housing having a contact slot. The contact is receivable in the contact slot. The contact is configured to be in a free state, a preload state, and an actuated state. The contact slot includes a tail stop. The contact backstop protrudes from the contact body. When the contact is in the preload state, the contact backstop extends in a length direction of the housing generally perpendicular to the height direction and is biased against a backstop. The at least one terminal of the device under test is configured to engage with the tip of the contact during testing. The at least one terminal of the load board is configured to engage with the tail of the contact during testing.

Also disclosed is a method of retaining a contact of a contactor assembly in a testing system for testing integrated circuit devices, in a housing of the contactor assembly where the contact includes a tip, a body, a tail having a tail radius, and a contact backstop; the housing has a contact slot; the contact is receivable in the contact slot; the contact is configured to be in a free state, a preload state, and an actuated state; the contact slot includes a tail stop; the contact backstop protrudes from the contact body; when the contact is in the preload state, the contact backstop extends in a length direction of the housing generally perpendicular to the height direction and is biased against a backstop. The method includes forming the contact with the contact backstop and the housing; configuring the contact to be received in the contact slot; engaging the tail radius of the contact with the tail stop of the housing and/or engaging the contact backstop with the backstop; and retaining the contact in place when the contact is in the free state, the preload state, and/or the actuated state.

BRIEF DESCRIPTION OF THE SEVERAL VIEWS OF THE DRAWINGS

References are made to the accompanying drawings that form a part of this disclosure and which illustrate embodiments in which the systems and methods described in this specification can be practiced.

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1B is a side view of FIG. 1A, according to an embodiment.

Like reference numbers represent like parts throughout.

DETAILED DESCRIPTION

Figure 1A:
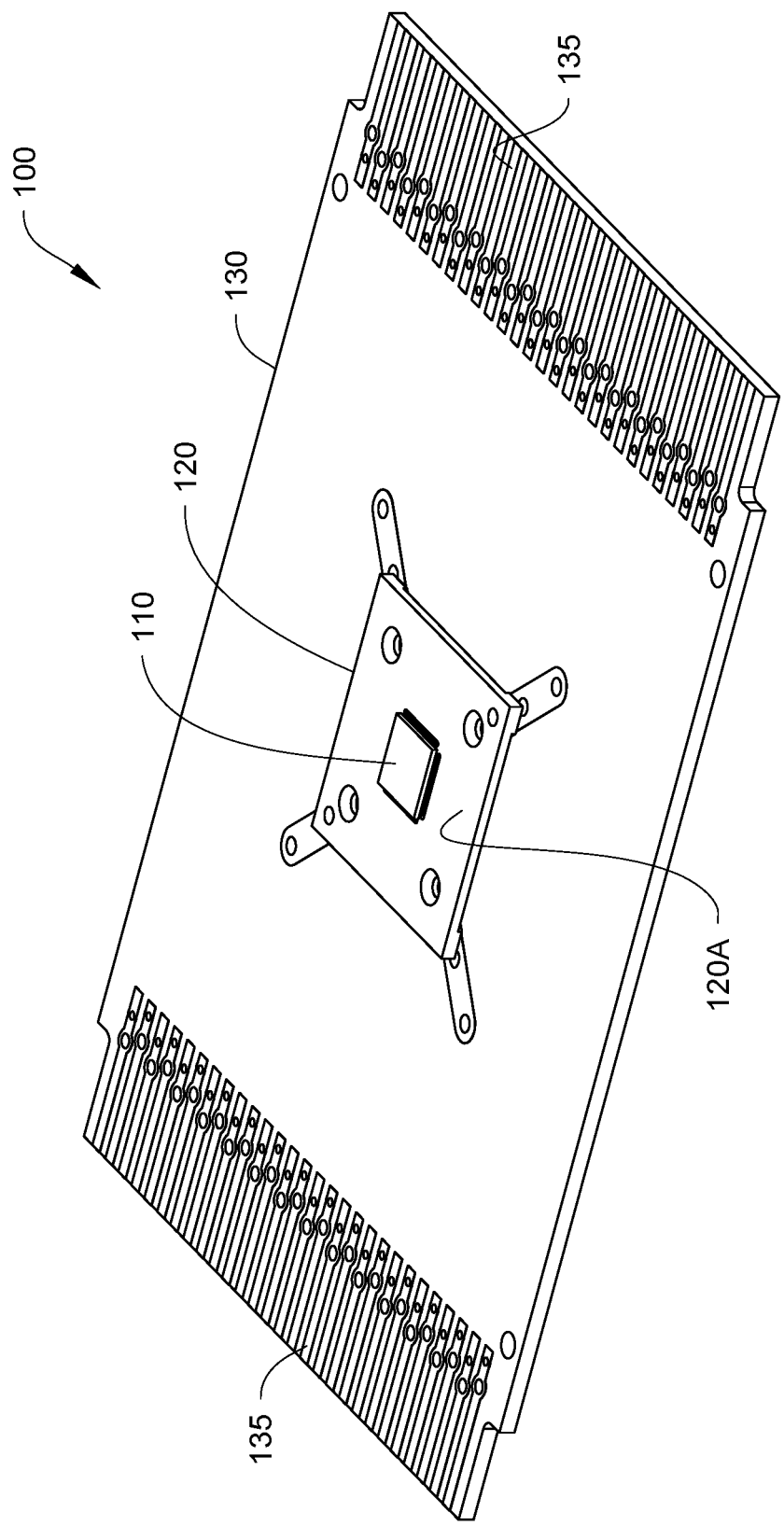
FIG. 1A is a perspective view of a part of a test system for testing integrated circuit devices, according to an embodiment.

This disclosure relates generally to the field of testing microcircuits (e.g., chips such as semiconductor devices, integrated circuits, etc.). More specifically, the disclosure relates to a contactor assembly having a housing with a vertical backstop capability for contact retention in a testing system. A contactor assembly typically includes a housing, a contact (or pin) being receivable in a contact slot of the housing, and one or two or more elastomers to bias the contact. It will be appreciated that the elastomer(s) (one or more) can be any suitable biasing element(s).

It will be appreciated that housing gap is referred to as the separation of the contactor and the load board due to elastomer and contact forces on the contact and the load board in a preload state. The housing (of the contactor) and the load board are in contact near the connectors (e.g., fasteners or the like) near the perimeter of the contactor. The housing and the load board separate with increasing magnitude to the location of the contact (of the contactor) and elastomer load board interfaces. In some applications, adding housing gap during the preload state may adversely affect the location of contact tip. For example, during the preload state, housing gap may translate a horizontal up-stop vertically, which may allow the contact to rotate out of the nominal position, which ideally had no housing gap. Then the contact may finish actuation and moves into test state (actuated state).

Embodiments disclosed herein provide a vertical backstop so that the housing gap has minimal effect on the contact tip position. For example, during the preload state, the housing gap can translate the vertical backstop vertically, which has the advantages of decreasing the clearance of the housing to a bottom side of the contact backstop protrusion and minimal effect on the rotation of the contact and position of contact tip. Then the contact may finish actuation and move into the test state (actuated state).

Some embodiments of the present application are described in detail with reference to the accompanying drawings so that the advantages and features of the present application can be more readily understood by those skilled in the art. The terms "front", "rear", "top", "bottom", "left", "right" and the like described in the present application are defined according to the typical observation angle of a person skilled in the art and for the convenience of the description. These terms are not limited to specific directions.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Particular embodiments of the present disclosure are described herein with reference to the accompanying drawings; however, it is to be understood that the disclosed embodiments are merely examples of the disclosure, which can be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that can perform the same, similar, or equivalent functions.

Additionally, the present disclosure can be described herein in terms of functional block components and various processing steps. It should be appreciated that such functional blocks can be realized by any number of components configured to perform the specified functions. For example, the present disclosure can employ various processing elements, logic elements, and the like, which can carry out a variety of functions under the control of one or more control devices.

The scope of the disclosure should be determined by the appended claims and their legal equivalents, rather than by the examples given herein. For example, the steps recited in any method claims can be executed in any order and are not limited to the order presented in the claims. Moreover, no element is essential to the practice of the disclosure unless specifically described herein as "critical" or "essential".

Embodiments disclosed herein can provide a vertical backstop contactor so that (1) contact can have more uniform cross-sectional area through the electrical path, and have reduced electrical stubs areas adjacent to the electrical path which can improve return loss and insertion loss; (2) the contact and housing contact slot can be scaled down for a shorter electrical length without the removal of (i) backstop features to set DUT wipe start location more accurately, and (ii) contact retention features which hold the contact in place when in the free state; (3) the vertical orientation of the backstop and proximity to the contact tip can minimize impact of housing gap on DUT wipe start position, to fit DUT wipe on smaller length DUT pads or avoid wiping on a burr on the edge of a DUT pad, which interferes with solderability of DUT pad in downstream process.

Figure 1C:
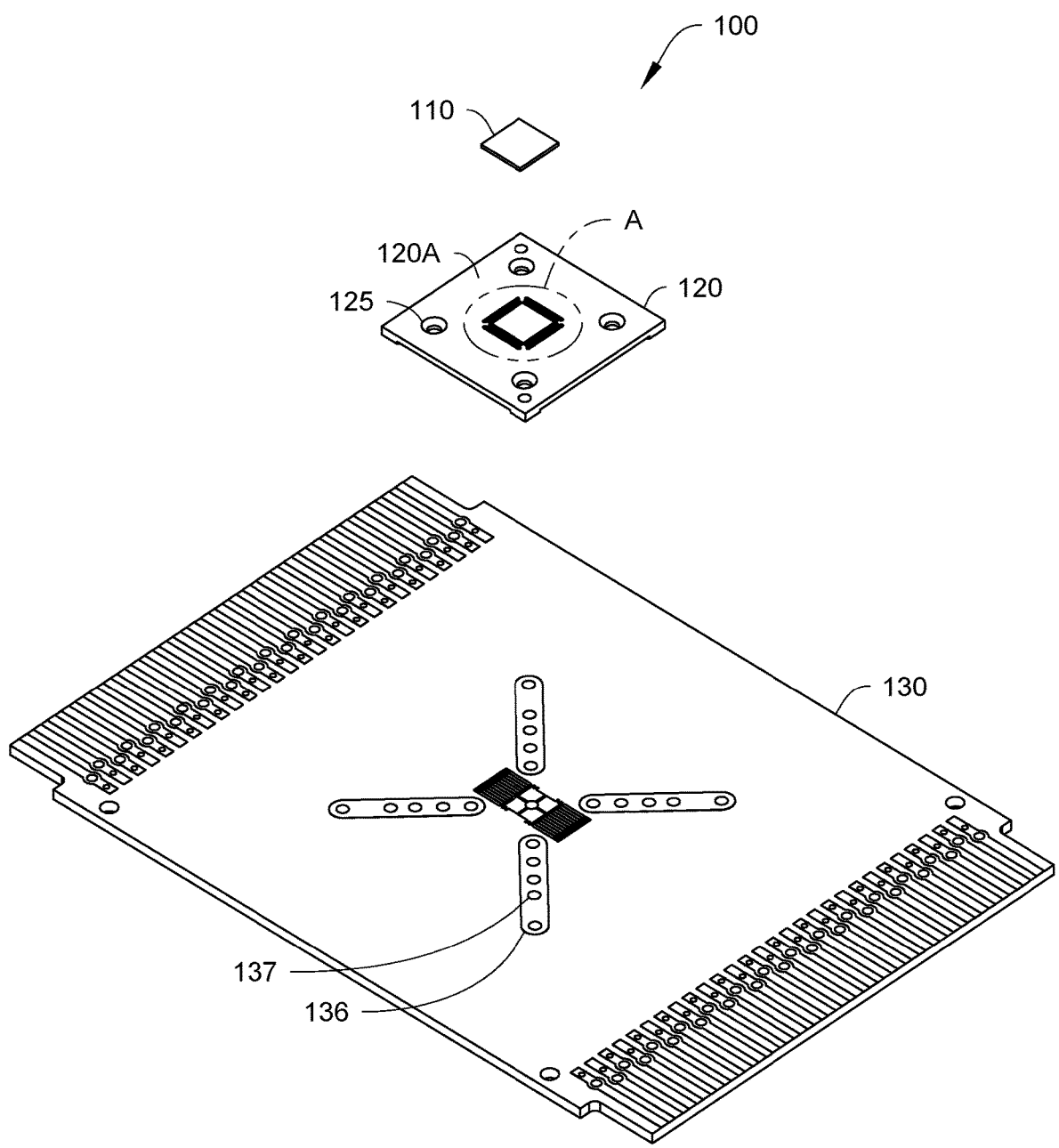
FIG. 1C is an exploded view of FIG. 1A, according to an embodiment.

FIG. 1A is a perspective view of a part of a test system 100 for testing integrated circuit devices 110, according to an embodiment. FIG. 1B is a side view of FIG. 1A, according to an embodiment. FIG. 1C is an exploded view of FIG. 1A, according to an embodiment.

The test system 100 includes a DUT (e.g., a microcircuit, etc.) 110, a contactor 120, and a load board 130. In an embodiment, the test system 100 can include an alignment plate (not shown). It will be appreciated that the alignment plate can be a feature of the contactor 120 that aligns the perimeter of the DUT 110 to the contactor 120, and thus positions the DUT leads to individual contacts. The load board 130 carries on its surface, connection pads 135 connected to a tester (not shown) by Signal and Power (S&P) conductors. The tester includes test electronics that perform the electrical testing of the DUT 110. In an embodiment, the test electronics can be integrated with the load board 130. In another embodiment, the test electronics can be on a separate chassis independent to the load board 130. It will be appreciated that the embodiment is a non-limiting example of the test system 100. The load board 130 and its connection pads 135 may be different than that described without impacting the functionality of the contactor 120.

The contactor 120 has a first surface 120A and a second surface 120B. The DUT 110 is configured to be placed on the first surface 120A. The second surface 120B is configured to be placed on the load board 130. The contactor 120 includes a number of individual test contact elements (contactor assemblies, described in detail later) precisely mirrors the terminals carried on the surface of the DUT 110. When the DUT 110 is paced on the contactor 120, terminals of the DUT 110 precisely align with contactor assemblies of the contactor 120. Each of the contactor assemblies typically includes an insulating main body (or housing), which may be made of plastic or any other suitable materials. The contactor 120 has alignment features such as holes or edge patterns that provide for precise alignment of the contactor with corresponding DUT 110.

Figure 2:
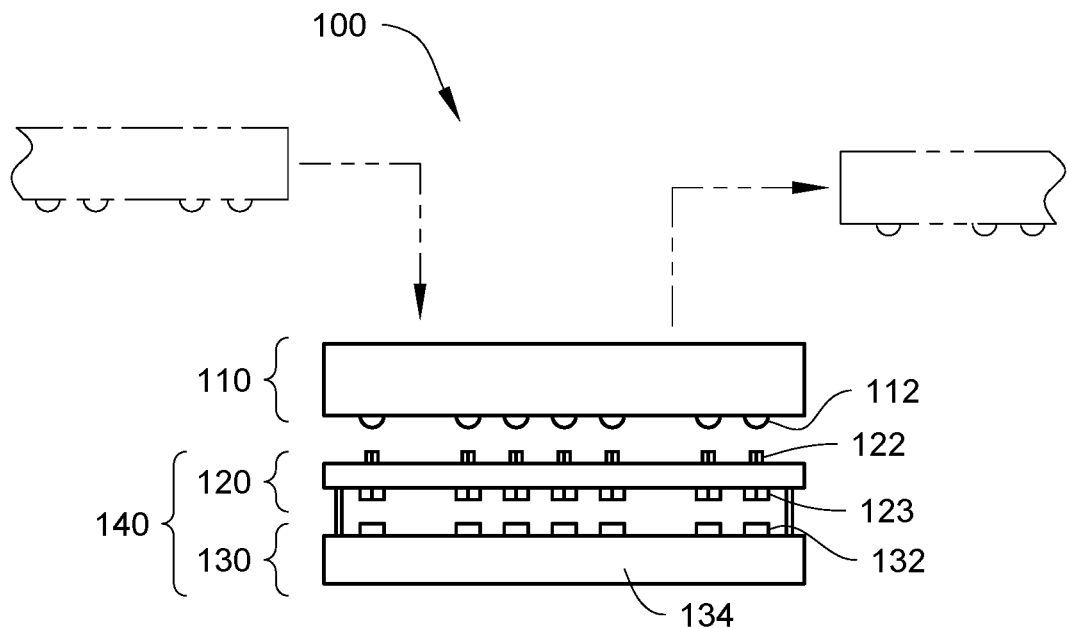
FIG. 2 is a side-view drawing of a portion of the test system for receiving a DUT for electrical testing, according to one embodiment.
Figure 3:
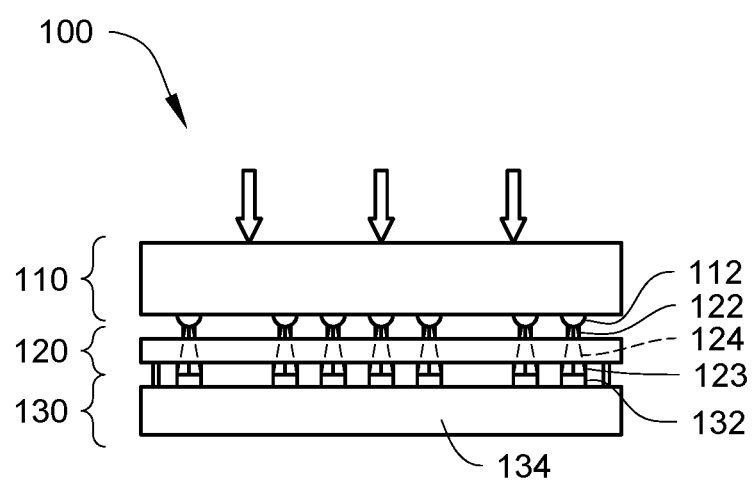
FIG. 3 is a side-view drawing of the test system of FIG. 2, with the DUT electrically engaged, according to one embodiment.

FIG. 2 is a side-view drawing of a portion of the test system 100 for receiving the DUT 110 for electrical testing, according to one embodiment. FIG. 3 is a side-view drawing of the test system 100 of FIG. 2, with the DUT 110 electrically engaged, according to one embodiment. It will be appreciated that although FIGS. 2 and 3 show a BGA (ball grid array), the desired use of the disclosed concepts is on flat pad devices.

As shown in FIG. 2, the DUT 110 is placed onto a test assembly 140, electrical testing is performed, and the DUT 110 is then removed from the test assembly 140. Any electrical connections are made by pressing components into electrical contact with other components; there is no soldering or de-soldering at any point in the testing of the DUT 110. The entire electrical test procedure may only last about a fraction of a second, so that rapid, accurate placement of the DUT 100 becomes important for ensuring that the test system 100 is used efficiently. The high throughput of the test assembly 140 usually requires robotic handling of the DUT 110. In most cases, an automated mechanical system places the DUT 110 onto the test assembly 140 prior to testing, and removes the DUT 110 once testing has been completed. The handling and placement mechanism may use mechanical and optical sensors to monitor the position of the DUT 110, and a combination of translation and rotation actuators to align and place the DUT 110 on or in the test assembly 140. Alternatively, the DUT 110 may be placed by hand, or placed by a combination of hand-fed and automated equipment.

In an embodiment, the test assembly 140 includes the contactor 120 and the load board 130. It will be appreciated that the test assembly 140 can also include an alignment plate (not shown).

The DUT 110 typically includes signal and power terminals 112 that connect to the contactor 120. The terminals may be on one side of the DUT 100, or may be on both sides of the DUT 110. For use in the test assembly 140, all the terminals 112 should be accessible from one side of the DUT 110, although it will be understood that there may be one or more elements on the opposite side of the DUT 110, or that there may be other elements and/or terminals on the opposite side that may not be tested by accessing terminals 112. Each terminal 112 is formed as a small, pad on button side of the DUT 110 or possibly a lead protruding from the body of the DUT 110. Prior to testing, the pad or lead 112 is attached to an electrical lead that connects internally to other leads, to other electrical components, and/or to one or more chips in the DUT 110. The volume and size of the pads or leads may be controlled quite precisely, and there is typically not much difficulty caused by pad-to-pad or lead-to-lead size variations or placement variations. During testing, the terminals 112 remain solid, and there is no melting or re-flowing of any solder.

The terminals 112 may be laid out in any suitable pattern on the surface of the DUT 110. In some cases, the terminals 112 may be in a generally square grid, which is the origin of an expression that describes the DUT 110, QFN, DFN, MLF or QFP for leaded parts. There may also be deviations away from a rectangular grid, including irregular spacing and geometries. In one embodiment, the DUT 110 can have flat no-leads packages such as quad-flat no-leads (QFN) and dual-flat no-leads (DFN). Flat no-leads, also known as micro lead-frame (MLF) and SON (small-outline no leads), is a surface-mount technology, one of several package technologies that connect the DUT 110 to the surfaces of e.g., the contactor 120 without through-holes. In one embodiment, flat no-lead can be a near chip scale plastic encapsulated package made with a planar copper lead frame substrate. Perimeter lands (e.g., terminals 112) on the package bottom provide electrical connections to the contactor 120. Flat no-lead packages can include an exposed thermally conductive pad to improve heat transfer out of the DUT 110 (e.g., into the PCB). The QFN package can be similar to the quad-flat package (QFP) and a ball grid array (BGA). In other embodiments, the DUT 110 is preferably a Wafer-level Chip Scale Package (WL-CSP) and/or Leaded (TSOP, DO) package.

It will be understood that the specific locations of the terminals may vary as needed, with corresponding locations of pads on the load board 130 and contacts on the contactor 120 or housing being chosen to match those of the terminals 112. In general, the spacing between adjacent terminals 112 is in the range of 0.25 to 1.5 mm, with the spacing being commonly referred to as a "pitch". When viewed from the side, as in FIG. 2, the DUT 110 displays a line of terminals 112, which may optionally include gaps and irregular spacing. These terminals 112 are made to be generally planar, or as planar as possible with typical manufacturing processes. In many cases, if there are chips or other elements on the DUT 110, the protrusion of the chips is usually less than the protrusion of the terminals 112 away from the DUT 110.

The load board 130 includes a load board substrate 134 and circuitry that is used to test electrically the DUT 110. Such circuitry may include driving electronics that can produce one or more AC voltages having one or more particular frequencies, and detection electronics that can sense the response of the DUT 110 to such driving voltages. The sensing may include detection of a current and/or voltage at one or more frequencies. In general, it is highly desirable that the features on the load board 130, when mounted, are aligned with corresponding features on the DUT 110. Typically, both the DUT 110 and the load board 130 are mechanically aligned to one or more locating features on the test assembly 140. The load board 130 may include one or more mechanical locating features, such as fiducials or precisely-located holes and/or edges, which ensure that the load board 130 may be precisely seated on the test assembly 140. These locating features typically ensure a lateral alignment of the load board 130, and/or a longitudinal alignment as well.

In general, the load board 130 may be a relatively complex and expensive component. The housing/test assembly 140 performs many functions including protecting the contact pads 132 of the load board 130 from wear and damage. Such an additional element may be a contactor 120. The contactor 120 also mechanically aligns with the load board 130 with suitable locating features (e.g., alignment pins, or the like), and resides in the test assembly 140 above the load board 130, facing the DUT 110. The contactor 120 includes a series of electrically conductive contacts (in contactor assemblies, each contact including a tip 122 and a tail 123, described in detail later), which extend longitudinally outward on either side of the contactor 120. Each contactor assembly (122, 123) may include a resilient element, such as a spring or an elastomer material. Each contactor assembly (122, 123) may be a single conductive unit, or may alternatively be formed as a combination of conductive elements. In general, each contactor assembly (122, 123) connects one contact pad 132 on the load board 130 to one terminal 112 on the DUT 110, although there may be testing schemes in which multiple contact pads 132 connect to a single terminal 112, or multiple terminals 112 connect to a single contact pad 132. For simplicity, we assume in the text and drawings that a single contactor assembly (122, 123) connects a single pad 132 to a single terminal 112, although it will be understood that any of the tester elements disclosed herein may be used to connect multiple contact pads 132 connect to a single terminal 112, or multiple terminals 112 to a single contact pad 132.

Typically, the contactor 120 electrically connects the load board pads 132 and the bottom contact surface of the DUT 110. Although the contactor 120 may be removed and replaced relatively easily, compared with removal and replacement of the load board 130, we consider the contactor 120 to be part of the test assembly 140 for this document. During operation, the test assembly 140 includes the load board 130, the contactor 120, and the mechanical construction that mounts them and holds them in place (not shown). Each DUT 110 is placed against the test assembly 140, is tested electrically, and is removed from the test assembly 140. A single contactor 120 may test many DUTs 110 before it wears out, and may typically last for several thousand tests or more before requiring replacement. In general, it is desirable that replacement of the contactor 120 be relatively fast and simple, so that the test assembly 140 experiences only a small amount of down time for contactor replacement. In some cases, the speed of replacement for the contactor 120 may even be more important than the actual cost of each contactor 120, with an increase in tester up-time resulting in a suitable cost savings during operation.

FIG. 2 shows the relationship between the test assembly 140 and the DUTs 110. When each DUT 110 is tested, it is placed into a suitable robotic handler with sufficiently accurate placement characteristics, so that a particular terminal 112 on the DUT 110 may be accurately and reliably placed with respect to corresponding contactor assemblies (122, 123) on the contactor 120 and corresponding contact pads 132 on the load board 130. The robotic handler (not shown) forces each DUT 110 into contact with the test assembly 140. The magnitude of the force depends on the exact configuration of the test, including the number of terminals 112 being tested, the force to be used for each terminal, typical manufacturing and alignment tolerances, and so forth. In general, the force is applied by the mechanical handler of the tester (not shown), acting on the DUT 110. In general, the force is generally longitudinal, and is generally perpendicular to a surface normal of the load board 130.

FIG. 3 shows the test assembly 140 and DUT 110 in contact, with sufficient force being applied to the DUT 110 to engage the contactor assemblies (122, 123) and form an electrical connection 124 between each terminal 112 and its corresponding contact pad 132 on the load board 130. As stated above, there may alternatively be testing schemes in which multiple terminals 112 connect to a single contact pad 132, or multiple contact pads 132 connect to a single terminal 112, but for simplicity in the drawings we assume that a single terminal 112 connects uniquely to a single contact pad 132.

Figure 4:
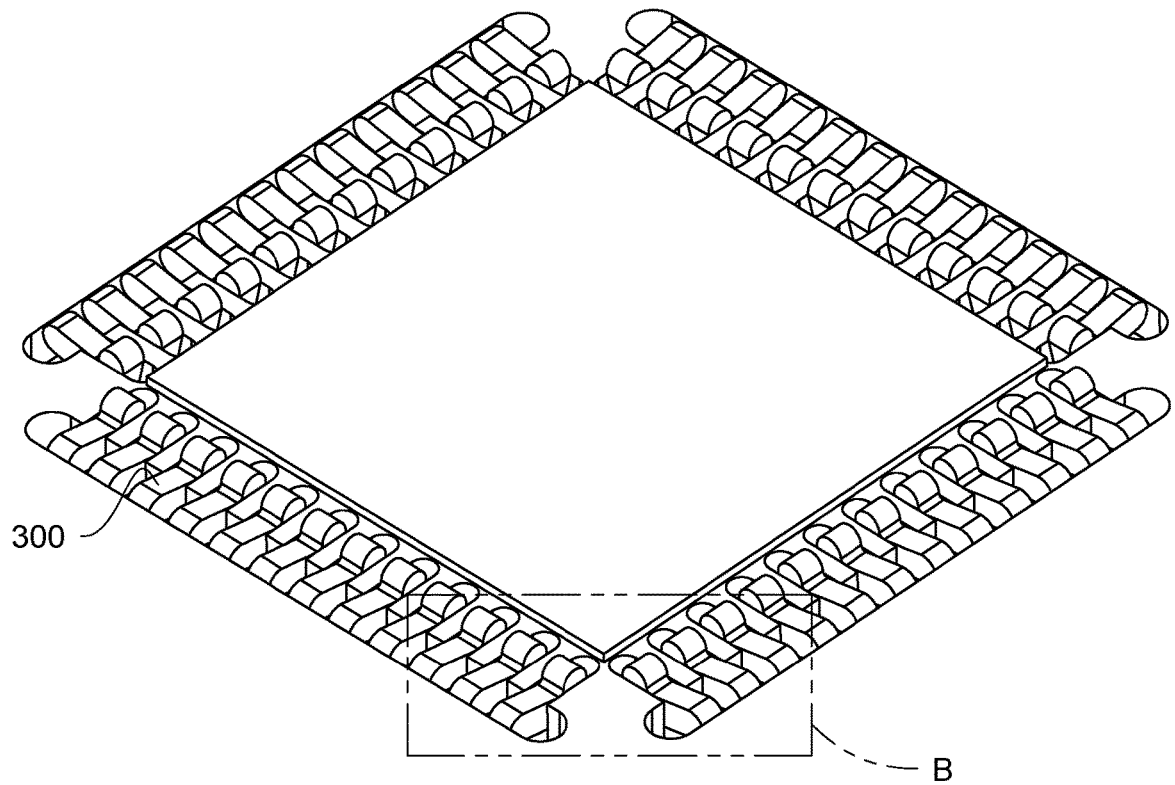
FIG. 4 is an enlarged view of the circled portion A on the first surface of the contactor of FIG. 1C, according to an embodiment.
Figure 5:
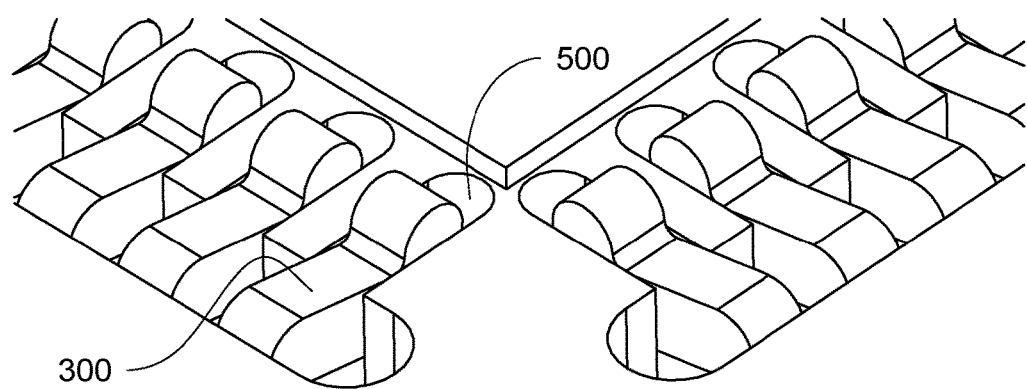
FIG. 5 is an enlarged view of the portion B of FIG. 4, according to an embodiment.

FIG. 4 is an enlarged view of the circled portion A on the first surface 120A of the contactor 120 of FIG. 1C, according to an embodiment. FIG. 5 is an enlarged view of the portion B of FIG. 4, according to an embodiment.

The circled portion A of the contactor 120 includes a plurality of S&P terminals (contactor assemblies, described in detail later) that align with the S&P terminals of the DUT 110. FIG. 4 shows four groups of contactor assemblies forming a square shape. Each group of contactor assemblies forms an edge of the square shape and includes a plurality of contacts 300, a plurality of slots 500 in the housing (500 may also refer to the entire housing including the plurality of slots) (see e.g., FIG. 5, FIG. 19, or the like) each configured to receive a contact 300, and a pair of elastomers 400 (described later in FIG. 9) shared by the group of contactor assemblies.

Figure 6:
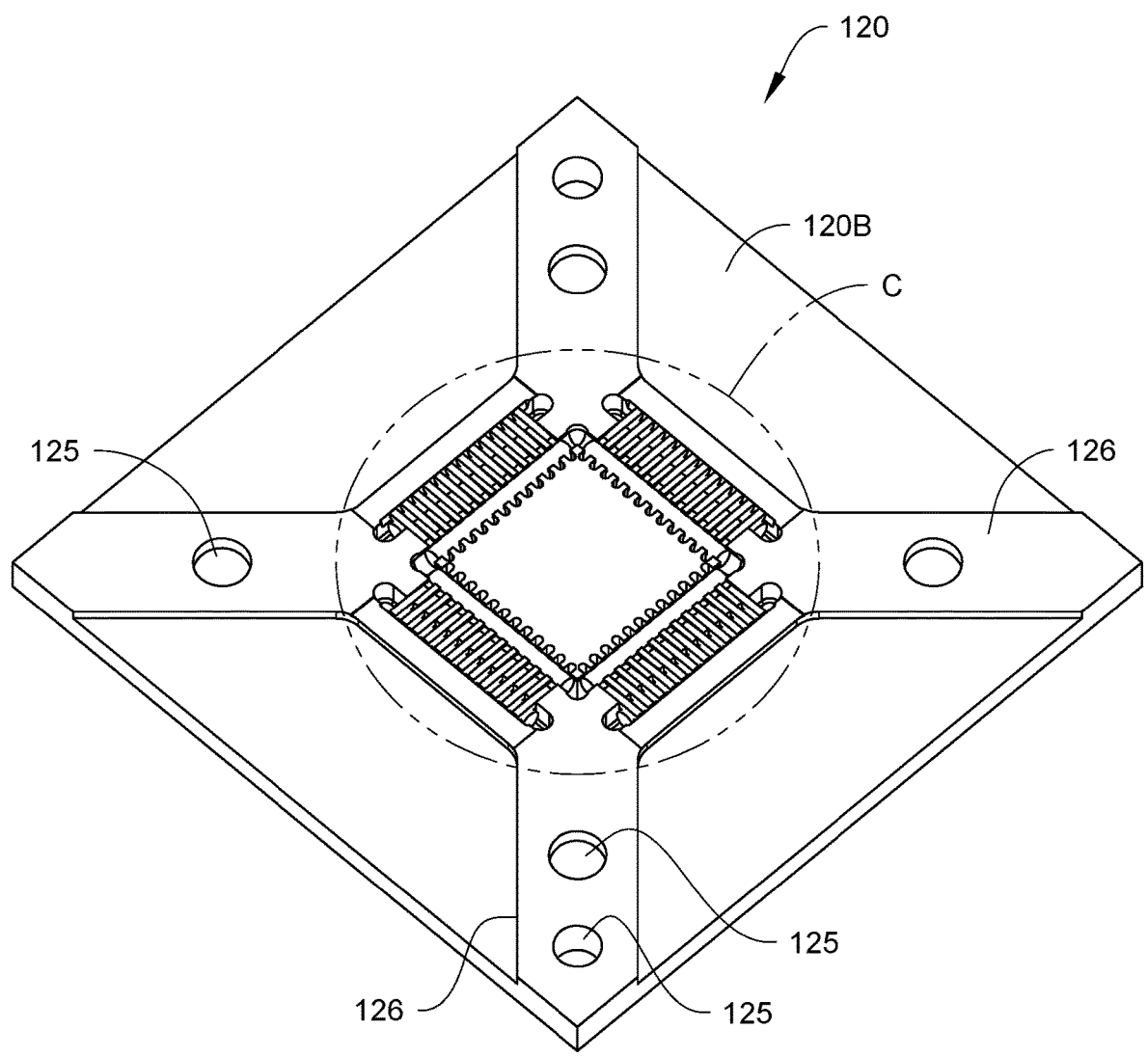
FIG. 6 is a perspective view of a contactor, according to an embodiment.

FIG. 6 is a perspective view of a contactor 120, according to an embodiment. FIG. 6 shows the second surface 120B of the contactor 120. The contactor 120 includes a plurality of holes 125 and a plurality of alignment structures 126. It will be appreciated that structure 126 can be a raised rib of material that serves as a mounting surface and as a structural element of the housing. On the load board, the long rectangular shapes (136, see FIG. 1C) denote areas that are preferably plated. The plated pads on the load board are there to provide flat and coplanar surfaces. The preferably plated surfaces can ensure that the housing and contacts are as close as possible to flat and coplanar with each other with neither of them raised or lowered with respect to the other.

Referring back to FIG. 1C, the load board 130 includes a plurality of holes 137 and a plurality of alignment structures 136. The alignment structures 126 can be aligned with the alignment structures 136, and connectors (e.g., screws, pins, or the like, not shown) can be inserted into the holes 125 and holes 137 to mount/install the contactor 120 to/on the load board 130. It will be appreciated that any suitable mounting mechanisms other than connectors and holes can be used to mount/install the contactor 120 to/on the load board 130.

Figure 7:
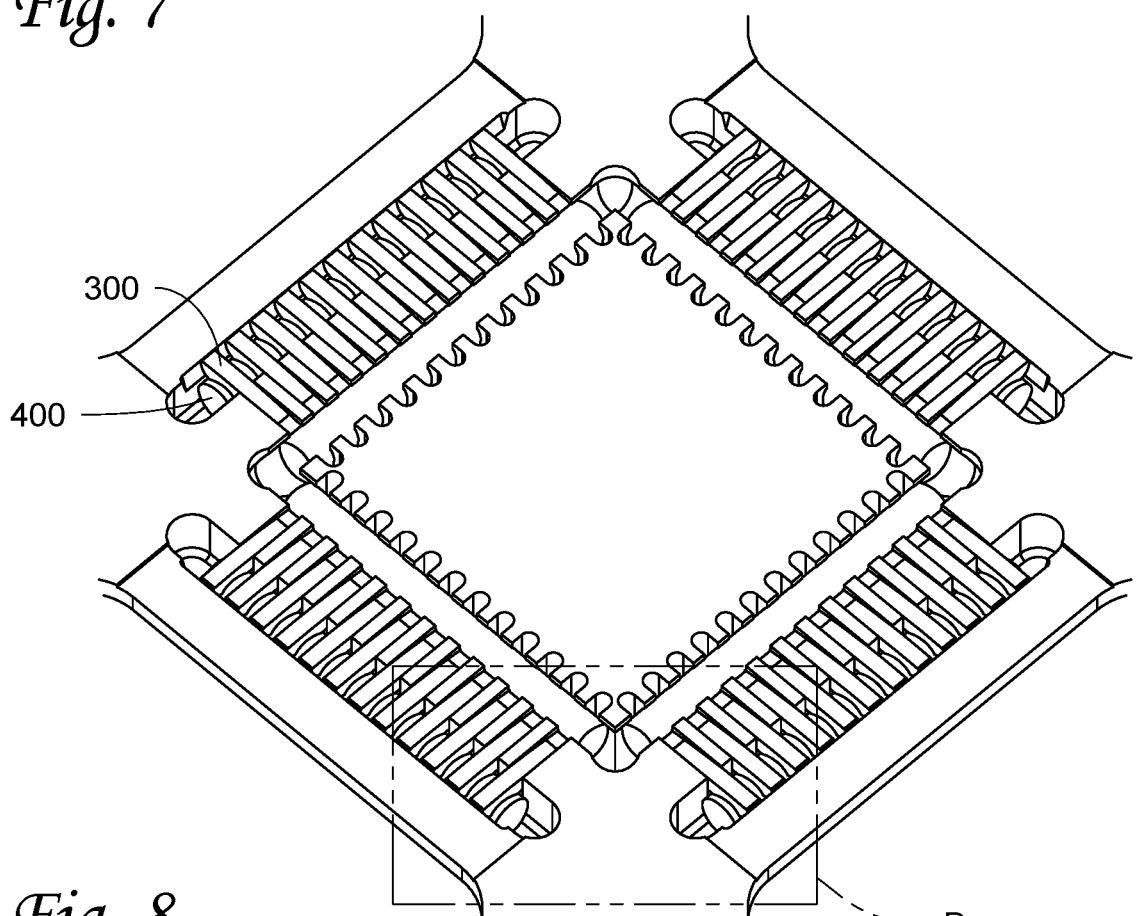
FIG. 7 is an enlarged view of the circled portion C on the second surface of the contactor of FIG. 6, according to an embodiment.
Figure 8:
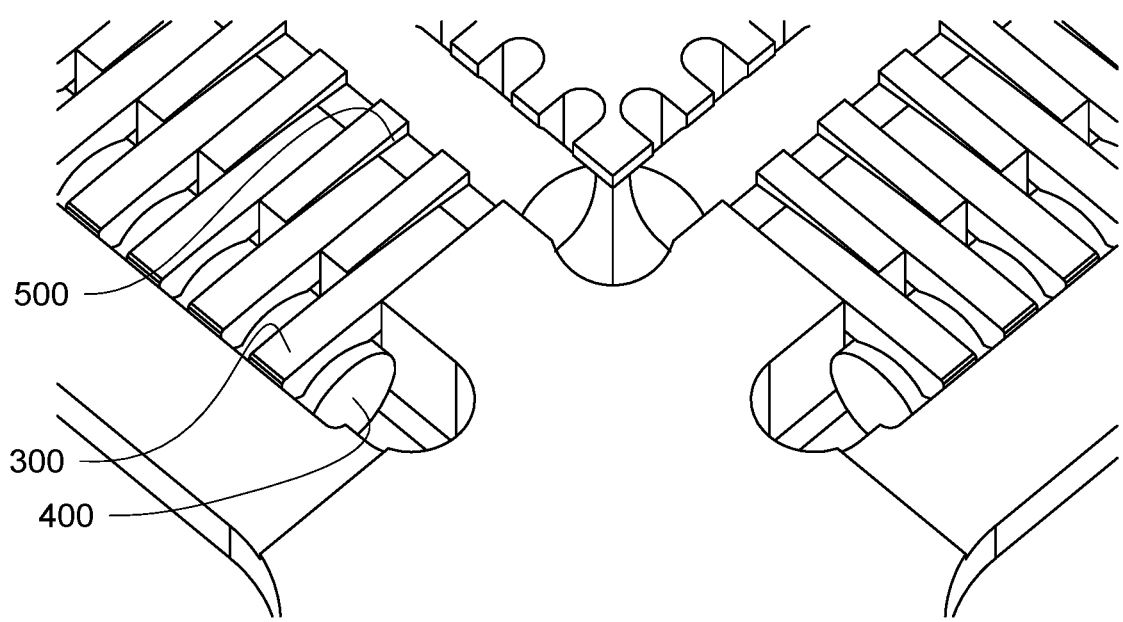
FIG. 8 is an enlarged view of the portion D of FIG. 7, according to an embodiment.

FIG. 7 is an enlarged view of the circled portion C on the second surface 120B of the contactor 120 of FIG. 6, according to an embodiment. FIG. 8 is an enlarged view of the portion D of FIG. 7, according to an embodiment. The circled portion C is the same as the circled portion A of FIG. 1C except that the circled portion C is on the second surface 120B of the contactor 120, while the circled portion A is on the first surface 120A of the contactor 120.

Figure 9:
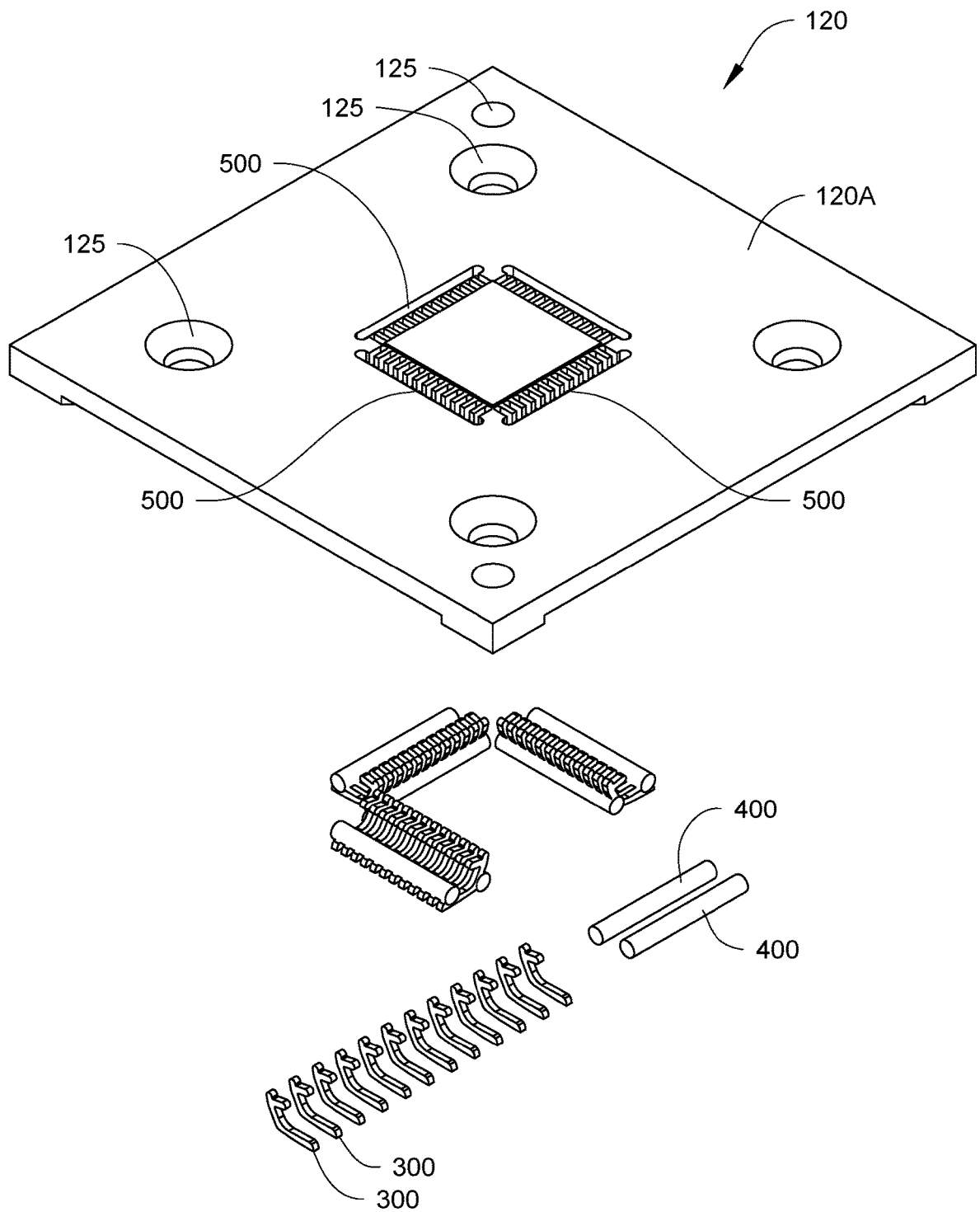
FIG. 9 is an exploded view of a contactor, according to an embodiment.

FIG. 9 is an exploded view of a contactor 120, according to an embodiment. FIG. 9 shows four groups of contactor assemblies (300, 400, 500) forming a square shape. Each group of contactor assemblies (300, 400, 500) forms an edge of the square shape and includes a plurality of contacts 300, a plurality of slots 500 each configured to receive a contact 300, and a pair of elastomers 400 shared by the group of contactor assemblies. Each contactor assembly includes a slot 500, a contact 300, and two elastomers 400 (shared by a group of contactor assemblies). It will also be appreciated that to simplify the view and to show the features clearly, for illustration purpose, in some embodiments disclosed herein, the elastomers are not shown.

Figure 10:
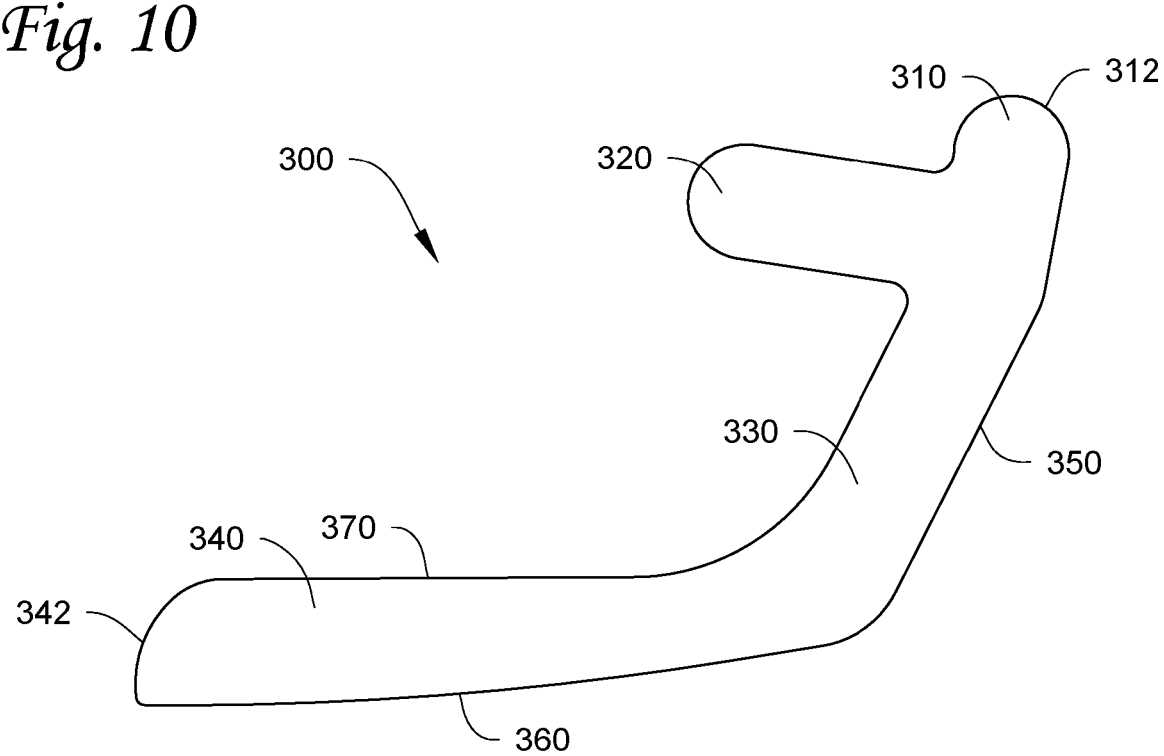
FIG. 10 is a side view of a contact of a contactor assembly of a contactor, according to an embodiment.
Figure 11:
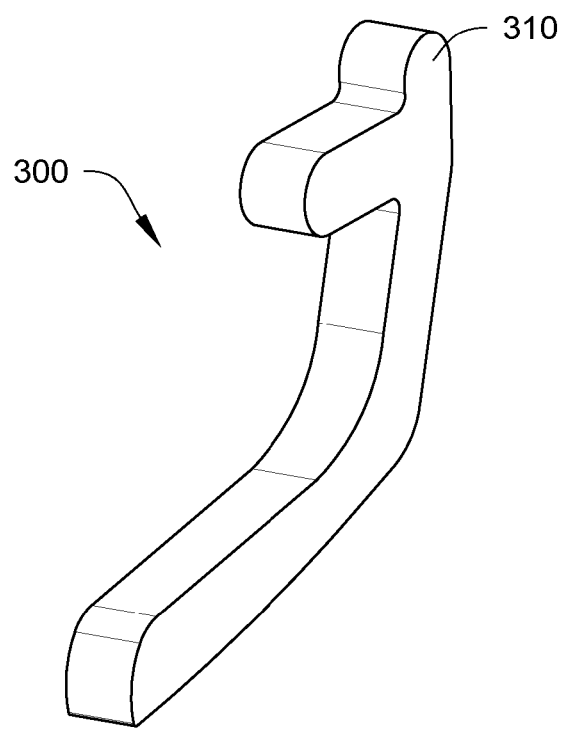
FIG. 11 is a perspective view of the contact of FIG. 10, according to an embodiment.
Figure 12:
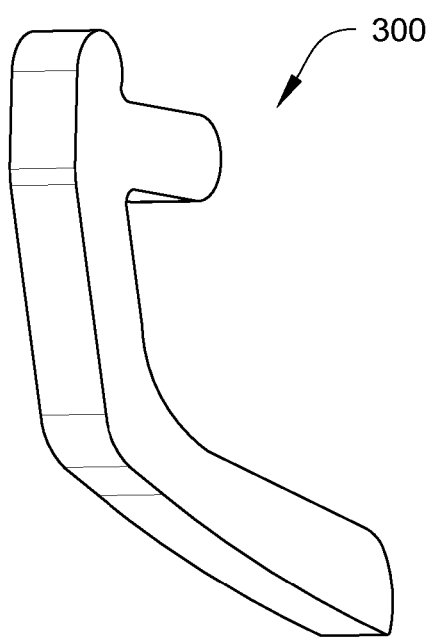
FIG. 12 is the contact of FIG. 11 viewed in a different angle, according to an embodiment.

FIG. 10 is a side view of a contact 300 of a contactor assembly (300, 400, 500) of a contactor 120, according to an embodiment. FIG. 11 is a perspective view of the contact 300 of FIG. 10, according to an embodiment. FIG. 12 is the contact 300 of FIG. 11 viewed in a different angle, according to an embodiment.

The contact 300 includes a tip 310, a body 330, and a tail 340. The tip 310 includes a tip radius 312. The tail 340 includes a tail radius 342. A contact backstop 320 protrudes from the body 330 and extends in a horizontal direction when the contact 300 is in a preload state (to be described later). In an embodiment, the contact backstop 320 is disposed closer to the tip 310 than to the tail 340. The contact may be arcuate, L or J shaped, or be any suitable shape. The contact 300 also includes a first/front elastomer interface 350, a second/rear elastomer interface 370, and a rolling radius 360. In an embodiment, when the contact 300 is installed on the load bard 130, the rolling radius 360 can be configured to roll over the surface of the load bard 130. It will be appreciated that it is preferable to minimize the protrusion length (of the contact backstop 320) in general for electrical benefits, but the length of the protrusion can be tuned to a predetermined length for best electrical performance at different frequencies. Mechanically a large skinny protrusion increases opportunity for bending defects and less yield during manufacturing due to patterning pitch increased on a material blank. A shorter protrusion is possible, as long as the contact backstop hits the housing and other contact features have clearance to the housing.

In an embodiment, the contact 300 can be made of an electrical and/or thermal conductive material or plating, or any suitable conductive material such as copper, copper alloys, nickel alloys, steels, precious metals, or the like. As shown in FIGS. 11 and 12, in some embodiments, a thickness of the tip 310 can be smaller than a thickness of other portions of the contact 300, so that debris caused by wear of the tip 310 or wear of the DUT terminal(s) can be removed through the clearance created by the smaller thickness of the tip 310. A smaller tip allows for possible positioning error tolerance.

Figure 13:
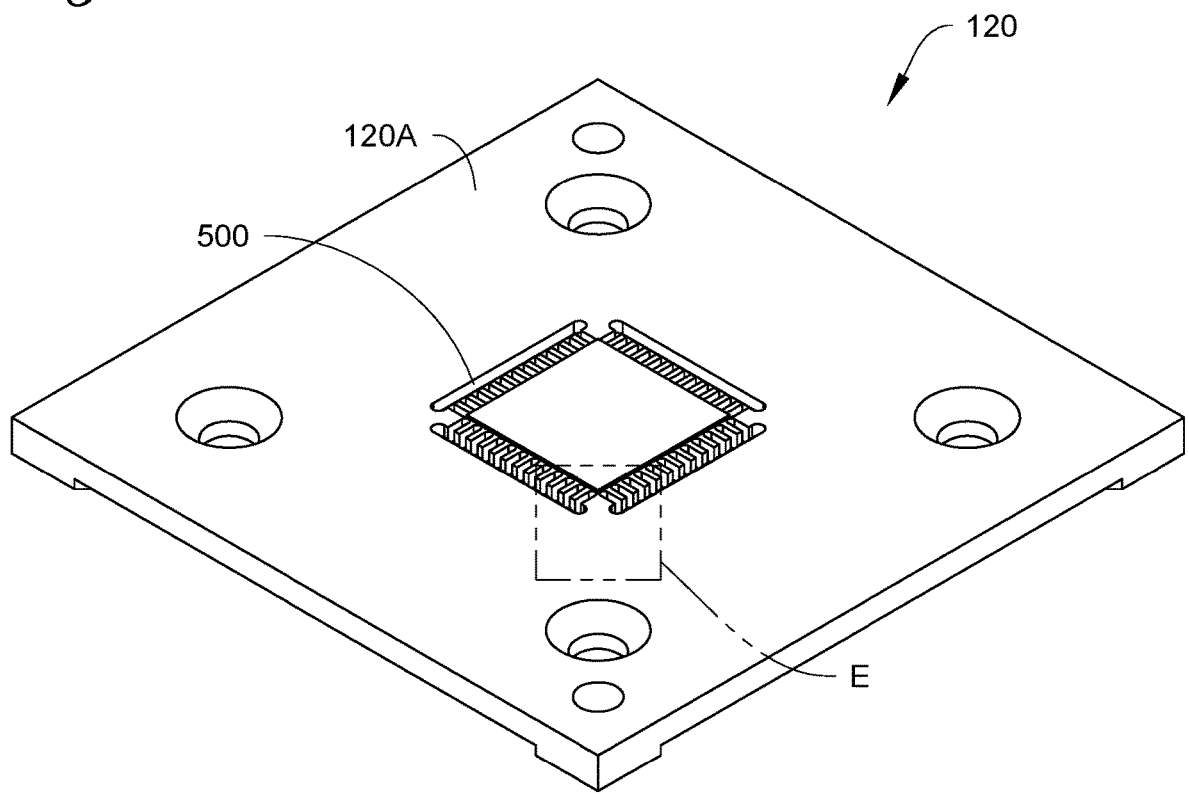
FIG. 13 is a perspective view of a contactor without the contacts and the elastomers being received in the slots, according to an embodiment.
Figure 14:
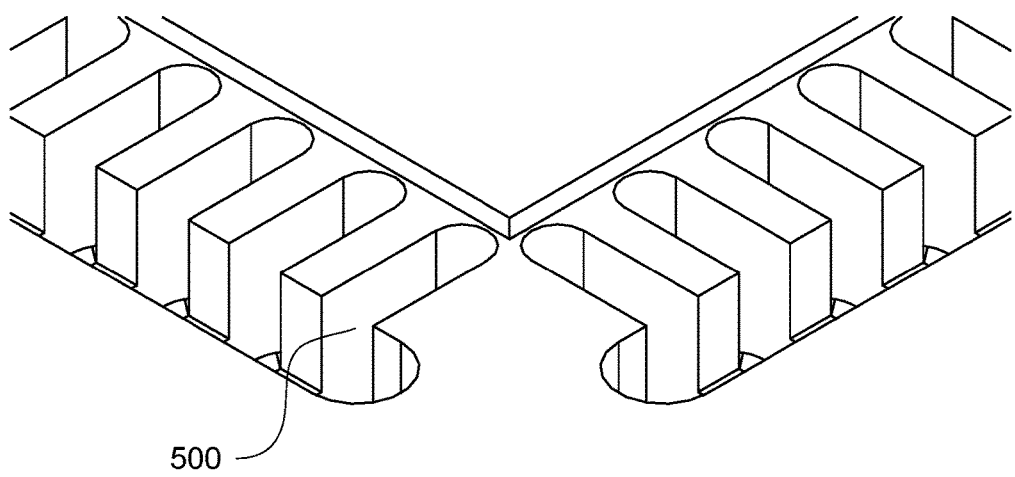
FIG. 14 is an enlarged view of the portion E of FIG. 13, according to an embodiment.

FIG. 13 is a perspective view of a contactor 120 without the contacts 300 and the elastomers 400 being received in the slots 500, according to an embodiment. FIG. 13 shows a first surface 120A of the contactor 120. FIG. 14 is an enlarged view of the portion E of FIG. 13, according to an embodiment.

Figure 15:
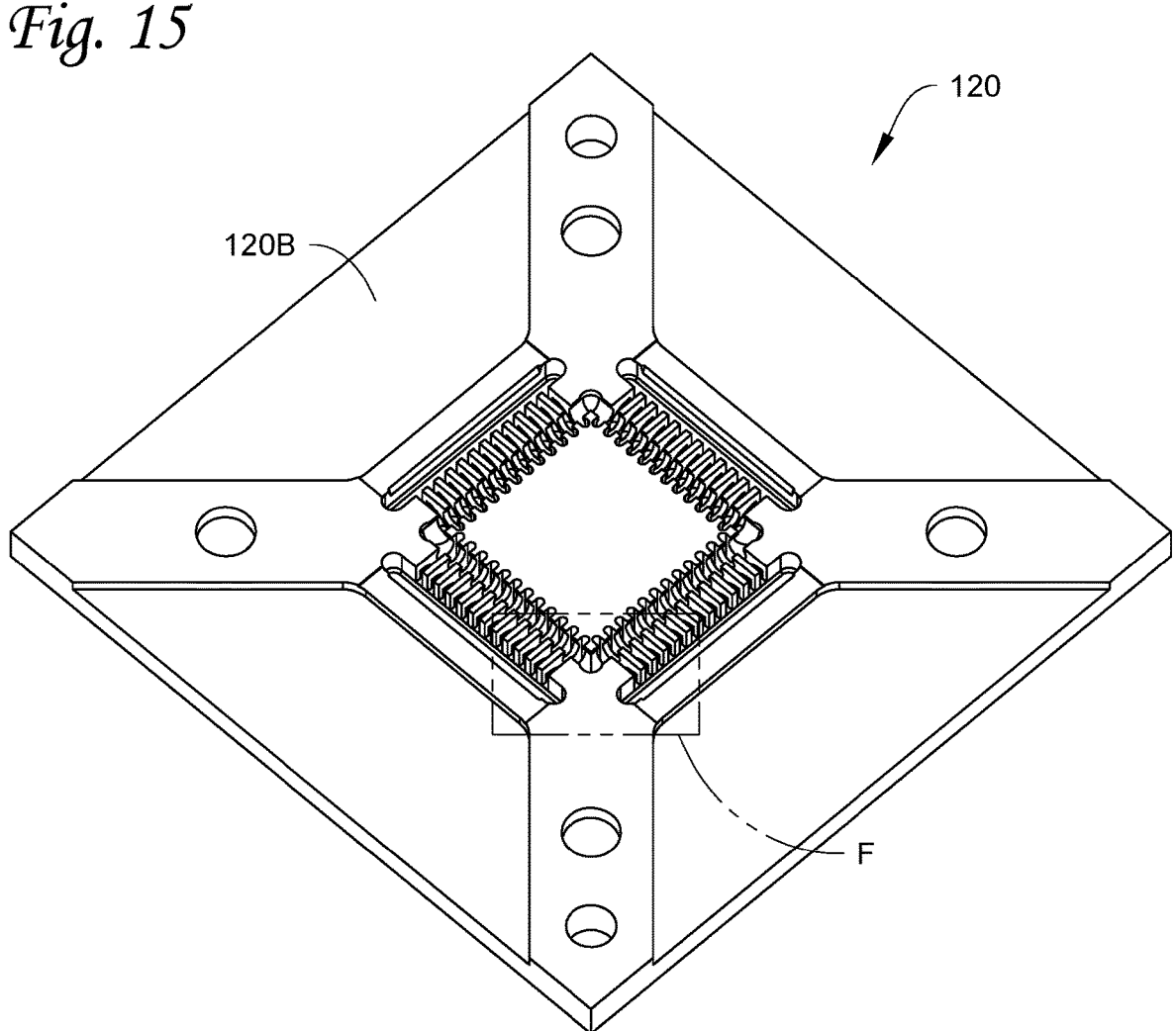
FIG. 15 is a perspective view of a contactor without the contacts and the elastomers being received in the slots, according to another embodiment.
Figure 16:
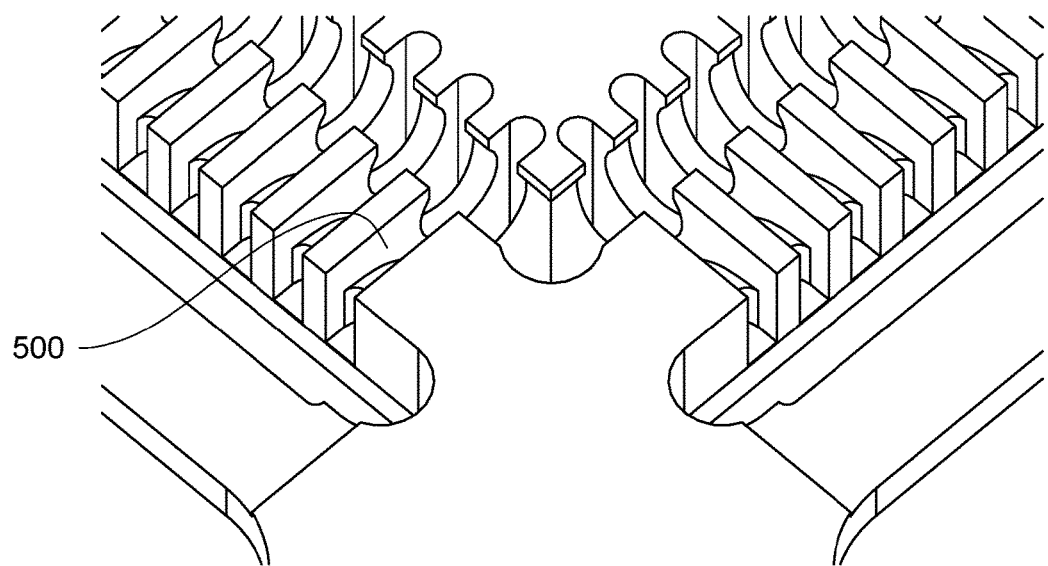
FIG. 16 is an enlarged view of the portion F of FIG. 15, according to an embodiment.

FIG. 15 is a perspective view of a contactor 120 without the contacts 300 and the elastomers 400 being received in the slots 500, according to an embodiment. FIG. 15 shows a second surface 120B of the contactor 120. FIG. 16 is an enlarged view of the portion F of FIG. 15, according to an embodiment.

Figure 17:
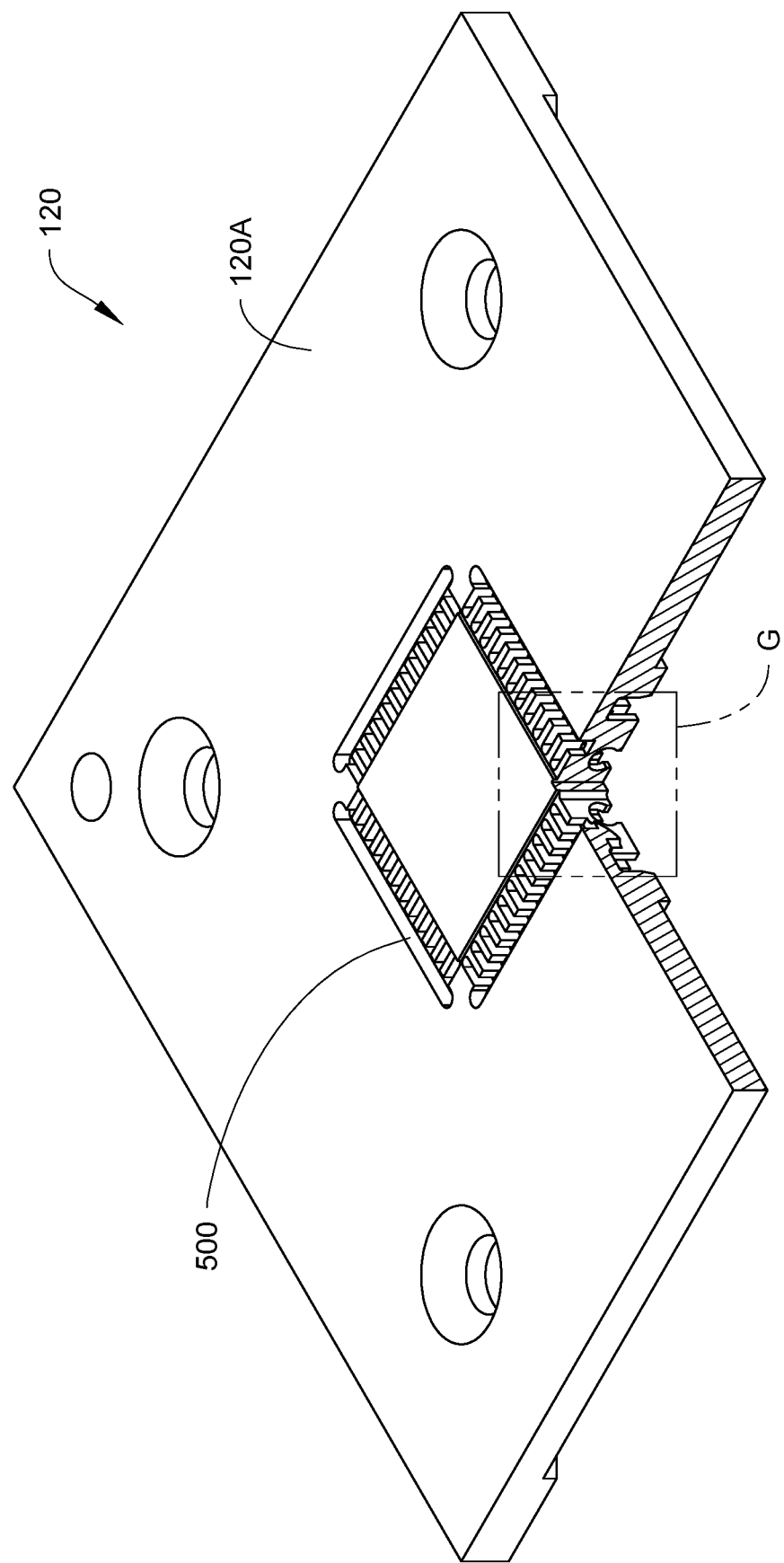
FIG. 17 is a perspective cutoff view of a contactor without the contacts and the elastomers being received in the slots, according to an embodiment.
Figure 18:
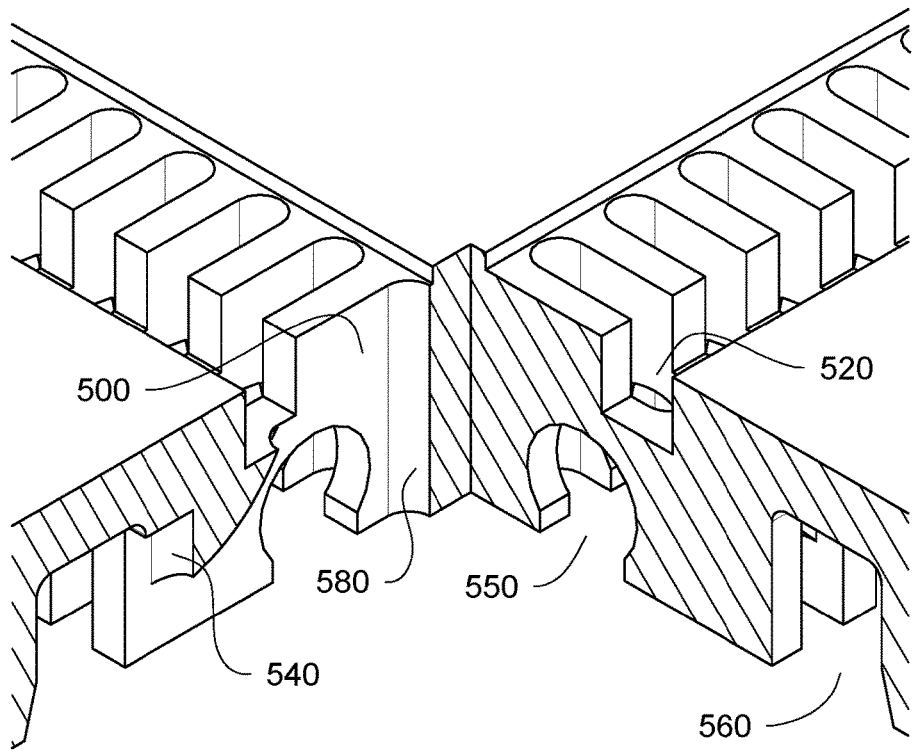
FIG. 18 is an enlarged view of the portion G of FIG. 17, according to an embodiment.

FIG. 17 is a perspective cutoff view of a contactor 120 without the contacts 300 and the elastomers 400 being received in the slots 500, according to an embodiment. FIG. 17 shows a first surface 120A of the contactor 120. FIG. 18 is an enlarged view of the portion G of FIG. 17, according to an embodiment.

Figure 19:
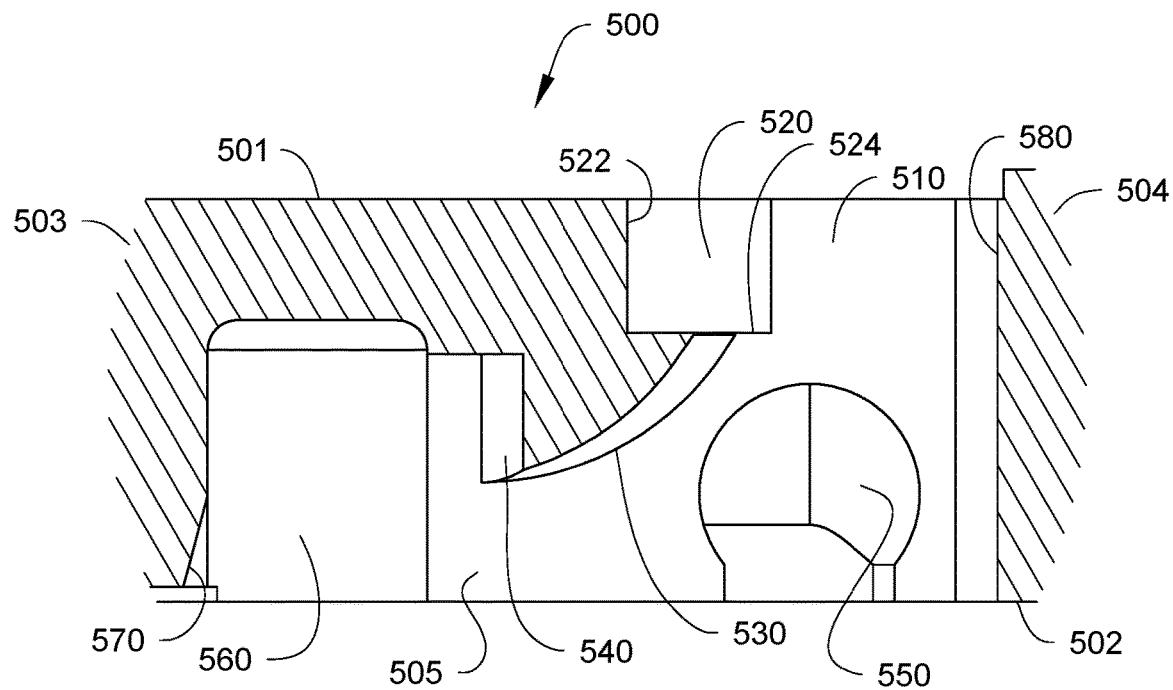
FIG. 19 is a cross-sectional view of slots of a contactor assembly of a contactor, according to an embodiment.

FIG. 19 is a cross-sectional view of slots 500 of a contactor assembly (300, 400, 500) of a contactor 120, according to an embodiment. FIG. 19 shows a middle plane cross section of the contact slot 510 of the slots 500.

The slots 500 include a top surface 501, a bottom surface 502, a first side surface 503, a second side surface 504, a first inner surface 505, and a second inner surface (not shown). The direction from the top surface 501 to the bottom surface 502 may be referred to as a height of the housing. The direction from the first side surface 503 to the second side surface 504 may be referred to as a length of the housing. The direction from the first inner surface 505 to the second inner surface may be referred to as a thickness of the housing. In an embodiment, the slots 500 can be made of plastic or any other suitable materials.

The slots 500 include a contact slot 510 configured to receive the contact 300. The slots 500 also include a backstop slot 520 configured to receive the contact backstop 320 of the contact 300. The backstop slot 520 is a recess extending from the top surface 501 in the height direction of the slots 500. As shown in FIG. 19, the backstop slot 520 includes a housing backstop 522 extending in a vertical direction (the height direction of the slots 500). The backstop slot 520 includes a support 524 extending in the length direction of the slots 500, to prevent the contact backstop 320 of the contact 300 from moving below the support 524 (to retain the contact 300 in place when the contact 300 is pushed down by the DUT 110). The backstop slot 520 includes a cavity extending in the thickness direction of the slots 500 so that the cavity of the backstop slot 520 can be shared by a group of contact assemblies.

The slots 500 further include a first elastomer slot 550 configured to receive a first elastomer 400 and a second elastomer slot 560 configured to receive a second elastomer 400. Each of the first elastomer slot 550 and the second elastomer slot 560 includes cavity extending in the thickness direction of the slots 500 for the corresponding elastomer (shared by a group of contact assemblies) to pass through.

The slots 500 also include an elastomer relief 540 disposed between the backstop slot 520 and the second elastomer slot 560, and adjacent to the second elastomer slot 560. The elastomer relief 540 is configured to allow the second elastomer 400 to expand.

The elastomer relief 540 is open to the second rear elastomer slot 560 to allow the second elastomer to expand under mechanical or thermal load. In an embodiment, the elastomer relief 540 can be a cylindrical cavity or any suitable cavity shape. The elastomer relief 540 may leave some wall thickness between contact slots to locate the second elastomer. It will be appreciated that there can be extra processing step and added cost.

The slots 500 further include a tail stop 570 configured to engage with the tail radius 342 of the tail 340 of the contact 300 to retain the contact 300 in place. The slots 500 also include a contact slot middle sweep (or relief) 530 that nearly parallels the adjacent profile of corresponding contact 300 at the preload state to provide clearance for the contact 300, to minimize removal of housing material, and to maintain housing strength. The contact slot middle sweep 530 has a curved shape and extends from a bottom of the backstop slot 520 to the elastomer relief 540 or to the second elastomer slot 560. In an embodiment, the contact slot middle sweep 530 can be a swept cylinder cut feature.

The slots 500 also include a contact slot front 580 extending in the height direction of the housing. The contact slot front 580 leaves a gap for the expansion of the first elastomer 400 due to compressive pressure on the first elastomer 400 during the preload and load states, and the expanded first elastomer 400 then interfaces with the load board 130. The first and second elastomers can be made of rubber or any suitable non-conductive material including any suitable elastic rubber-like materials such as silicone, etc.

Figure 20:
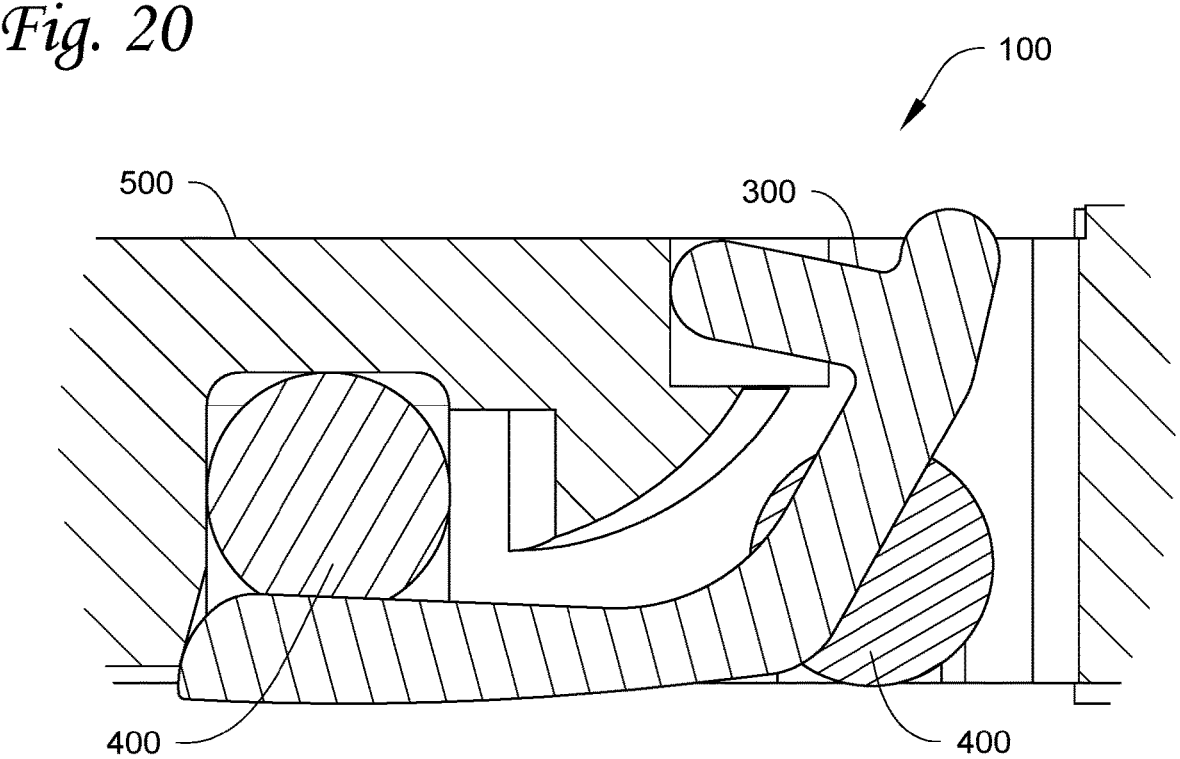
FIG. 20 is a cross sectional view of a test system having a contact assembly in a free state, according to an embodiment.
Figure 21:
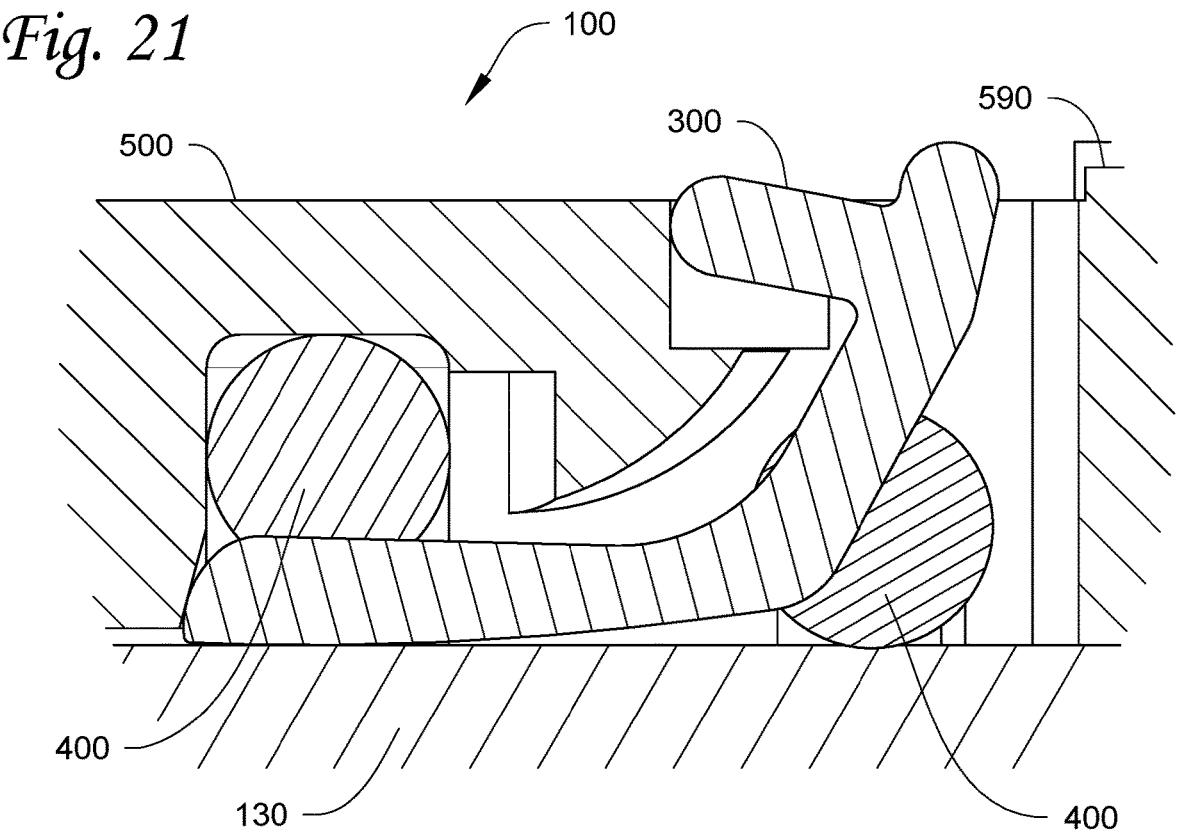
FIG. 21 is a cross sectional view of a test system having a contact assembly in a preload state, according to an embodiment.
Figure 22:
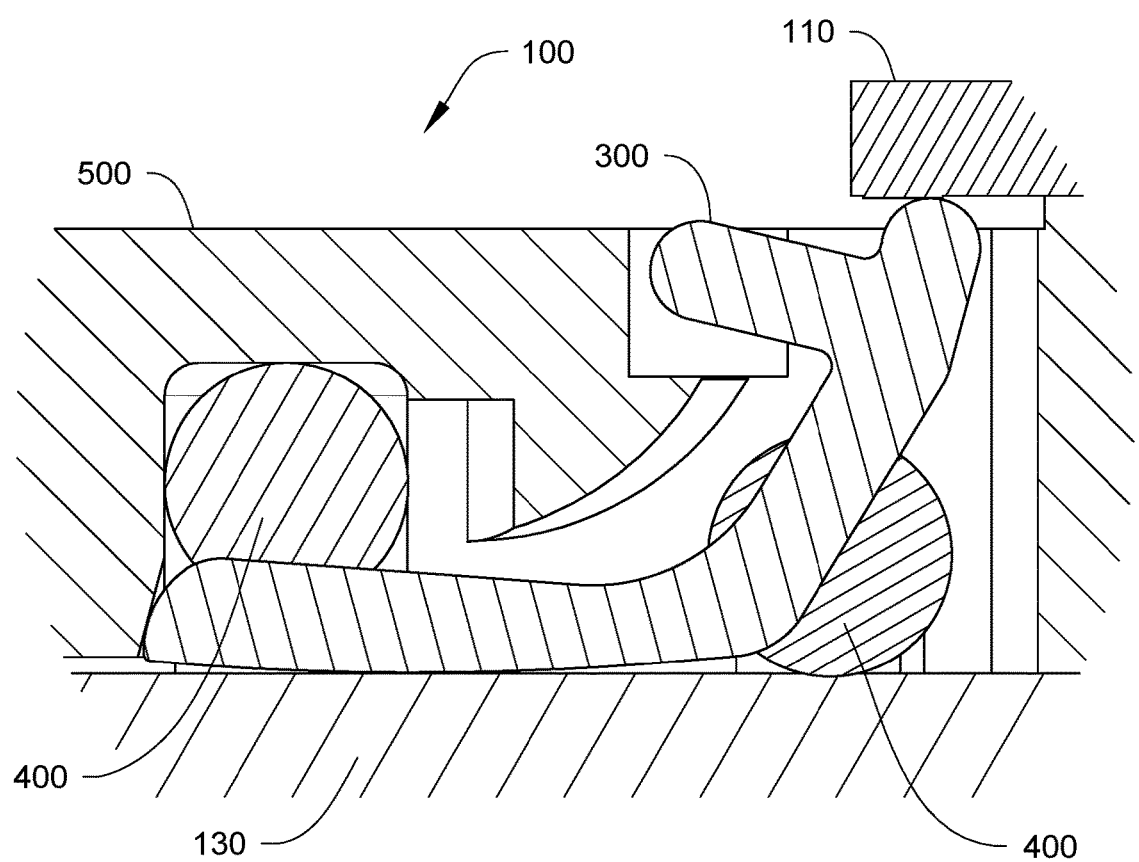
FIG. 22 is a cross sectional view of a test system having a contact assembly in an actuated state, according to an embodiment.

FIG. 20 is a cross sectional view of a test system 100 having a contact assembly in a free state, according to an embodiment. FIG. 21 is a cross sectional view of a test system 100 having a contact assembly in a preload state, according to an embodiment. FIG. 22 is a cross sectional view of a test system 100 having a contact assembly in an actuated state, according to an embodiment. FIGS. 20-22 show a middle plane cross section of the contact slot 510 with the contact 300 being received in the contact slot 510 and the first and second elastomers 400 being received in the respective first and second elastomer slots (550, 560). It will be appreciated that in FIGS. 20-22, for illustrative purpose only, the first and second elastomers 400 are shown in a nominal free state without deformation under load.

A free state of the contact 300 (or the contact assembly (300, 400, 500)) can be referred to as the contactor 120 is not attached to the test system (e.g., not attached to the DUT 110 and the load board 130), while the contact 300 and the elastomers 400 are received and retained in the slots 500. As shown in FIG. 20, in the free state, the rear/second elastomer 400 (left elastomer) pushes a portion of the tail 340 of the contact 300 out of the contact slot 520. The contact 300 is retained by the front/first elastomer 400 (right elastomer) pushing the contact backstop 320 against the housing backstop 522, and/or pushing the tail radius 342 against the tail stop 570. It will be appreciated that the contact 300 can also be retained by the support 524.

A preload state of the contact 300 (or the contact assembly (300, 400, 500)) can be referred to as the contactor 120 is installed on the load board 130 using connectors (e.g., fasteners and/or any suitable hardware). As shown in FIG. 21, in the preload state, the rear/second elastomer 400 (left elastomer) is compressed by the contact 300 and biases the contact 300 against the load board 130. The front/first elastomer 400 (right elastomer) biases the contact backstop 320 against the housing backstop 522. In an embodiment, the front/first elastomer 400 (right elastomer) can also bias the tail radius 342 against the tail stop 570 to minimize sliding on the load board 130 and extend the life of the load board 130.

The actuation of the DUT 110 vertically down into the contactor 120 makes the first touch with the contact 300 in the preload state, and sets the start location of the DUT wipe. A actuated state of the contact 300 (or the contact assembly (300, 400, 500)) can be referred to as the contactor 120 is installed on the load board 130 with contact 300 being further compressed by the actuation of the DUT 110 into the slots 500 of the contactor 120. As shown in FIG. 22, in the actuated state, the contact backstop 320 loses touch with the housing backstop 522. The front/first elastomer 400 (right elastomer) biases the contact 300 up against the DUT 110 and back towards the tail stop 570 (so that the tail radius 342 is biased against the tail stop 570). Either a hard stop 590 (see FIG. 21) of the slots 500 or any other suitable machine stop may stop the vertical motion of the DUT 110 down into the contactor 120. The actuated state sets the end location of the DUT wipe.

Figure 23A:
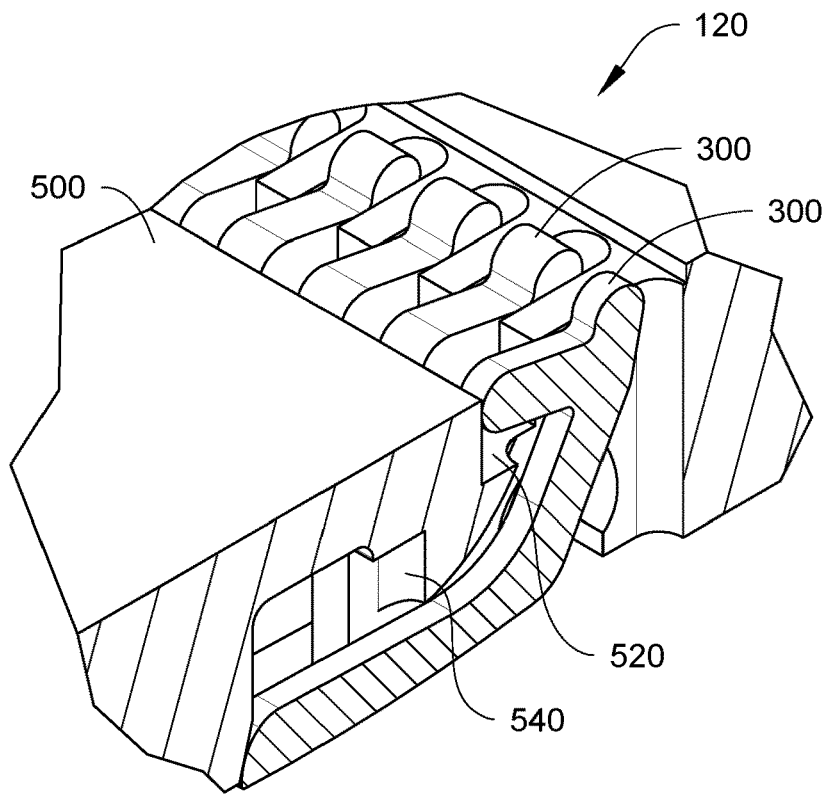
FIG. 23A is a perspective view of a portion of the contactor without the elastomers, according to an embodiment.
Figure 23B:
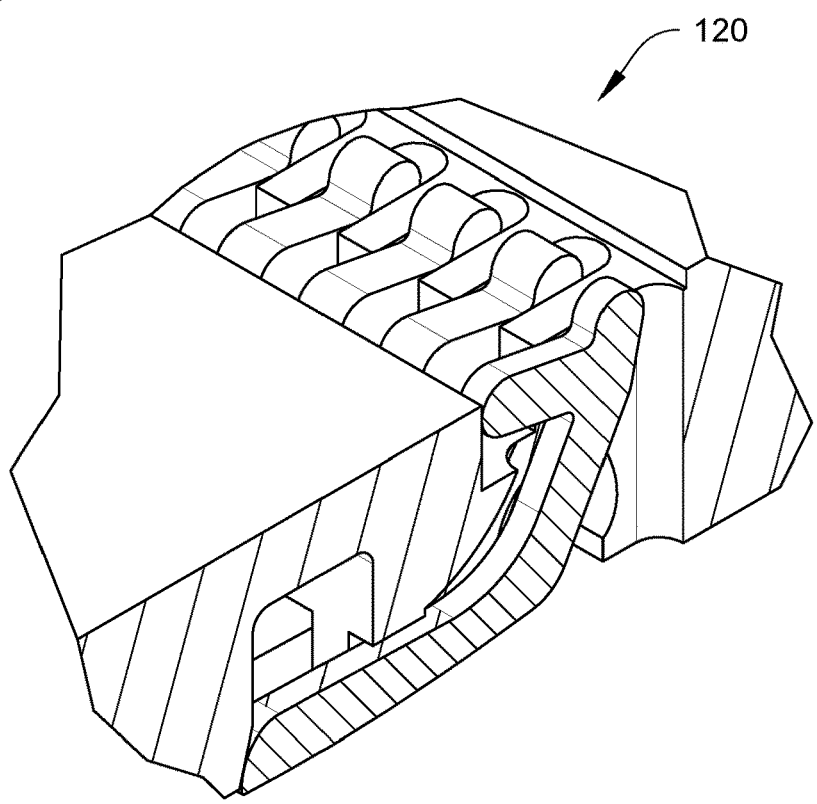
FIG. 23B is a perspective view of a portion of the contactor that omits the optional rear elastomer expansion slot.

FIG. 23A is a perspective view of a portion of the contactor 120 without the elastomers, according to an embodiment. As shown in FIG. 23A, the backstop slot 520 includes a cavity extending in the thickness direction of the slots 500 so that the cavity of the backstop slot 520 and the wall of the housing backstop 522 are shared by a group of contact assemblies. FIG. 23B is an alternate embodiment without rear elastomer expansion slot feature 540. Such design can provide simple manufacture with lower cost.

Figure 24A:
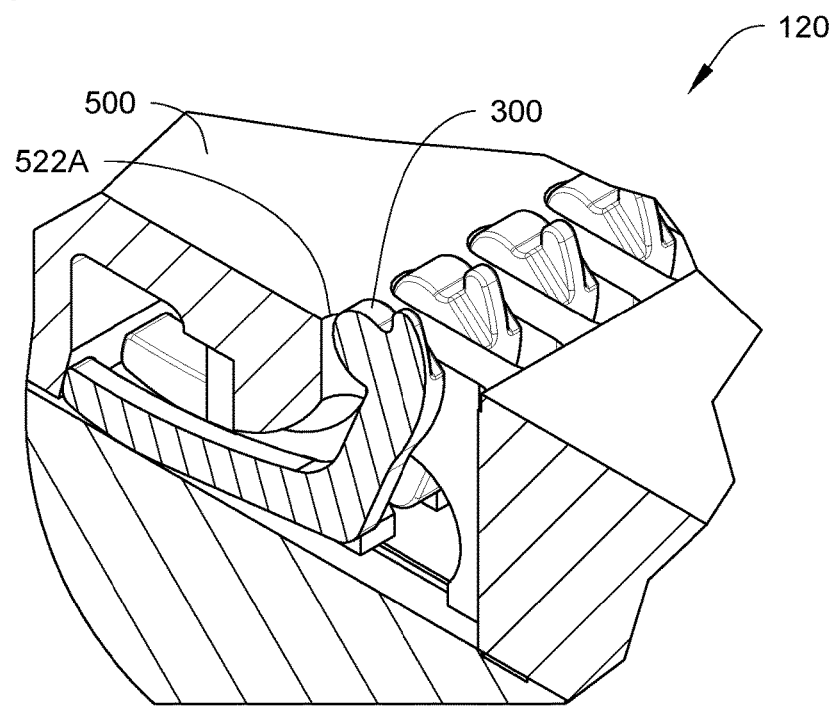
FIGS. 24A-27 illustrate various embodiments of the backstop slot and the housing backstop, according to some embodiments.

FIGS. 24A-27 illustrate various embodiments of the backstop slot and the housing backstop, according to some embodiments. FIG. 24A is a perspective view of a portion of the contactor 120 without the elastomers, according to another embodiment. FIG. 24B is a top view of FIG. 24A, according to an embodiment.

Figure 24B:
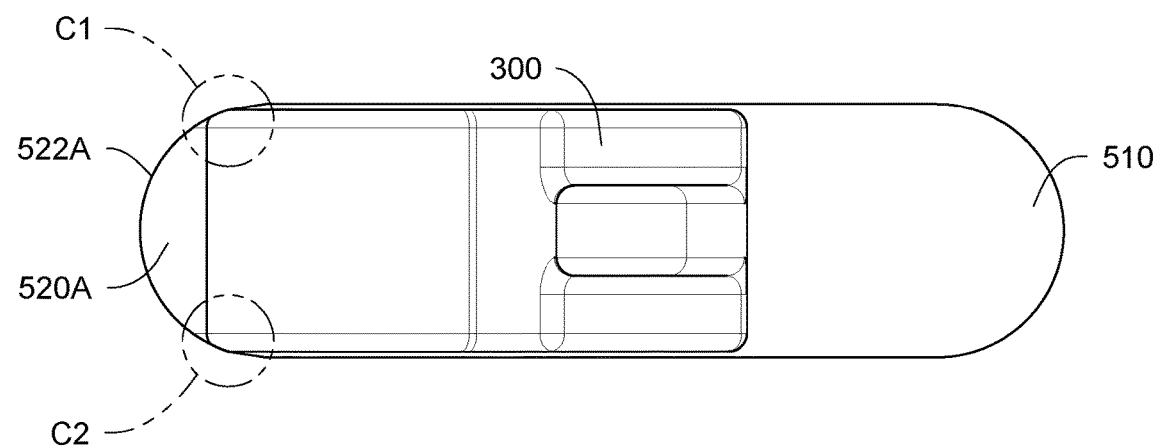

As shown in FIGS. 24A and 24B, the backstop slot 520A is not shared by other contact assemblies. Instead, the backstop slot 520A is part of the contact slot 510. In such embodiment, the housing backstop 522A is curved with a center axis of the curve or curves oriented mostly vertically. The curved shape can be a cylinder with the axis perpendicular to a bottom of the slots 500. The contact backstop 320 interacts with the housing backstop 522A at a single point or double points (C1 and/or C2) depending on the amount of asymmetry in the housing backstop 522A curve profile and contact 300 edge radius asymmetry.

In such embodiments, the contact backstop tip can protrude less from the body of the contact, yet ensures only the contact backstop tip interfaces with the housing backstop. Shorter backstop stub length can reduce signal insertion loss due to impedance changes along the electrical path length. In such embodiments, the housing backstop can be created in the same manufacturing operation as the contact slot, which may save money and decrease the position error of the backstop features and leaves the full height wall between contact slots intact, so the backstop features does not weaken the housing more than current technology. In such embodiments, the backstop in contact slot end can be easier to miniaturize since it requires minimal additional material removed from the housing.

Figure 25A:
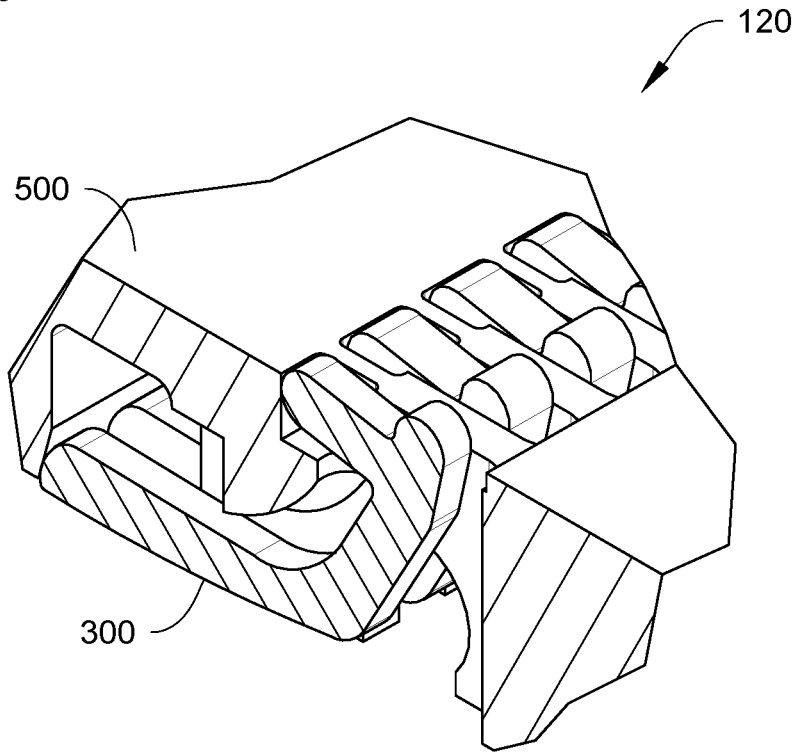
Figure 25B:
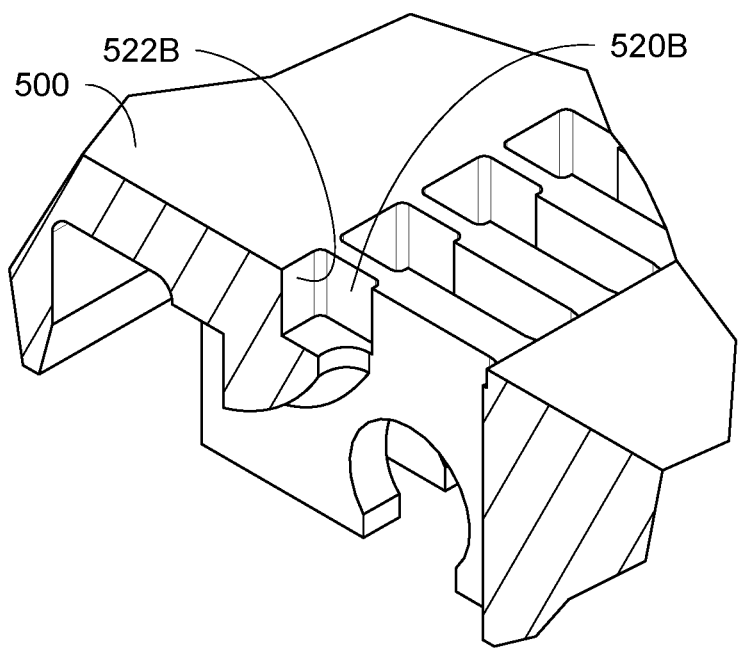

FIG. 25A is a perspective view of a portion of the contactor 120, according to yet another embodiment. FIG. 25B is shows the slots 500 of FIG. 25A, according to an embodiment.

As shown in FIGS. 25A and 25B, the backstop slot 520B is not shared by other contact assemblies. Instead, the backstop slot 520B is a squared slot (and is part of the contact slot 510) having a flat housing backstop 522B surface and is not shared with the neighbor contact assemblies. A full height and partial thickness wall remains between contact slots 510 (or backstop slots 520B) of the contact assemblies. It will be appreciated that the flat surfaces of the housing backstop 522B may be wider than the thickness of the contact 300.

Figure 26A:
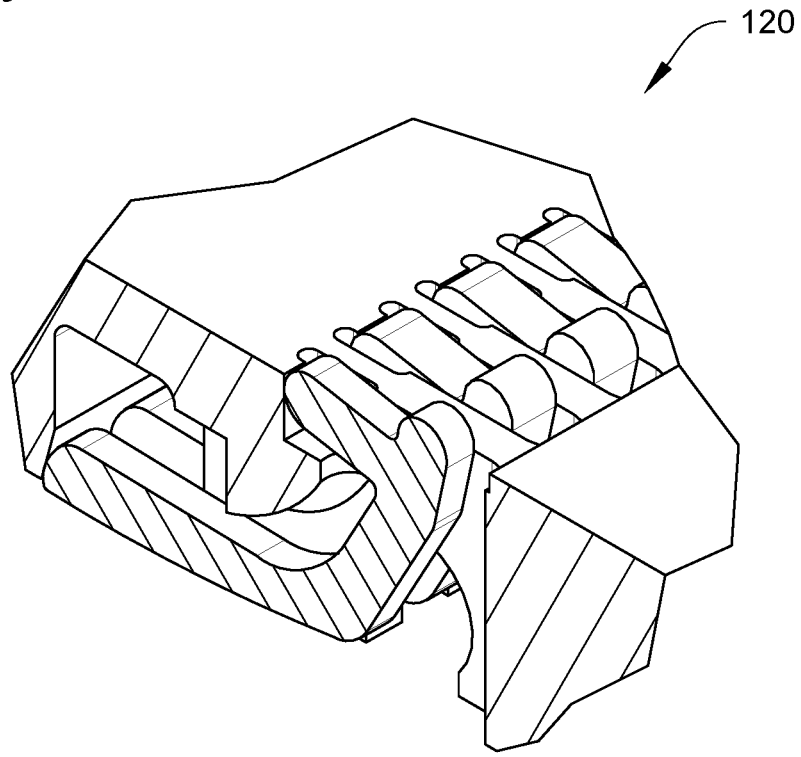
Figure 26B:
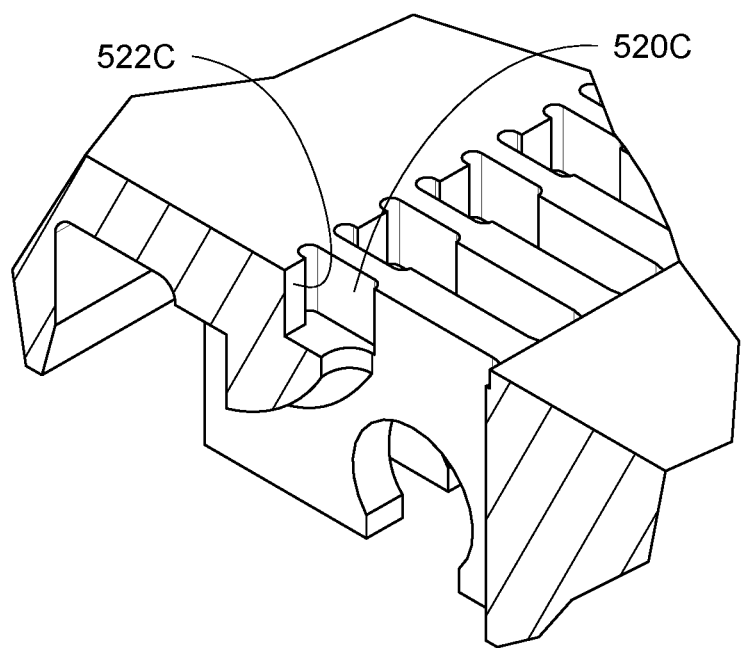

FIG. 26A is a perspective view of a portion of the contactor 120, according to yet another embodiment. FIG. 26B is shows the slots 500 of FIG. 26A, according to an embodiment.

As shown in FIGS. 26A and 26B, the backstop slot 520C is not shared by other contact assemblies. Instead, the backstop slot 520C is a squared slot (and is part of the contact slot 510) having a flat housing backstop 522C surface with relieved corners such that the backstop slot 520C is not shared with neighbor contact assemblies. A full height and partial thickness wall remains between contact slots 510 (or backstop slots 520C) of the contact assemblies.

Figure 27:
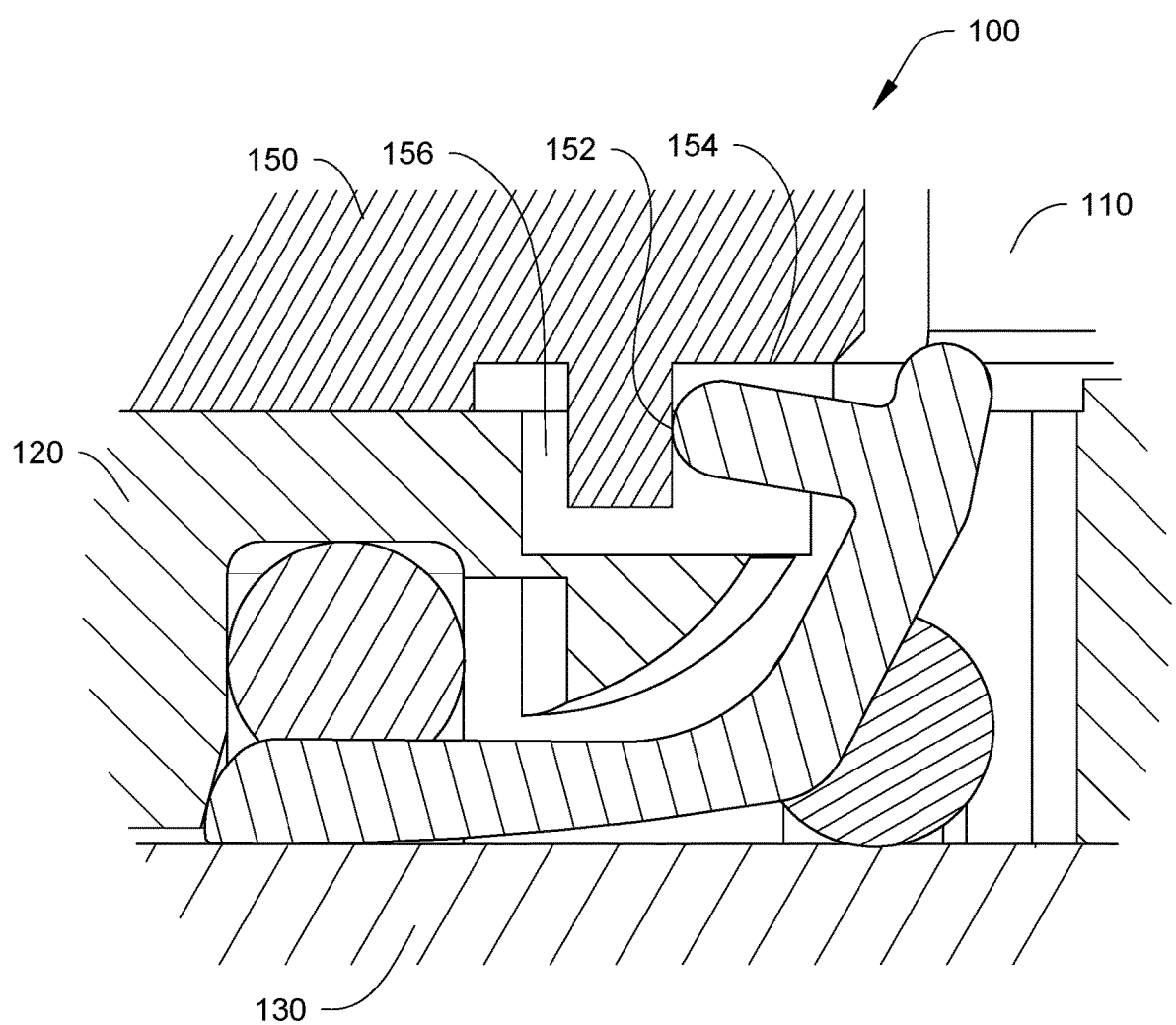

FIG. 27 is a cross sectional view of a portion of the test system 100, according to another embodiment. The test system includes an alignment plate 150. In an embodiment, the contactor 120 has alignment features such as holes or edge patterns located in the area between alignment plate 150 and load board 130 that provide for precise alignment of contactor 120 with corresponding projecting features on alignment plate 150.

The alignment plate 150 can preferably be configured to provide the DUT 110 locating to the contactor 120. Additionally, the backstop feature 152 can move from the slots 500 of the contactor 120 to the alignment plate 150 as shown in FIG. 27. Also the alignment plate 150 can optionally have contact 300 retention feature 154 that extends over the contact backstop 320 to prevent pulling the contact 300 out from the top of the slots 500 when the alignment plate 150 is preferably attached to the contactor 120. Such feature may have clearance 156 to the contact 300 in the free state, but contain the contact 300 when pulled towards the DUT 110. It will be appreciated that the alignment plate 150 can be any suitable feature such as a feature of the contactor 120 that aligns the perimeter of the DUT 110 to the contactor 120, and thus positions the DUT leads to individual contacts.

In such embodiments, the stack up of dimensions between the DUT edge and the contact tip can be reduced for more accurate placement of the contact tip on the DUT.

FIGS. 28, 29, 30A, 30B illustrate various embodiments of the slots, according to some embodiments.

Figure 28:
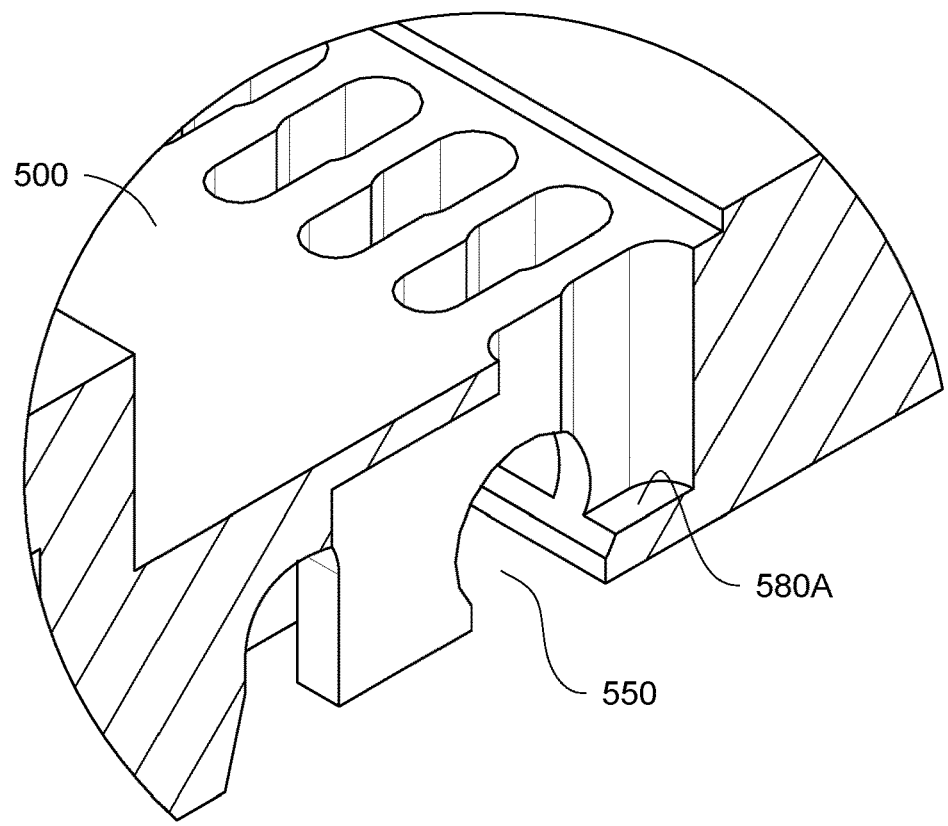
FIGS. 28, 29, 30A, 30B illustrate various embodiments of the slots, according to some embodiments.

FIG. 28 is a perspective view of slots 500, according to another embodiment. In FIGS. 19, 23A, and 23B, the contact slot front 580 protrudes (in the horizontal or length direction) past the first/front elastomer (right elastomer) slot 550 toward a side of the slots 500 (or a side wall of the housing), which leaves a gap for the expansion of the first elastomer 400 due to compressive pressure on the first elastomer 400 during the preload and load states, and the expanded first elastomer 400 then interfaces with the load board 130. As shown in FIG. 28, a shelf 580A is added below the front (right) of the first/front elastomer 400. The shelf 580A includes a flat plane mostly horizontal below the first elastomer 400. The shelf 580A is partially under the first elastomer 400 to maintain the capability to install the first elastomer 400 through the bottom of the slots 500.

In such embodiments, the housing gap can be reduced due to elastomer pushing housing onto the load board during contact loading, and housing separating the elastomer from the load board during preload. It will be appreciated that manufacturing costs may be higher as extra processing is required to form a shelf, and it may reduce space for elastomer expansion that makes for increased non-linear forces, which makes force more sensitive changes in size due to temperature and tolerance fluctuation of the elastomer.

Figure 29:
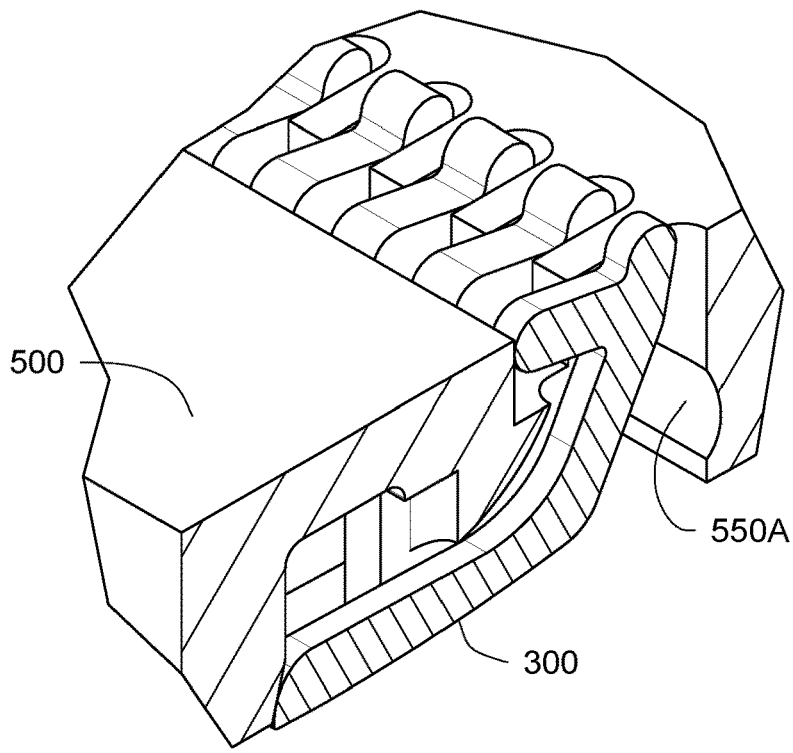

FIG. 29 shows a perspective view of slots 500 (receiving a contact 300), according to another embodiment.

Compared with FIGS. 19, 23A, and 23B, in FIG. 29, the front elastomer slot 550A is modified to a solid front elastomer slot to reduce housing gap by leaving housing material below the first elastomer 400 and the contact 300. With the front elastomer slot 550A, elastomer forces can push the slots 500 down towards the load board 130 during the preload and load state, then the solid front elastomer slot 550A can reduce the housing bow (i.e., the separation of the slots 500 and the load board 130). In an embodiment, the front elastomer slot 550A can extend in the thickness direction of the slots 500 and be shared with a group of contactor assemblies.

In such embodiments, the housing gap can be reduced and it is easy to manufacture.

Figure 30A:
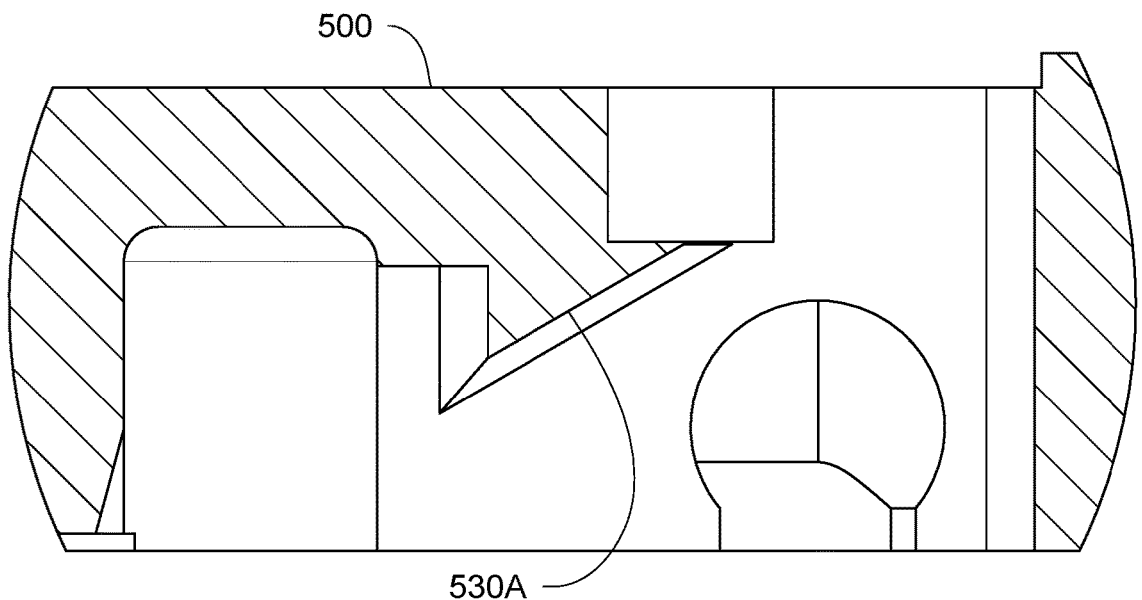
Figure 30B:
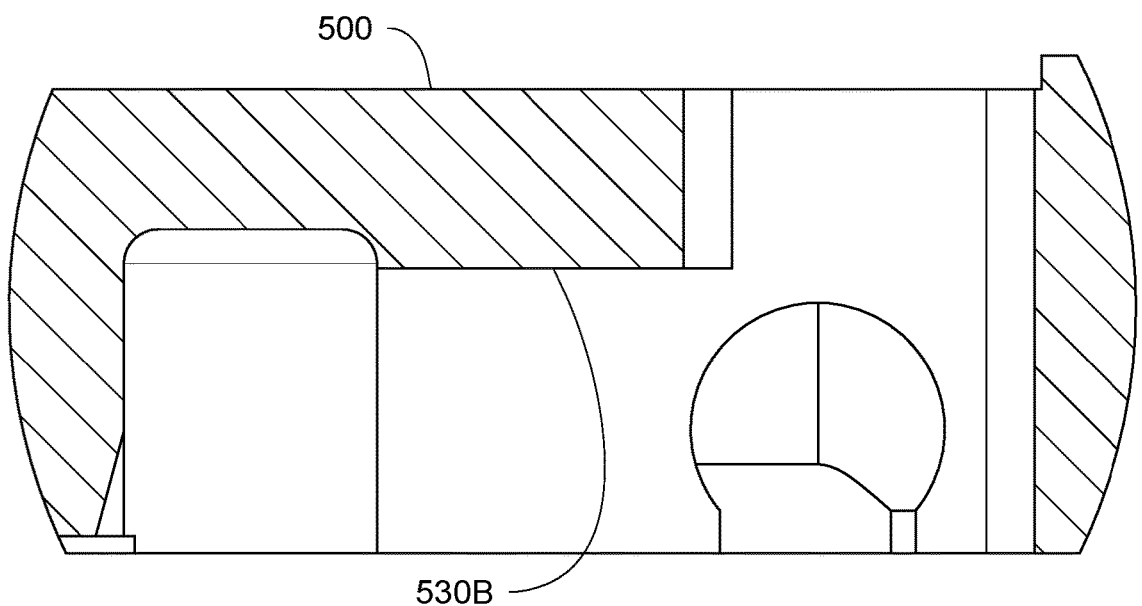

FIGS. 30A and 30B are cross sectional views of slots 500, according to some other embodiments.

Compared with FIGS. 19, 23A, and 23B, in FIGS. 30A and 30B, the swept geometry of the contact slot middle sweeps (530A, 530B) is not restricted to parallel the contact 300, nor does the radius or shape of the cross section of the contact slot middle sweeps (530A, 530B) matter significantly as long as there is clearance to the contact 300 in the preload state, and the slots 500 can withstand repeated DUT 110 insertion cycles.

Figure 31:
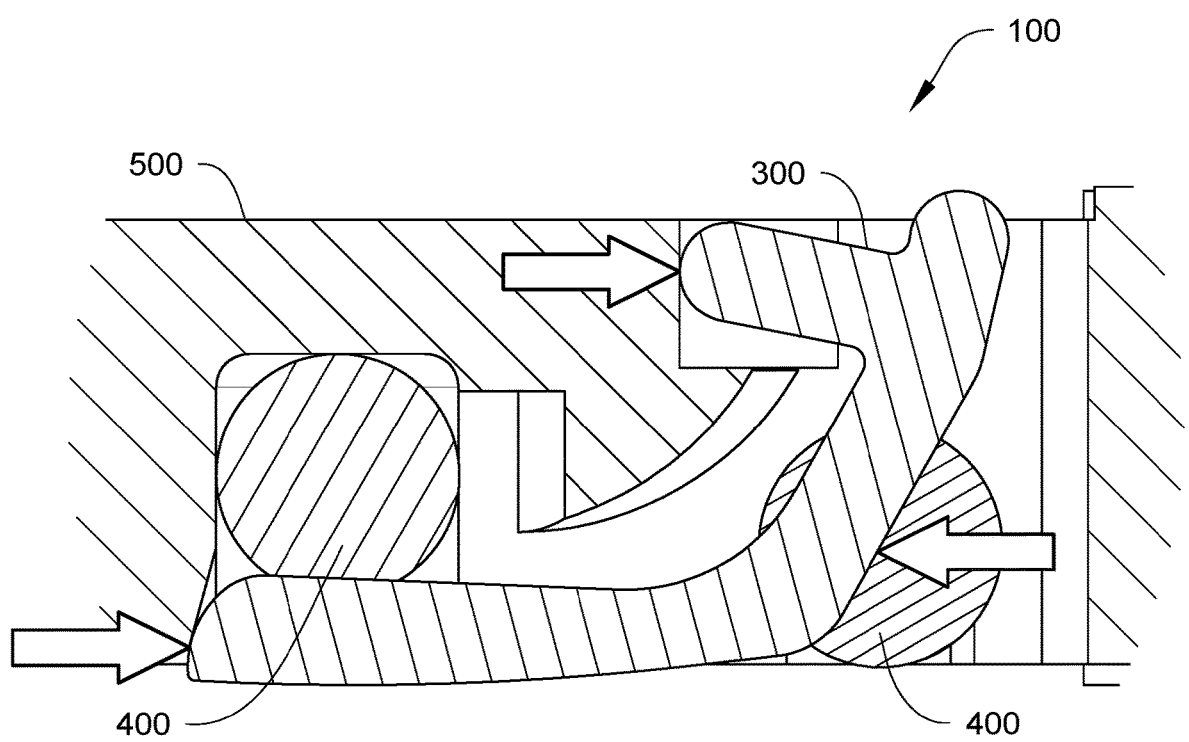
FIG. 31 is a cross sectional view of a test system showing horizontal reaction forces, according to an embodiment.

FIG. 31 is a cross sectional view of a test system 100 showing horizontal reaction forces (see arrow blocks), according to an embodiment.

As shown in FIG. 31, the horizontal components (slots 500 and the first/front/right elastomer 400) of reaction forces on the contact 300 show how the first/front/right elastomer 400 provides the force to locate the contact 300 against the housing tail stop 570 and housing backstop 522. It will be appreciated that to locate the contact 300, the elastomer horizontal force may be below the contact backstop 320 interface and above the contact tail radius 342 interface.

As shown in FIG. 31, the contact backstop 320 protrudes from the body 330 of the contact 300 to ensure the body 330 of the contact 300 has clearance to the housing features that may set the position of the contact 300 along the length of the contact slot 510. The contact backstop 320 interfaces with the housing backstop 522 to set position of the contact tip 310 on the DUT 110 pad. The vertical location of the backstop interface (between the contact backstop 320 and the housing backstop 522) vertically above a center of elastomer horizontal force on the contact 300, in combination with the horizontal center of force above the contact tail 340 interface ensures that the contact 300 interfaces with the housing backstop 522 in the preload state. The protrusion of the contact backstop 320 ensures that the contact 300 is wider above the first/front/right elastomer 400 interface than below, so the contact 300 to the first/front/right elastomer 400 forces increase as the contact 300 is pulled down, preventing the contact 300 from dropping out of the contactor 120 when in the free state.

In such embodiment, the size of the contact backstop protrusion can be longer to allow clearance to the housing below the backstop.

In other embodiments, there can be contact radius variations. Smaller radius can improve electrical performance by allowing a smaller electrical stub off the main electrical conducting body of the contact 300.

In yet other embodiments, there can be contact shape variations. The contact backstop 320 is not limited to a cylindrical shape, any suitable shape may work with the optimal shapes limiting the interface to a single line or point to optimally control the vertical location of the contact 300.

In yet other embodiments, there can be protrusion on slots 500 and flat on contact 300. A nearly vertical flat can be put on the contact 300 and a backstop protrusion on the slots 500.

Figure 32:
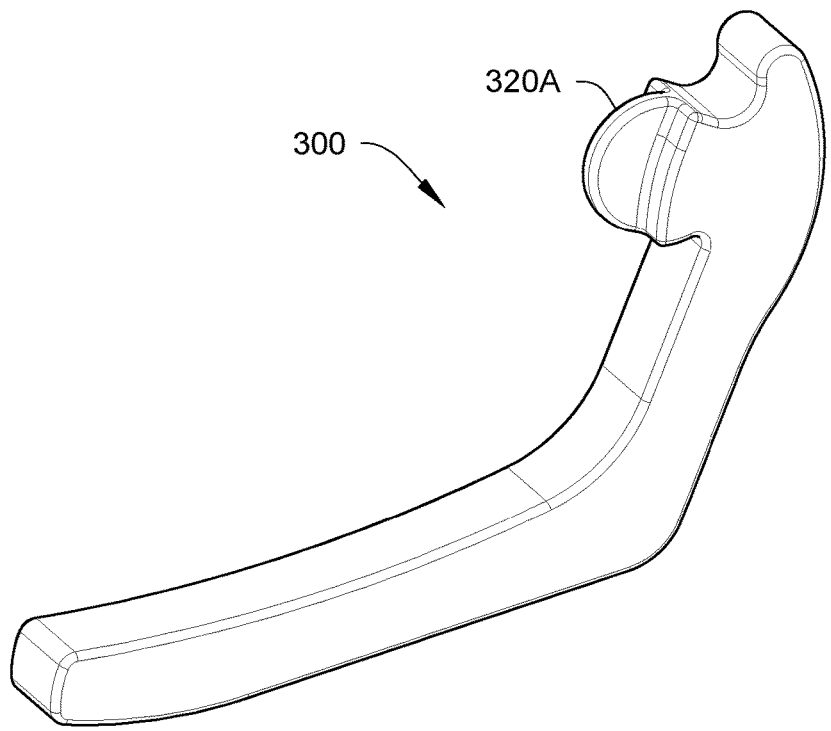
FIG. 32 is a perspective view of a contact with a fine tip backstop, according to another embodiment.
Figure 33:
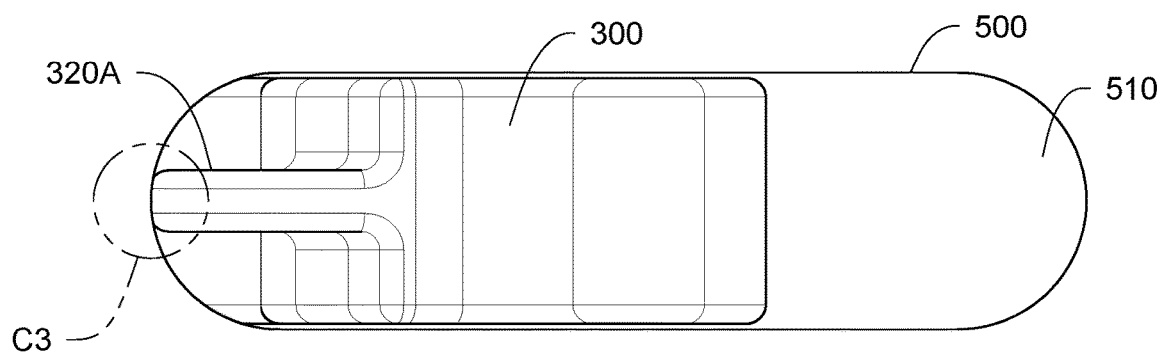
FIG. 33 is a top view of the contact of FIG. 32 received in the slots, according to an embodiment.

FIG. 32 is a perspective view of a contact 300 with a fine tip backstop 320A, according to another embodiment. FIG. 33 is a top view of the contact 300 of FIG. 32 received in the slots 500, according to an embodiment.

The fine tip backstop 320A (that has a thickness smaller than a thickness of the rest part of the contact backstop 320) can combine with the housing backstop (see 522A of FIG. 24B) with backstop 522A in contact slot 510 end to fit in the contact slot 510 end at a shallower angle than the full thickness contact backstop. Such embodiment can wear slower and have better positioning than a full thickness contact backstop with the increased angle between the tangent plane through the two point interfaces C3. Due to the contact backstop 320A interfacing at a lower tangent angle with the rounded end of the housing contact slot 510, then contact 300 width fit in contact slot 510 and contact width error have reduced impact on the location of the contact tip 310 on the DUT 110 pad in the rolling direction. It will be appreciated that the backstop stub 320A is an electrical stub, and electrical performance over some frequencies can be improved by controlling the volume of the electrical stub.

Embodiments disclosed herein provide a backstop which can be a mostly vertical and flat face that is nearly perpendicular to the contact width middle plane (see e.g., FIGS. 23A and 23B). The backstop can act as a stop to set the contact position when the contactor is mounted to a load board and the contact is in the preload state. The contact can be simultaneously constrained by the load board, usually the tail stop, and elastomers which are preloaded on the contact, housing elastomer slots, and optionally the load board. The contact backstop (see e.g., FIGS. 23A and 23B) can be designed to extend out from the contact body with clearance to ensure that only the back stop tip interacts with the backstop. Additionally, the contact backstop to housing backstop interface can be primarily linear.

Embodiments disclosed herein can provide improved contact tip positioning ability relative to the edge of the DUT. For example, due to preload forces of the elastomer on the contacts and the flexibility of the housing material and the load board, the housing and the load board nearly translate apart, causing the backstop to translate mostly vertically away from the load board. Since the housing backstop face is vertical, the vertical translation of housing in the contact slot area has minimal effect on the position of the backstop in the horizontal direction relative to the DUT. With housing flex the housing tail stop can also translate nearly vertically, due to the angular components of the housing tail stop face, the magnitude of the horizontal positional error of the contact tail interface can be a function of the angle of tail stop. With the vertical backstop, the tail angle can be the larger component of error for horizontal contact tip positioning variation. Embodiments disclosed herein can also ensure that manufacturing is simple with a shared backstop slot between adjacent contacts. For example, the back face of the tail stop is the critical surface requiring tightest positional control to set contact tip position, with the width of the slot or location of the front of the slot providing tooling clearance and removal of material in the transition of the contact slot to the vertical backstop slot to ensure the contact slot is full width throughout the contact interface.

Embodiments disclosed herein can provide a contact slot front protruding past the front elastomer slot, which leaves a gap for the expansion of elastomer due to contact pressure on the elastomer during the preload and load states. The expanded elastomer then interfaces with the load board.

Figure 34A:
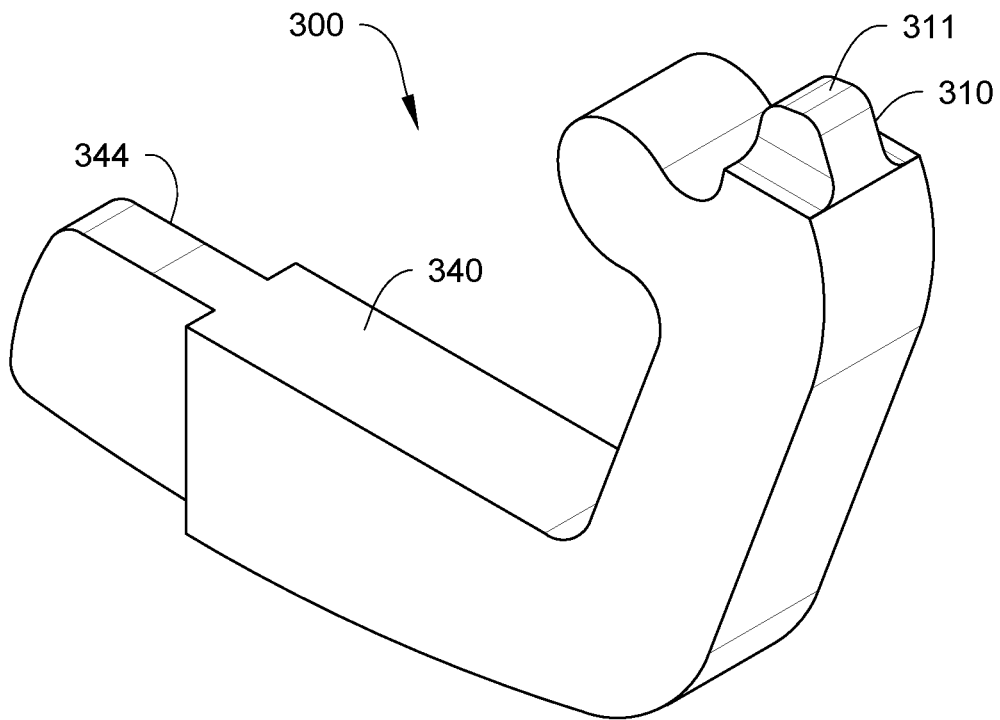
FIG. 34A is a perspective view of a contact with a stepped tail thickness, according to another embodiment.

FIG. 34A is a perspective view of a contact 300 with a stepped tail thickness, according to another embodiment. The tail 340 of the contact 300 includes a tail tip 344. The tail tip 344 has a stepped tail thickness. That is, a thickness of the tail tip 344 is different from, preferably smaller than, a thickness of the rest of the tail 340. It will be appreciated that such embodiment uses less materials that are not in the electrical path of conduction, which may beneficial for electrical flow and/or impedance control. In an embodiment, the contact tip 310 of the contact 300 can include a tip end 311. The tip end 311 has a stepped end thickness. That is, a thickness of the tip end 311 is smaller than a thickness of the rest of the contact tip 310. This area of different thickness extends from the distal end of the contact to a point toward the area where the contact changes direction (area of curvature).

Figure 34B:
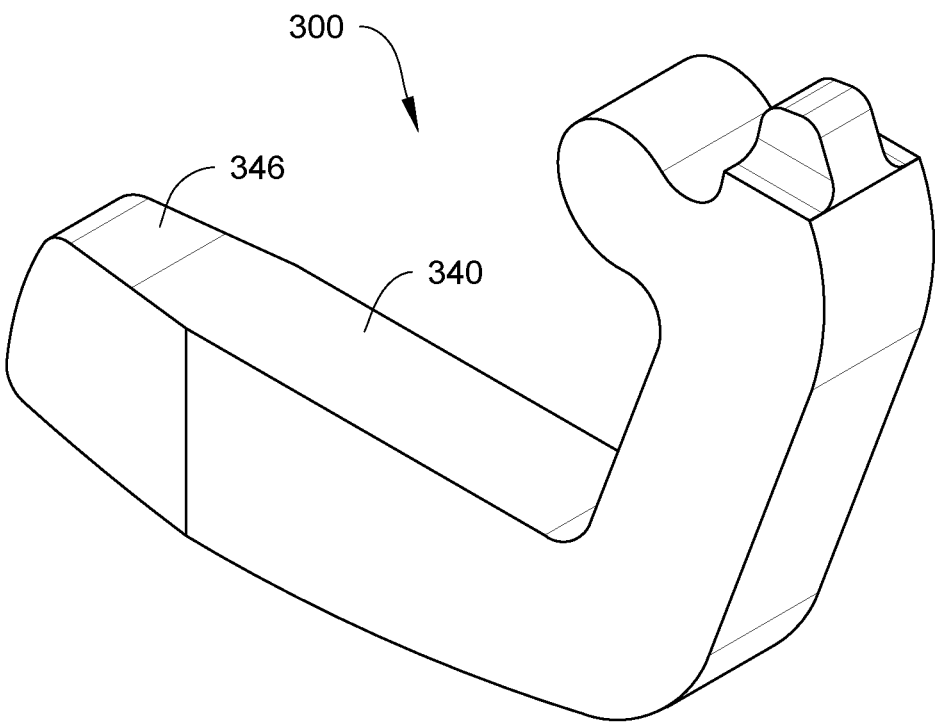
FIG. 34B is a perspective view of a contact with a taper tail thickness, according to yet another embodiment.

FIG. 34B is a perspective view of a contact 300 with a tail which has a tapered thickness instead of a stepped thickness, according to yet another embodiment. The tail 340 of the contact 300 includes a tail tip 346. The tail tip 346 has a tapered tail thickness. That is, the tail tip 346 has diminished or reduced thickness toward an end that is away from the rest of the tail 340. This area of different thickness extends from the distal end of the contact to a point toward the area where the contact changes direction (area of curvature).

It will be appreciated that such embodiment uses less materials that are not in the electrical path of conduction, which may be beneficial for electrical flow and/or impedance control.

Figure 35A:
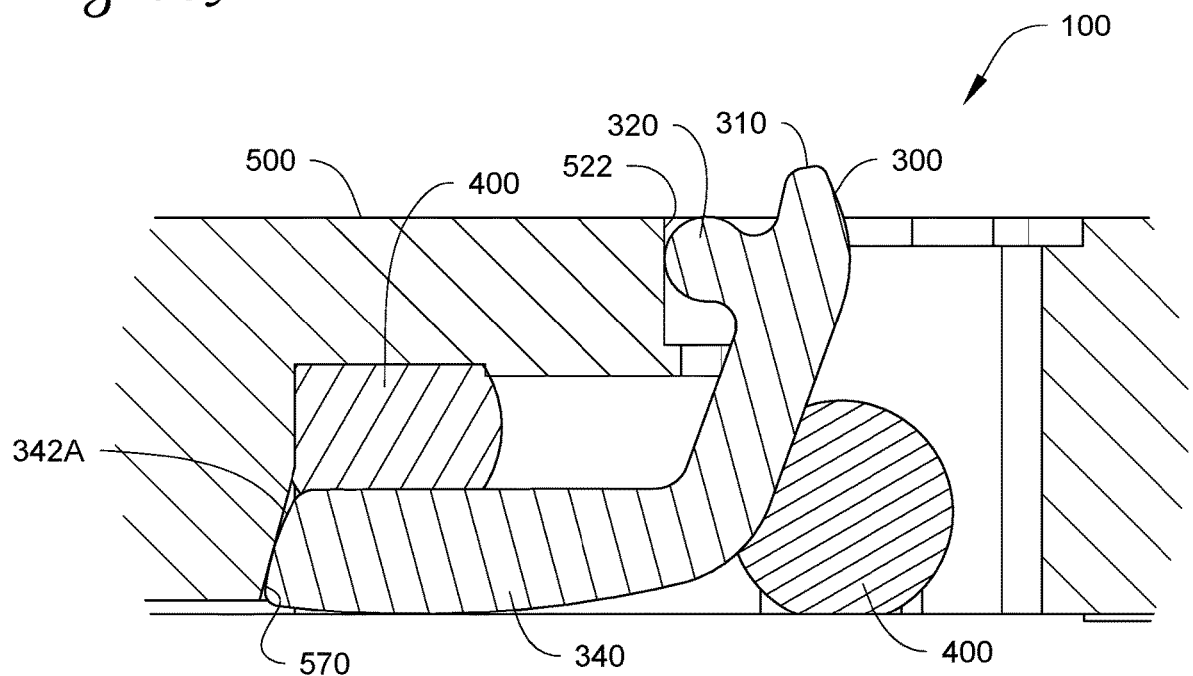
FIGS. 35A-35Q are cross sectional views of a test system having a contact assembly in a preload state, according to some embodiments.
Figure 35B:
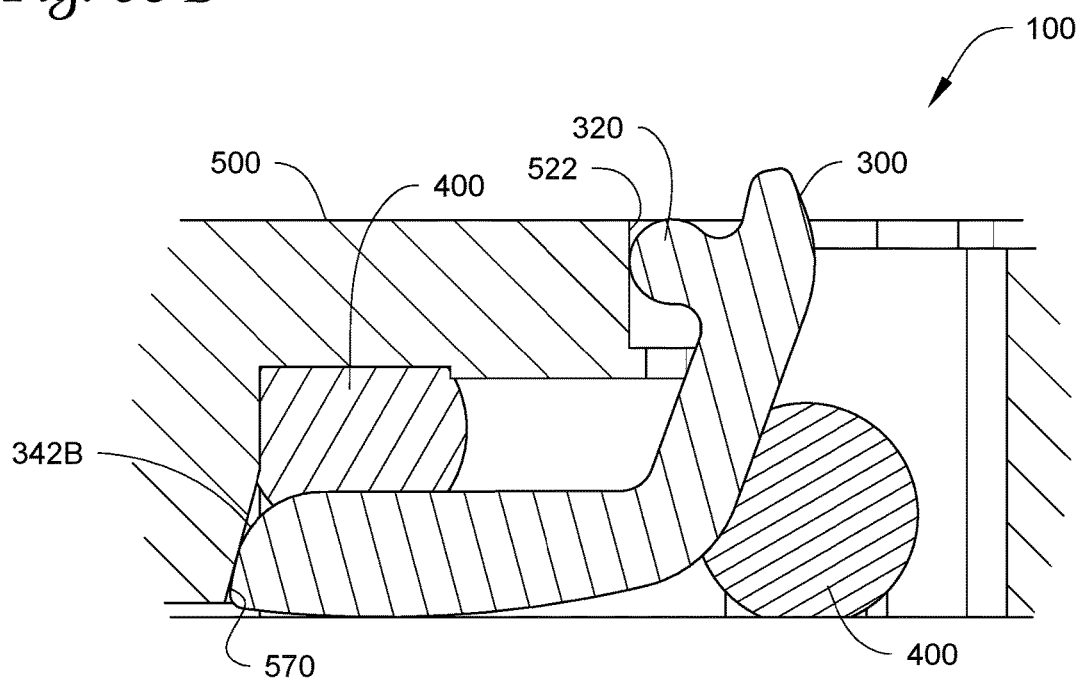
Figure 35C:
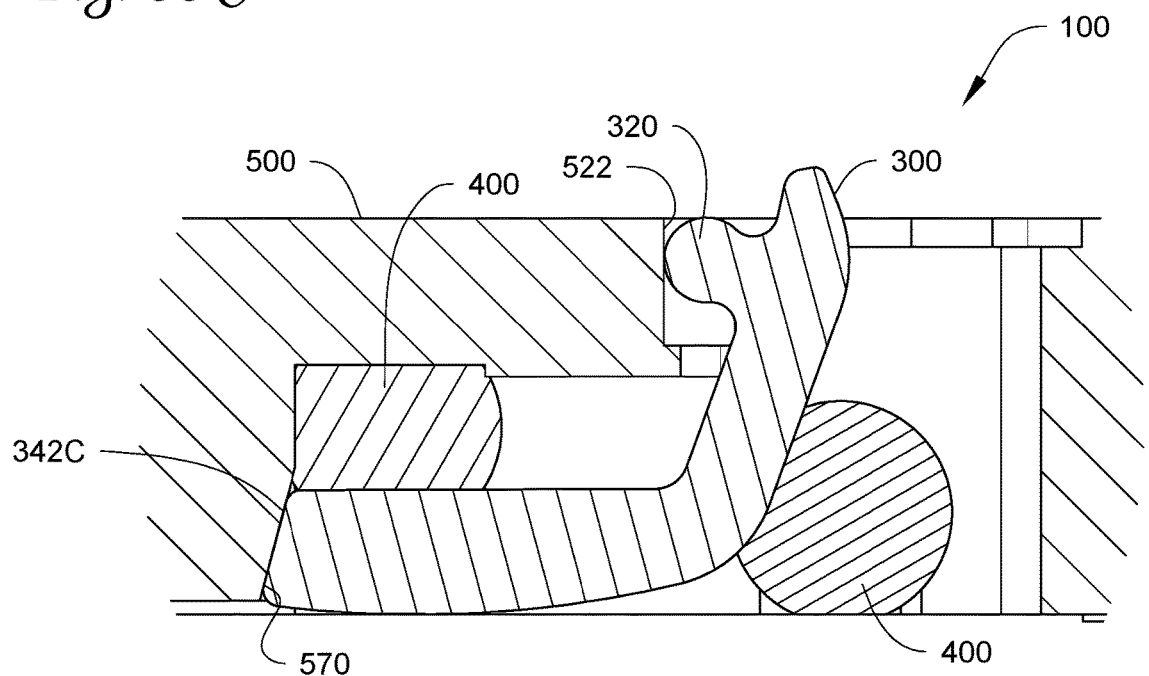
Figure 35D:
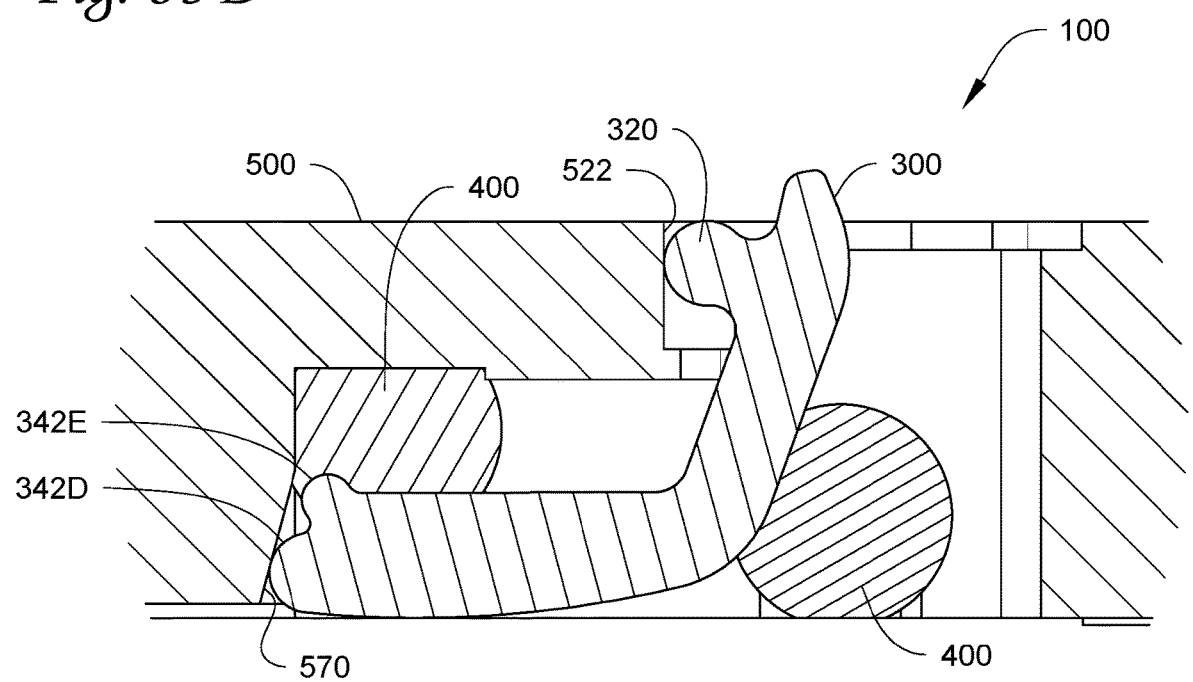
Figure 35E:
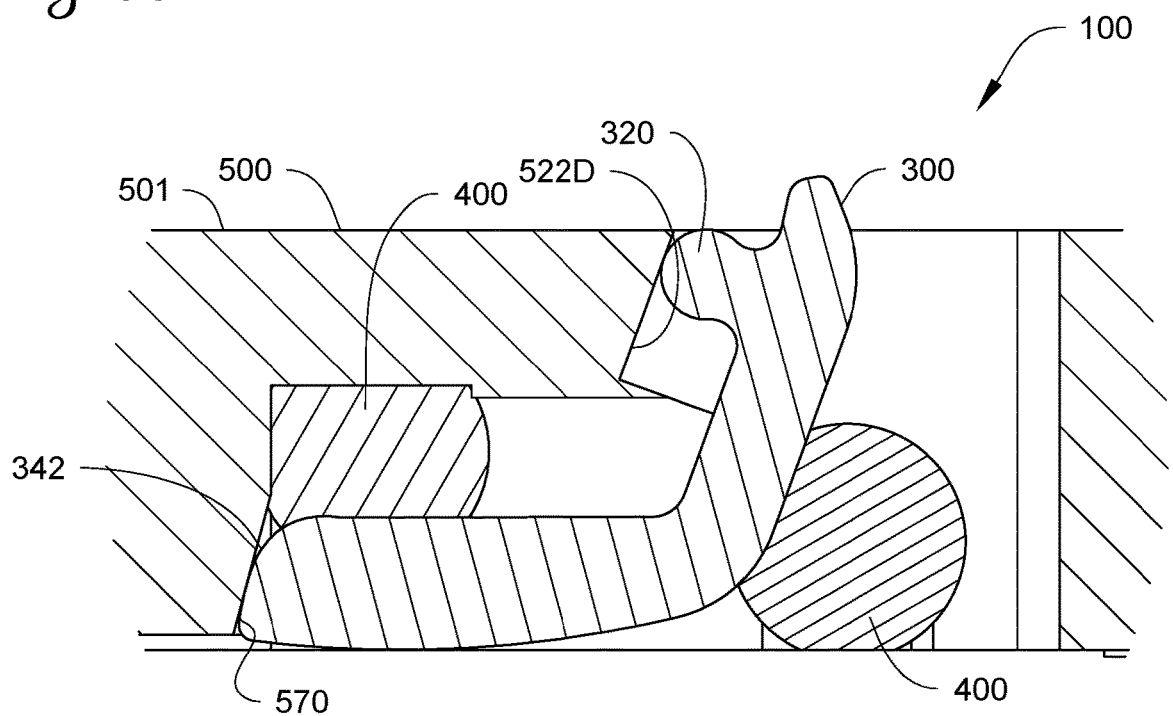
Figure 35F:
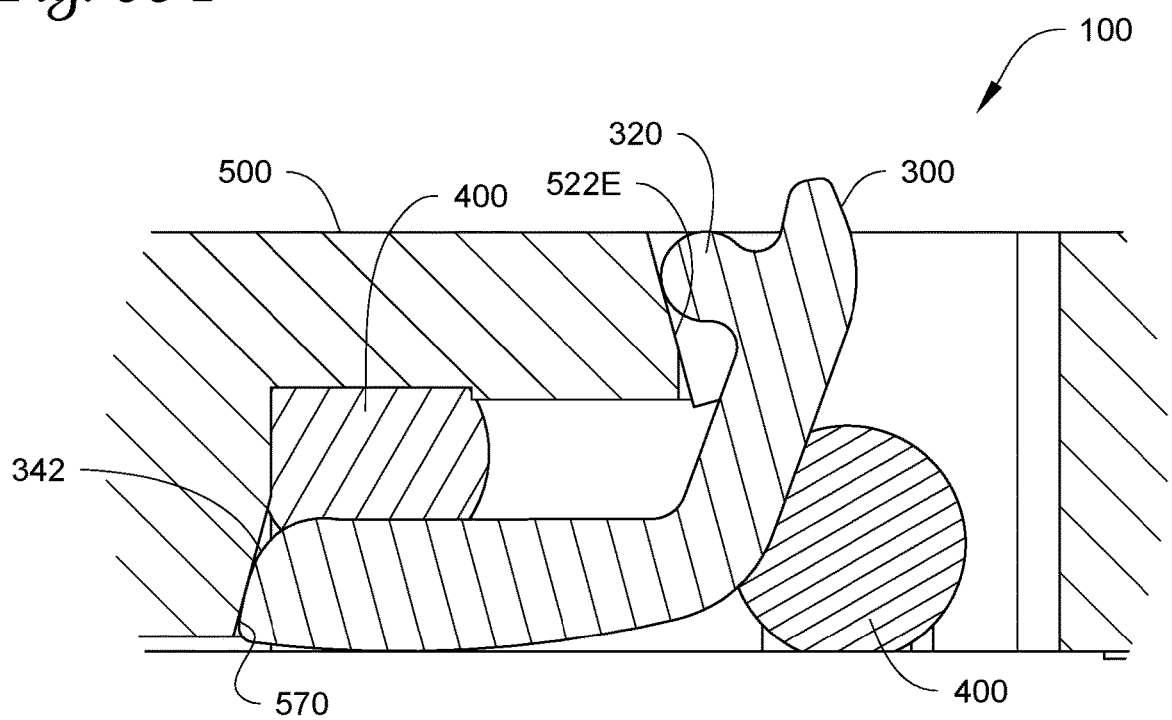
Figure 35G:
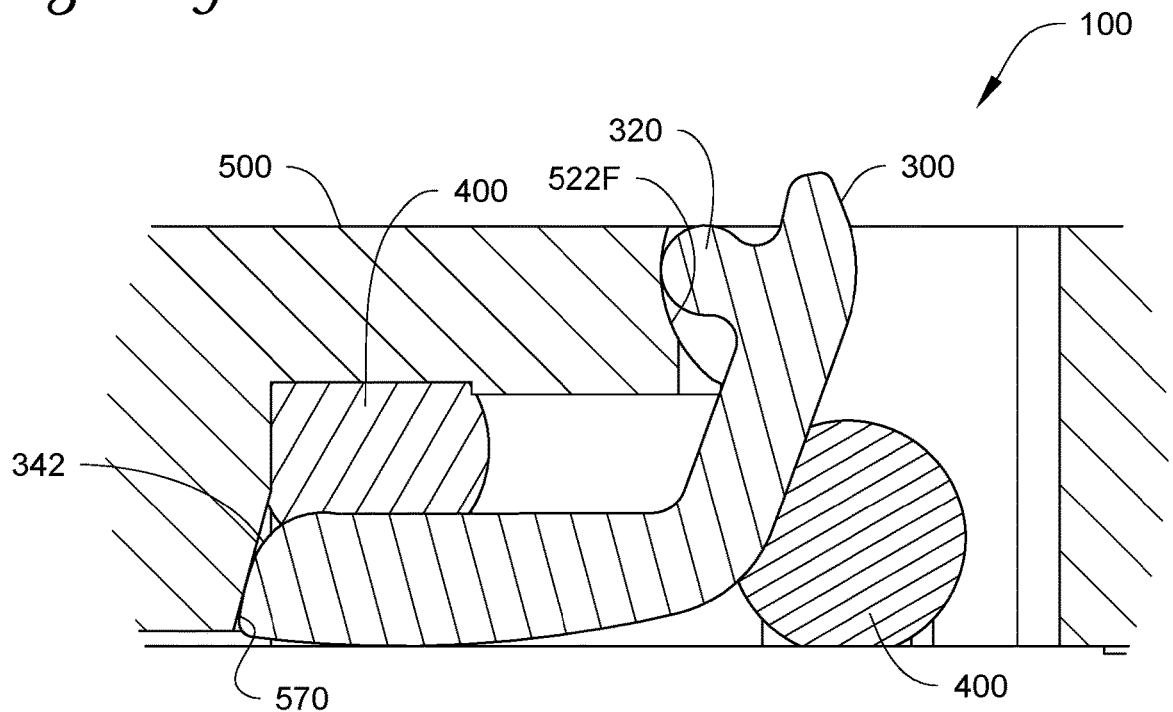
Figure 35H:
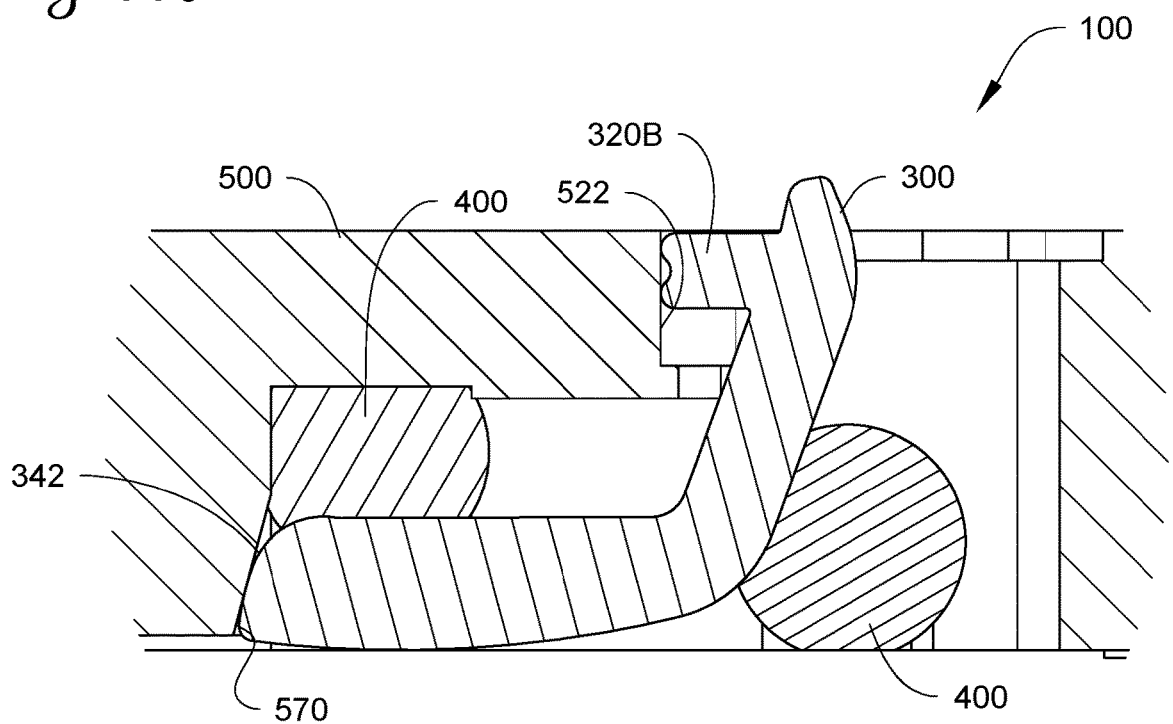
Figure 35I:
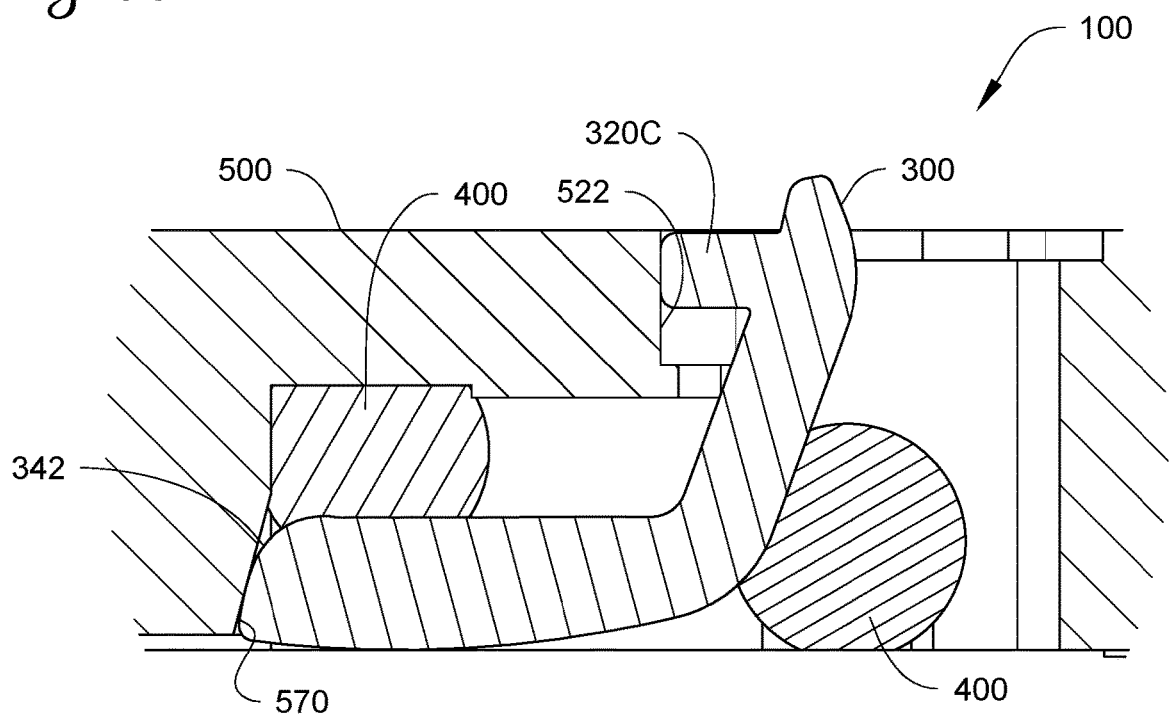
Figure 35J:
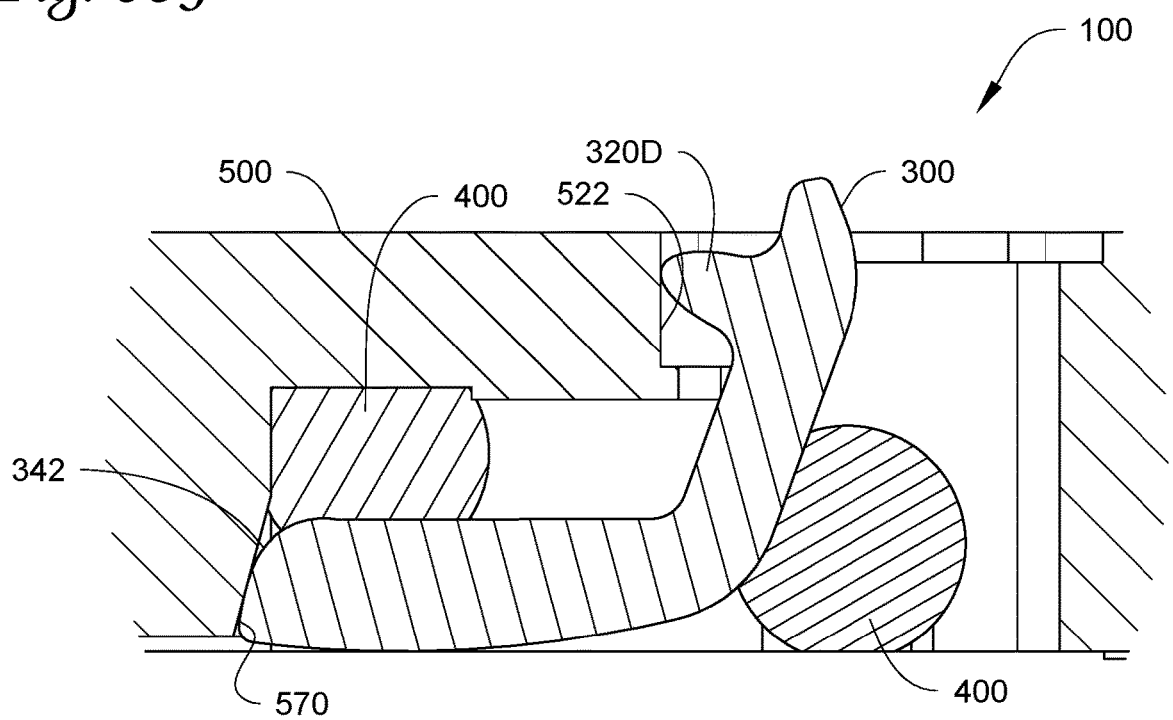
Figure 35K:
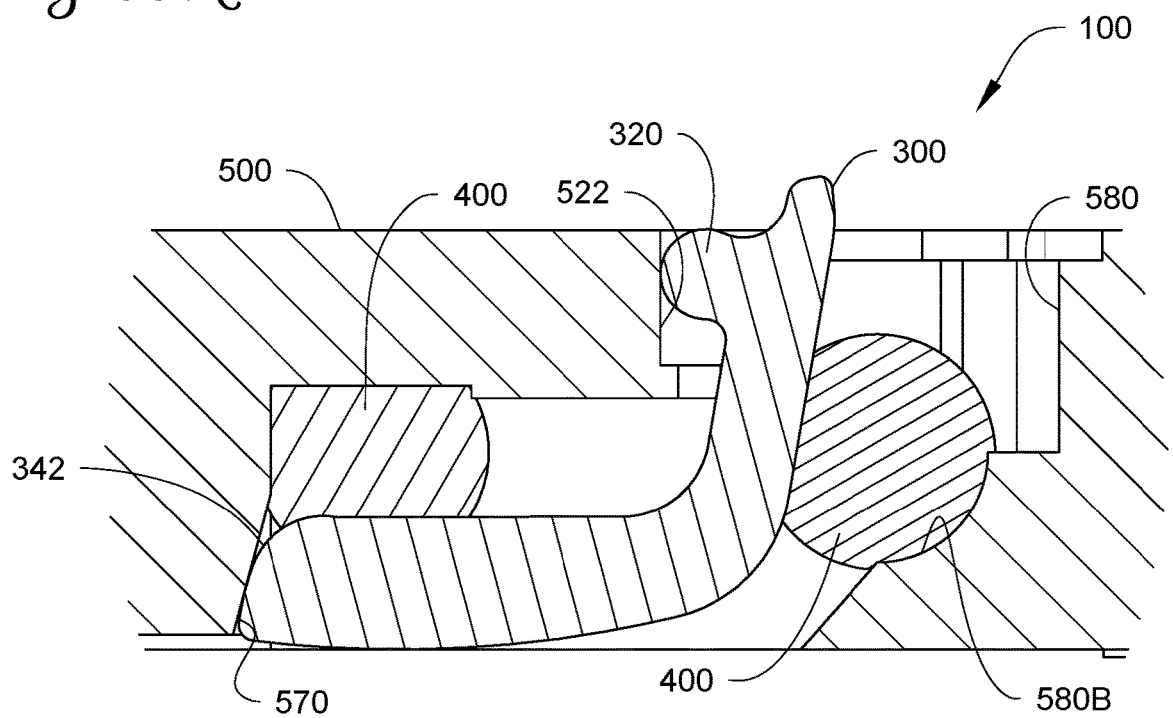
Figure 35L:
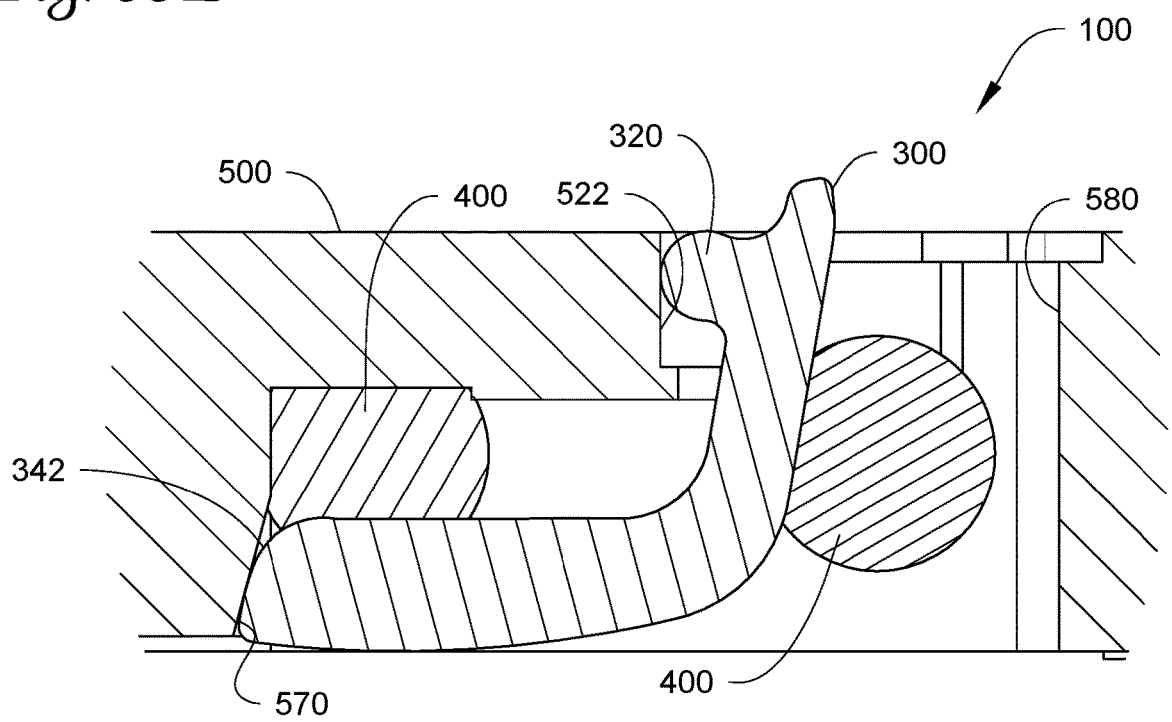
Figure 35M:
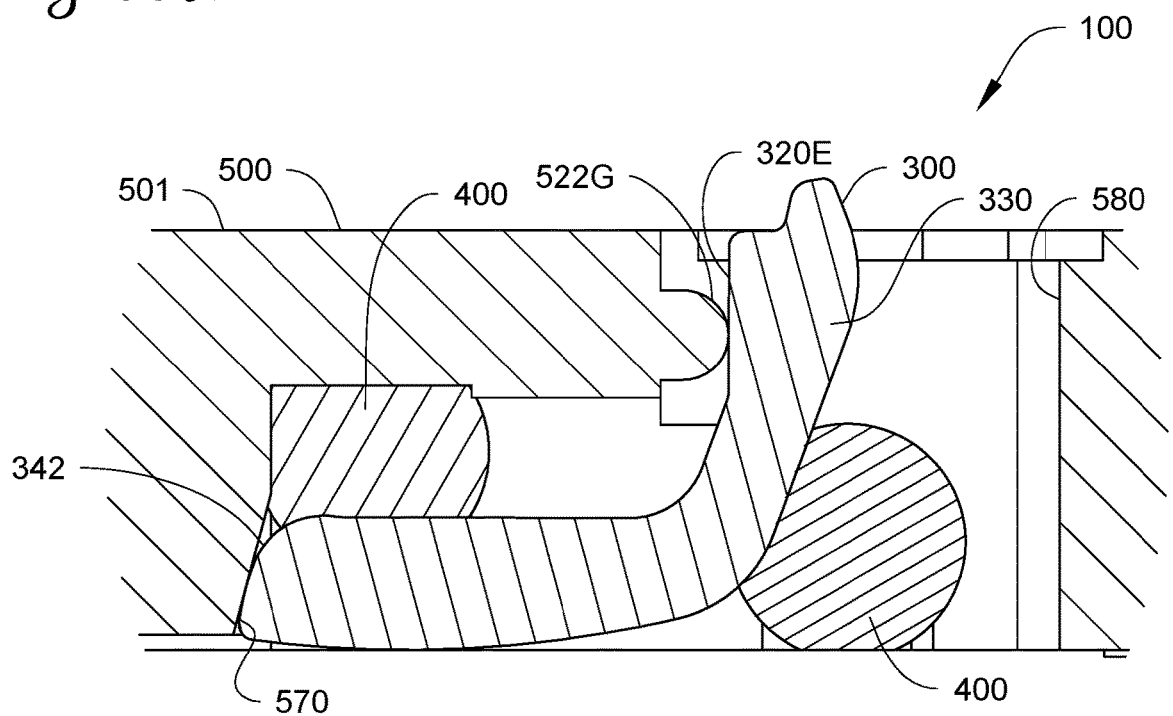
Figure 35N:
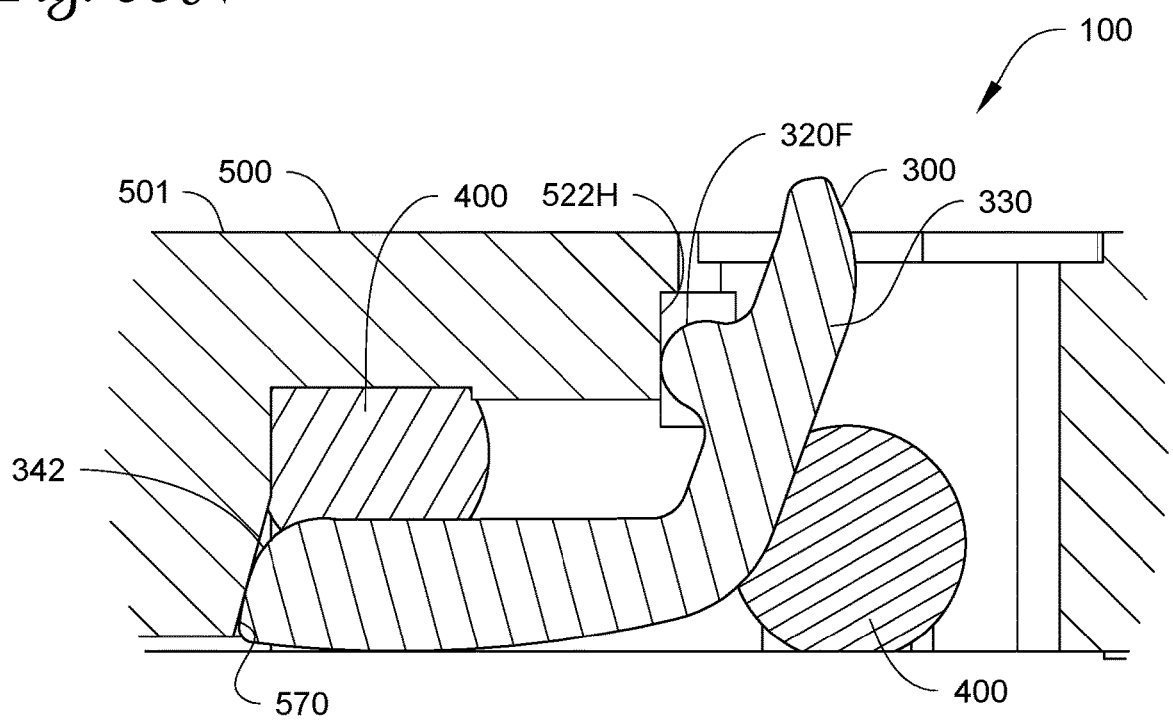
Figure 35O:
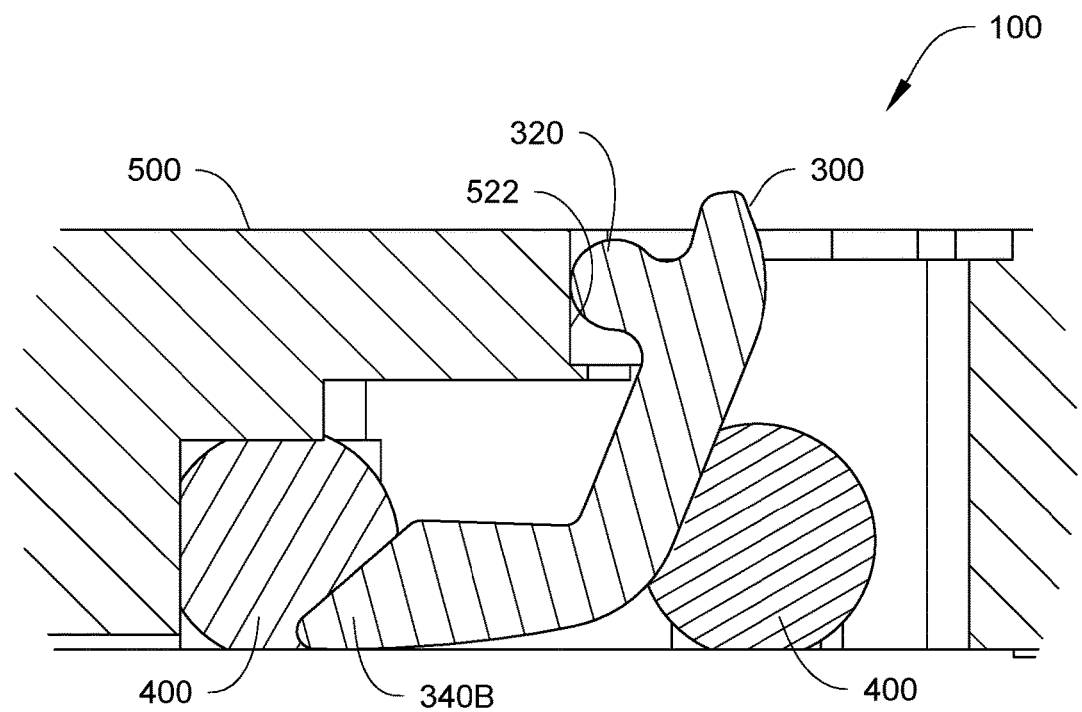
Figure 35P:
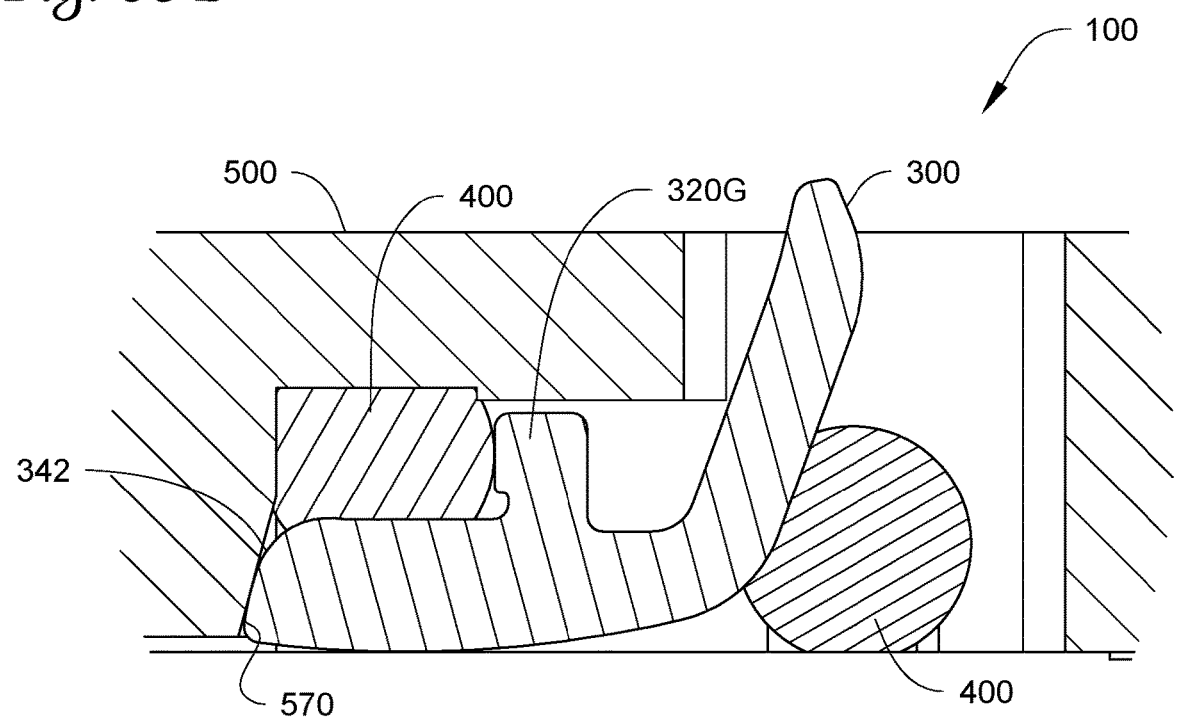
Figure 35Q:
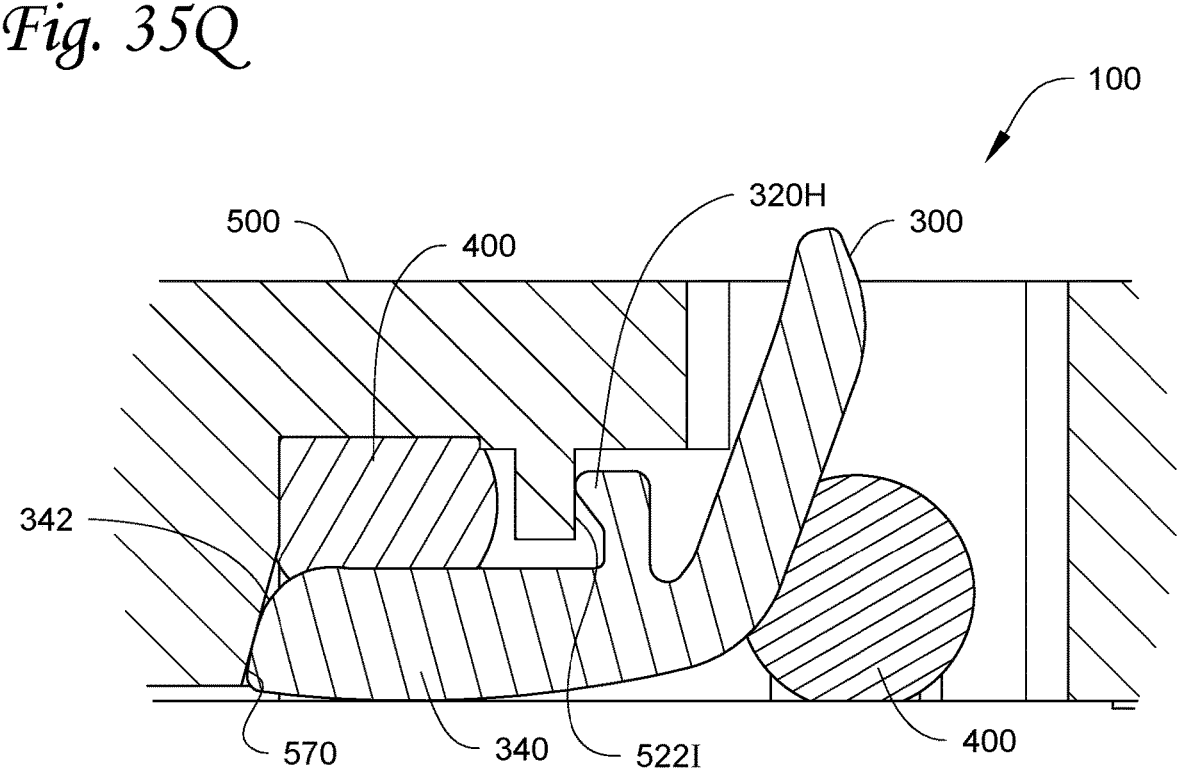

FIGS. 35A-35Q are cross sectional views of a test system 100 having a contact assembly in a preload state, according to some embodiments. It will be appreciated that FIGS. 35A-35Q show a middle plane cross section of the contact slot (see e.g., 510 of FIGS. 19-22) with a contact (see e.g., 300 of FIGS. 10-12) being received in the contact slot and the first and second elastomers 400 being received in the respective first and second elastomer slots (see e.g., 550 and 560 of FIGS. 19-22). It will be appreciated that in FIGS. 35A-35Q, for illustrative purpose only, the first and second elastomers 400 are shown in a nominal free state without deformation under load.

It will be appreciated that in an embodiment, when the contactor (see e.g., 120 of FIG. 1B) is attached to the test system (e.g., to the DUT 110 and the load board 130 of FIG. 1B), the DUT can be placed or disposed at the tip 310 side of the contact 300 while the load board can be placed or disposed at the side (e.g., the tail 340 side) opposite to the tip 310 side of the contact 300. In another embodiment, the load board can be placed or disposed at the tip 310 side of the contact 300 while the DUT can be placed or disposed at the side (e.g., the tail 340 side) opposite to the tip 310 side of the contact 300. That is, the position of the DUT and the position of the load board of the test system are interchangeable.

As shown in FIG. 35A, the contact 300 includes a tail 340. The tail 340 can have a tail radius (curvature) 342A. In an embodiment, the tail radius 342A can be a constant radius. The tail radius 342A can be configured to engage with the tail stop 570 (of the housing 500) to retain the contact 300 in place.

As shown in FIG. 35B, the tail 340 can have a tail radius 342B. In an embodiment, the tail radius 342B can be a variable radius or a curvature which has different radii along its surface. For example, the tail radius 342B can have a tight radius followed by a larger radius. It can be a continuous change in radium or a discontinuous change of several distinct radii. The tail radius 342B can be configured to engage with the tail stop 570 to retain the contact 300 in place.

As shown in FIG. 35C, the tail 340 can have an end 342C. In an embodiment, the tail end 342C can be a flat end. The tail end 342C can be configured to engage with the tail stop 570 to retain the contact 300 in place.

As shown in FIG. 35D, the tail 340 can include an end having a bump or hump 342D and a bump or hump 342E. It may also have bumps of different radii. In an embodiment, the bump 342D can be configured to engage with the tail stop 570 to retain the contact 300 in place. The bump 342D can be configured to be spaced apart from the tail stop 570. Bump 342D can extend beyond bump 342E so that bump 342D engages wall 570 and bump 342E engages later (or never) or engages only elastomer 400, thereby providing increased resistance to contact sliding or lateral translation.

As shown in FIG. 35E, instead of having a vertical or substantially vertical housing backstop (see e.g., FIGS. 20-22), the housing 500 can have an angled-in housing backstop 522D. This effectively provides a second or alternative backstop which can be angled to achieve certain performance objectives. That is, the housing backstop 522D extends from the top surface 501, and the housing backstop 522D and the top surface 501 form an acute angle. The contact 300 can be retained by the front/first elastomer 400 (right elastomer) pushing the contact backstop 320 against the housing backstop 522D, and/or pushing the tail 340 against the tail stop 570. The front/first elastomer 400 (right elastomer) can bias the contact backstop 320 against the housing backstop 522D. It will be appreciated that wipe can start moving to rear as the housing gap increases, which may lead to a longer wipe. Optimization can be performed to reduce the overall position error relative to a horizontal stop.

As shown in FIG. 35F, instead of having a vertical or substantially vertical housing backstop (see e.g., FIGS. 20-22), the housing 500 can have an angled-out (i.e., opposite angular inclination relative to FIG. 35E) housing backstop 522E. That is, the housing backstop 522E extends from the top surface 501, and the housing backstop 522E and the top surface 501 form an obtuse angle. The contact 300 can be retained by the front/first elastomer 400 (right elastomer) pushing the contact backstop 320 against the housing backstop 522E, and/or pushing the tail 340 against the tail stop 570. The front/first elastomer 400 (right elastomer) can bias the contact backstop 320 against the housing backstop 522E. It will be appreciated that wipe can start moving to front as the housing gap increases, which may lead to a shorter wipe.

As shown in FIG. 35G, instead of having a vertical or substantially vertical housing backstop (see e.g., FIGS. 20-22), the housing 500 can have a curved/arcuate housing backstop 522F extending from the top surface 501. The contact 300 can be retained by the front/first elastomer 400 (right elastomer) pushing the contact backstop 320 against the housing backstop 522F, and/or pushing the tail 340 against the tail stop 570. The front/first elastomer 400 (right elastomer) can bias the contact backstop 320 against the housing backstop 522F. The curvature of housing backstop 522F provides a smooth translation of projection 320 therealong. Curvature of the housing backstop 522F may be an arc of single radius or a varying radius (not shown). It will be appreciated that regardless of the housing gap or contact backstop 320 tolerance error, the height error in the interface location (between the contact backstop 320 and the housing backstop 522F) can make the wipe shorter. That is, for a substantially flat vertical housing backstop, regardless of the contact 300 being at a higher or lower location on the substantially flat vertical housing backstop, the position may not change (i.e., height error may not impact the wipe). For a curved or concave housing backstop 522F, if there is any height error, the height error in the interface location (between the contact backstop 320 and the housing backstop 522F) can make the wipe shorter.

As shown in FIG. 35H, instead of having a contact backstop with a curved end and/or a radius that interacts with the housing backstop 522 at a single point (see e.g., FIGS. 20-22), the contact 300 can have a contact backstop 320B that includes two or more bumps or humps. The contact backstop 320B can interact with the housing backstop 522 at double (or more) points, i.e., have multiple spaced apart protrusions which contact backstop 522. It will be appreciated that the contact backstop 320B can change line and/or point contact on the contact component, may wear in divot in one location and shift wear to other location, and/or that drawing tolerances may allow either bump to contact and require more space vertically when housing gap occurs.

As shown in FIG. 35I, instead of having a contact backstop with a curved end and/or a radius that interacts with the housing backstop 522 at a single point (see e.g., FIGS. 20-22), the contact 300 can have a contact backstop 320C that has a flat/blunt preferably with rounded corners and/or straight end. The contact backstop 320C can interact with the housing backstop 522 at the flat end. It will be appreciated that the contact backstop 320C can change the line and/or point contact on the contact component, may wear in divot in one location and shift wear to other location, and/or that drawing tolerances may require more space vertically when housing gap occurs.

As shown in FIG. 35J, instead of having a contact backstop with a constant radius that interacts with the housing backstop 522 (see e.g., FIGS. 20-22), the contact 300 can have a contact backstop 320D that has variable radius. The contact backstop 320D can interact with the housing backstop 522. The curved protrusion 320D preferably engaged the recess backstop 522 toward the top end thereof, i.e., above a centerline, to allow room for downward deflection.

As shown in FIG. 35K, instead of having a contact slot front (see 580 in FIGS. 19-22) extending from the top surface to the bottom surface of the housing 500, the housing 500 includes a support 580B. See also 580A in FIG. 28. The support 580B can be configured to support the front (right) portion of the front elastomer 400. In an embodiment, the support 580B can include a flat plane (extending to the contact slot front 580) mostly horizontal to the front of the front elastomer 400. The support 580B can also include a curved and/or radius middle portion that extends from the flat plane and/or that substantially matches the shape of the front elastomer 400 to support the front elastomer 400. The support 580B can further include a sloped lower potion extending from the curved middle portion to the bottom surface of the housing 500. In such embodiment, the housing 500 can provide a front radius slot (the front elastomer in compression) for the bias element (the front elastomer), which can be supported in the slot and/or by the partition.

As shown in FIG. 35L, instead of having the support 580B of FIG. 35K, there can be no support or no housing material under the front elastomer 400. In such embodiment, the housing 500 can provide a front radius slot (the front elastomer in shear) for the bias element (the front elastomer), which can be supported by walls and/or partitions of the housing 500 between the contacts 300.

As shown in FIG. 35M, instead of having a vertical or substantially vertical housing backstop (see e.g., 522 in FIGS. 19-22) and a protruded (substantially in the length direction and slightly in the height direction, see e.g., 320 in FIGS. 20-22) contact backstop, the housing 500 can have a housing backstop 522G, and the contact 300 can have a flat surface 320E on the body 330 of the contact 300. The housing backstop 522G can be configured to protrude towards the contact slot front 580. In an embodiment, the protrusion of the housing backstop 522G can be curved and/or have a radius, and can be spaced apart from the top surface 501 in the height/vertical direction. The flat (or other disclosed shaped) vertical surface 320E can serve as the contact backstop. The front/first elastomer 400 (right elastomer) can bias the contact backstop 320E against the housing backstop 522G and the contact backstop 320E can interact with the housing backstop 522G at the contact point or portion. Note that this protrusion reversal can be applied to the other embodiments in FIGS. 35A-35L.

As shown in FIG. 35N, instead of having a vertical or substantially vertical housing backstop (see e.g., 522 in FIGS. 19-22) extending from the top surface 501, the housing 500 can have a vertical or substantially vertical housing backstop 522H that is spaced apart from the top surface 501. That is, the housing backstop 522H notch is at or around or close to a middle of housing height, which can leave the housing intact at the upper surface so that bending stress or the like may be stronger. In such embodiment, the contact backstop 320F of the contact 300 can be disposed at or around or close to a middle of the height of the body 330, instead of being disposed at or around or close to the tip of the contact 300 (see e.g., 320 of FIGS. 20-22).

As shown in FIG. 35O, instead of having a hard housing tail stop (see e.g., 570 of FIGS. 20-22) and a tail (see e.g., 340 of FIGS. 20-22) configured to engage with the housing tail stop to retain the contact 300 in place, the contact 300 can have a tail 340B. The tail 340B can be configured to engage with the rear/back/second elastomer 400 (left elastomer) to retain the contact 300 in place. That is, the rear elastomer 400 serves as the tail stop.

As shown in FIG. 35P, instead of having a hard vertical or substantially vertical housing backstop (see e.g., 522 in FIGS. 19-22) and a protruded (from the contact body 330, see e.g., 320 in FIGS. 20-22) contact backstop, the contact 300 can have a contact backstop 320G. The contact backstop 320G can protrude (e.g., upwards in the height direction towards the top surface 501 and/or then horizontally in the length direction away from the contact slot front 580) from (e.g., at or around a middle of) the contact tail 340. In an embodiment, the contact backstop 320G can have a flat vertical surface. In another embodiment, the contact backstop 320G can have a curved or radius end. The rear elastomer 400 serves as a backstop to interact with the contact backstop 320G. This protrusion 320G is shown extending orthogonally from the horizontal/lateral portion of contact 300 and is located in contact with elastomer 400, so that elastomer 400 is contained between the housing wall (unnumbered) and protrusion 320G.

As shown in FIG. 35Q, instead of having a vertical or substantially vertical housing backstop (see e.g., 522 in FIGS. 19-22) extending from the top surface 501, and a protruded (from the contact body 330, see e.g., 320 in FIGS. 20-22) contact backstop, the housing 500 can have a housing backstop 522I. The contact 300 can have a contact backstop 320H. The contact backstop 320H can protrude (e.g., upwards in the height direction towards the top surface 501 and/or then horizontally in the length direction away from the contact slot front 580) from the contact tail 340 (e.g., at or around a location close to the contact body 330). In an embodiment, the contact backstop 320H can have a curved or radius end (see e.g., 320 of FIGS. 20-22). It also preferably protrudes lateral/orthogonally from the vertical portion of the protrusion. Backstop 522I is preferably spaced from elastomer 400, except perhaps when that elastomer is compressed. In other embodiments, the contact backstop 320H can have an end with any other suitable shape/structure (e.g., see the variances of the contact backstops described herein). The housing backstop 522I can protrude (e.g., from the partition of the slots at or around the middle of the housing) towards the bottom surface in the height direction. The bottom end of the housing backstop 522I is disposed above the contact tail 340. The housing backstop 522I can have a flat vertical surface facing the contact backstop 320H, or any other suitable shape/structure (e.g., see other housing backstop as described herein). The housing backstop 522I can interact with the contact backstop 320H.

Figure 36A:
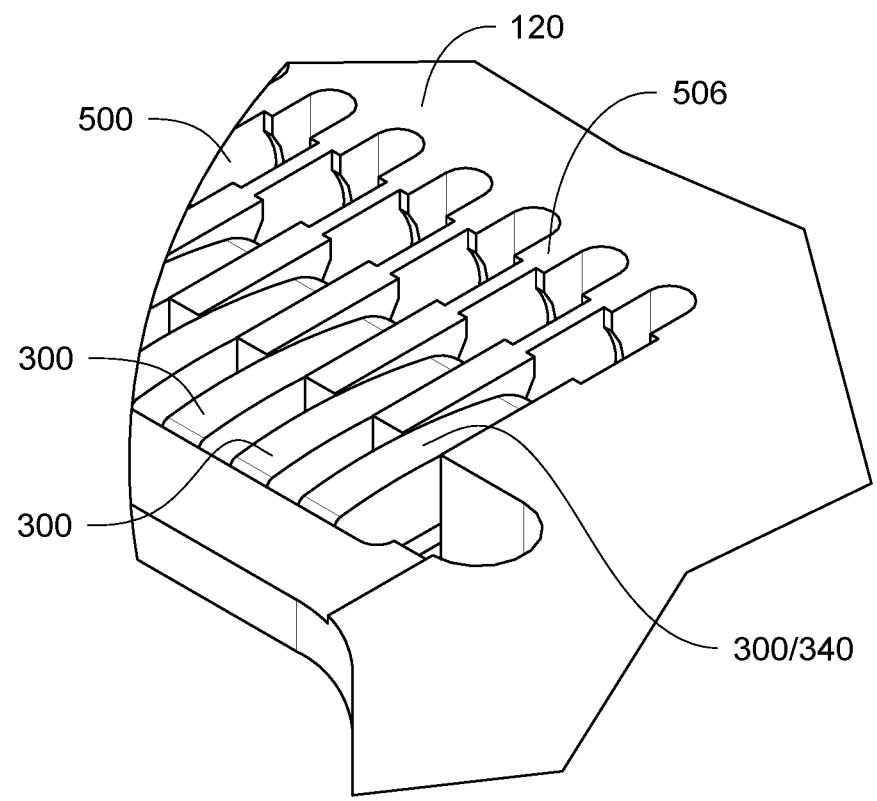
FIG. 36A is a perspective bottom view of a portion of a contactor without the elastomers being received in the slots, according to an embodiment.
Figure 36B:
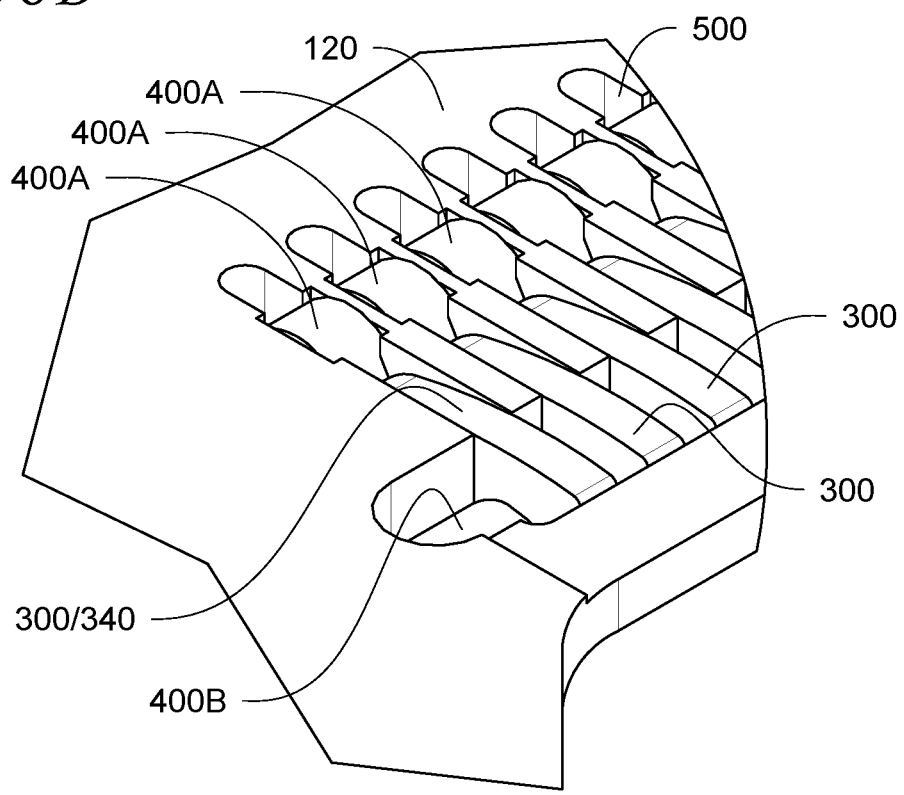
FIG. 36B is a perspective bottom view of a portion of a contactor with the elastomers being received in the slots, according to an embodiment.

FIG. 36A is a perspective bottom view of a portion of a contactor 120 without the elastomers being received in the slots, according to an embodiment. FIG. 36B is a perspective bottom view of a portion of the contactor 120 with the elastomers 400A being received in the slots, according to an embodiment.

As shown in FIGS. 36A and 36B, instead of having two elastomers shared by a group of contactor assemblies (see e.g., 400 of FIG. 9), the contactor 120 can include individualized biasing elements (elastomers 400A, 400B) disposed in respective individual slots (segmented slots). In an embodiment, the individual slots can be separated by, e.g., partitions 506 of the housing 500. That is, each slot is configured to accommodate a pair of individualized elastomers (400A, 400B) and a corresponding contact 300. The pair of individualized elastomers (400A, 400B) in one slot is separated from the pair of individualized elastomers (400A, 400B) in the neighboring slot by the partition 506. Such embodiment can reduce cross-talk of the individualized elastomers (400A, 400B) with those in the neighboring slots.

It will be appreciated that in some examples, the housing 500 or housing slots 500 can be designed as multiple elements (including e.g., insert(s), or the like). In other examples, the housing 500 or housing slots 500 can be designed as one element (e.g., an integral housing 500 or the like). That is, the housing can be an integral unitary element, or can be multi-component assembly that includes separate elements (e.g., insert(s) or the like).

It will be appreciated that the above embodiments are merely illustrative of the technical concept and features of the apparatus, and these embodiments are to provide a person skilled in the art with an understanding of the contents of the apparatus in order to implement the apparatus without limiting the scope of protection of the apparatus. Any features described in one embodiment may be combined with or incorporated/used into the other embodiment, and vice versa. The equivalent change or modification according to the substance of the apparatus should be covered by the scope of protection of the apparatus.

The description of the invention and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

Aspects

It is noted that any one of aspects below can be combined with each other.

Aspect 1. A contactor assembly for a testing system for testing integrated circuit devices, comprising:
  a contact having a tip, a body, a tail having a tail radius, and a contact backstop; and
  a housing having a contact slot,
  wherein the contact is receivable in the contact slot,
  the contact is configured to be in a free state, a preload state, and an actuated state,
  the contact slot includes a tail stop,
  the contact backstop protrudes from the contact body,
  when the contact is in the preload state, the contact backstop extends in a length direction of the housing generally perpendicular to the height direction and is biased against a backstop.

Aspect 2. The contactor assembly according to aspect 1, wherein the housing includes a first elastomer slot and a second elastomer slot,
  the first elastomer slot and the second elastomer slot extend in a thickness direction of the housing.

Aspect 3. The contactor assembly according to aspect 2, further comprising:
  a first elastomer extending through the first elastomer slot in the thickness direction; and
  a second elastomer extends through the second elastomer slot in the thickness direction.

Aspect 4. The contactor assembly according to aspect 3, wherein the first elastomer and the second elastomer are essentially cylindrically shaped.

Aspect 5. The contactor assembly according to aspect 3 or aspect 4, wherein at least one of the first elastomer and the second elastomer is configured to bias the contact.

Aspect 6. The contactor assembly according to any one of aspects 3-5, wherein the contact slot further includes an elastomer relief disposed between the second elastomer slot and a backstop slot of the contact slot, the elastomer relief is adjacent to the second elastomer slot.

Aspect 7. The contactor assembly according to any one of aspects 3-6, wherein the contact slot further includes a middle relief disposed between the second elastomer slot and a backstop slot of the contact slot, the middle relief extends from the backstop slot towards the second elastomer slot.

Aspect 8. The contactor assembly according to any one of aspects 3-7, wherein the contact slot further includes a contact slot front adjacent to the first elastomer slot.

Aspect 9. The contactor assembly according to any one of aspects 1-8, wherein when the contact is in the preload state, the tail radius of the contact is biased against the tail stop of the housing.

Aspect 10. The contactor assembly according to any one of aspects 1-9, wherein the contact is conductive.

Aspect 11. The contactor assembly according to any one of aspects 1-10, wherein the contact slot has an obround shape in a top view.

Aspect 12. The contactor assembly according to any one of aspects 1-11, wherein the tip of the contact includes a tip radius, and a thickness of the tip of the contact is smaller than other portions of the contact.

Aspect 13. A testing system for testing integrated circuit devices, comprising:
  a device under test having at least one terminal;
  a load board having at least one terminal; and
  a contactor assembly,
  wherein the contactor assembly comprises:
    a contact having a tip, a body, a tail having a tail radius, and a contact backstop; and
    a housing having a contact slot,
    wherein the contact is receivable in the contact slot,
    the contact is configured to be in a free state, a preload state, and an actuated state,
    the contact slot includes a tail stop,
    the contact backstop protrudes from the contact body,
    when the contact is in the preload state, the contact backstop extends in a length direction of the housing generally perpendicular to the height direction and is biased against a backstop,
  wherein the at least one terminal of the device under test is configured to engage with the tip of the contact during testing,
  the at least one terminal of the load board is configured to engage with the tail of the contact during testing.

Aspect 14. The testing system according to aspect 13, wherein when the contact is in the free state, the tail of the contact is biased out of the contact slot, and the contact is not engaged with the device under test or the load board.

Aspect 15. The testing system according to aspect 14, wherein when the contact is in the free state, the tail radius of the contact is biased against the tail stop of the housing and/or the contact backstop is biased against the backstop.

Aspect 16. The testing system according to any one of aspects 13-15, wherein when the contact is in the preload state, the contactor assembly is installed on the load board.

Aspect 17. The testing system according to aspect 16, wherein when the contact is in the preload state, the tail radius of the contact is biased against the tail stop of the housing.

Aspect 18. The testing system according to any one of aspects 13-17, wherein when the contact is in the actuated state, the contactor assembly is installed on the load board, the contact is compressed by the device under test, and the contact backstop is not engaged with the backstop.

Aspect 19. The testing system according to aspect 18, wherein when the contact is in the actuated state, the tail radius of the contact is biased against the tail stop of the housing.

Aspect 20. A method of retaining a contact of a contactor assembly in a testing system for testing integrated circuit devices, in a housing of the contactor assembly wherein the contact includes a tip, a body, a tail having a tail radius, and a contact backstop; the housing has a contact slot; wherein the contact is receivable in the contact slot; the contact is configured to be in a free state, a preload state, and an actuated state; the contact slot includes a tail stop; the contact backstop protrudes from the contact body; when the contact is in the preload state, the contact backstop extends in a length direction of the housing generally perpendicular to the height direction and is biased against a backstop, the method comprising:
  forming the contact with the contact backstop and the housing;
  configuring the contact to be received in the contact slot;
  engaging the tail radius of the contact with the tail stop of the housing and/or engaging the contact backstop with the backstop; and
  retaining the contact in place when the contact is in the free state, the preload state, and/or the actuated state.

Aspect 21. Apparatus for electrically connecting a lead of an integrated circuit to be tested to a corresponding terminal of a load board at a test site, comprising:
  a housing having oppositely facing surfaces,
  a first surface approachable by the integrated circuit to be tested and a second surface proximate the load board,
  a slot extending through said housing from a first of said oppositely facing surfaces to a second of said oppositely facing surfaces; said housing further including an up-stop recess;
  a contact receivable in said slot;
    said contact having a body with
      a first end engagable by the lead and a second end in engagement with the terminal and an up-stop control spur extending generally laterally away from the body between said first and second ends and configured to be movably received within said up-stop recess in said housing;
  a first end of said contact being slideable across the terminal between
    a first orientation unengaged by the lead of the integrated circuit and a second orientation in which said first end of said contact is engaged by the lead of the integrated circuit and urged into said slot; and a bias element urging said contact to said first orientation, wherein as said contact is rolled between said first and said second orientations thereof, sliding motion of said second end of said contact across the terminal is substantially eliminated.

Aspect 22. The apparatus of aspect 1, wherein said housing has an elastomeric bias element space to receive an elastomer bias element, and
  wherein said housing includes a relief space adjacent said bias element for receiving a portion of the bias element.

Aspect 23. A contact for use within an integrated circuit test housing for testing an integrated circuit device under test (DUT) by connecting the DUT to a load board via the housing, the housing having a slot for the contact to slide therein and an up-stop recess, the contact comprising:
  a body with
    a first end engagable by the DUT;
    a second end in engagement with the load board; and
  an up-stop control spur extending generally laterally away from the body between said first and second ends and configured to be movably received within said up-stop recess in said housing thereby limiting the upward movement of said first end of the contact while not obstructing the downward movement of said contact when engaging said DUT.

Aspect 24. The contact of aspect 23, wherein the contact includes:
  a. a radiused tip at said first end;
  b. a radiused tail at said second end;
  c. said spur extending radially away from said body and having a radiused distal end;
  d. said body, adjacent said first end, having recess for engaging a front elastomer;
  e. said body, adjacent said second end, having a radiused curvature to allow rocking of said contact on the load board.

Aspect 25. A contact for use within an integrated circuit test housing for testing an integrated circuit device under test (DUT) by connecting the DUT to a load board via the housing, the housing having a slot for the contact to slide therein and an up-stop recess having a contact surface, the contact comprising:
  a body with
    a first end engagable by the DUT; and
    a second end in engagement with the load board, and
  an up-stop control spur extending generally laterally away from the body adjacent said first end and configured to be movably received within said up-stop recess and engaging an up-stop contact surface in said housing thereby limiting the upward movement of said first end of said contact before engagement with the DUT, while not obstructing the downward movement of said contact when engaging said DUT.

Aspect 26. A method of controlling the movement of a contact movably residing in a housing with a contact slot, the housing having an upper surface to engage a device under test (DUT) and a lower surface to engage a load board, the housing having a slot for said contact and said slot including a lateral recess adjacent to and in communication with said slot, the method comprising:
  a. forming the contact with a body, upper and lower ends, said upper end configured to extend at least partly out of said housing to engage the DUT; said lower end configured to engage said load board;
  b. forming a lateral spur on said contact distant from said upper and lower ends,
  c. configuring said spur to engage said lateral recess of said housing when in a first position before engagement with said DUT, said engagement between said recess and spur forming an up-stop for the contact; configuring said spur to disengage at least part of said lateral recess when said contact pin engages said DUT.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A contactor assembly for a testing system for testing integrated circuit devices, comprising:
   a contact; and
   a housing having a contact slot,
   wherein the contact is receivable in the contact slot,
   the contact includes a tip, a contact backstop protruding from a body, and a tail; the contact is configured to rotate; and the contact is configured to be in a free state, a preload state, and an actuated state,
   the contact backstop includes a curved tip portion and a contact backstop body,
   the housing includes a housing backstop extending in a substantially vertical direction,
   when the contact is in the preload state, the curved tip portion of the contact backstop of the contact is biased against the housing backstop.

2. The contactor assembly according to claim 1, wherein when the contact is in the preload state, the contact backstop extends in a substantially horizontal direction.

3. The contactor assembly according to claim 1, wherein the housing further includes a first biasing element slot and a second biasing element slot,
   the first biasing element slot and the second biasing element slot extend in a thickness direction of the housing.

4. The contactor assembly according to claim 3, further comprising:
   a first biasing element extending through the first biasing element slot in the thickness direction; and
   a second biasing element extends through the second biasing element slot in the thickness direction.

5. The contactor assembly according to claim 4, wherein at least one of the first biasing element and the second biasing element is configured to bias the contact against the housing backstop.

6. The contactor assembly according to claim 4, wherein the contact slot further includes a biasing element relief disposed between the second biasing element slot and a backstop slot of the contact slot, the biasing element relief is adjacent to the second biasing element slot.

7. The contactor assembly according to claim 4, wherein the contact slot further includes a middle relief disposed between the second biasing element slot and a backstop slot of the contact slot, the middle relief extends from the backstop slot towards the second biasing element slot.

8. The contactor assembly according to claim 1, wherein when the contact is in the preload state, the tail of the contact is biased against a tail stop.

9. A testing system for testing integrated circuit devices, comprising:
   a device under test having at least one terminal;
   a load board having at least one terminal; and
   a contactor assembly,
   wherein the contactor assembly comprises:
       a contact; and
       a housing having a contact slot,
       wherein the contact is receivable in the contact slot,
       the contact includes a tip, a contact backstop protruding from a body, and a tail;
   the contact is configured to rotate; and the contact is configured to be in a free state, a preload state, and an actuated state,
       the contact backstop includes a curved tip portion and a contact backstop body,
       the housing includes a housing backstop extending in a substantially vertical direction,
       when the contact is in the preload state, the curved tip portion of the contact backstop of the contact is biased against the housing backstop,
   wherein the at least one terminal of the device under test is configured to engage with a first end of the contact during testing,
   the at least one terminal of the load board is configured to engage with a second end of the contact during testing, the second end being opposite to the first end.

10. The testing system according to claim 9, wherein the housing further includes a first biasing element slot and a second biasing element slot,
    the first biasing element slot and the second biasing element slot extend in a thickness direction of the housing.

11. The testing system according to claim 10, further comprising:
    a first biasing element extending through the first biasing element slot in the thickness direction; and
    a second biasing element extends through the second biasing element slot in the thickness direction.

12. The testing system according to claim 9, wherein when the contact is in the preload state, the contactor assembly is installed on the load board.

13. The testing system according to claim 9, wherein when the contact is in the preload state, the tail of the contact is biased against a tail stop.

14. The testing system according to claim 9, wherein when the contact is in the actuated state, the tail of the contact is biased against a tail stop.

15. The testing system according to claim 9, wherein when the contact is in the actuated state, the contactor assembly is installed on the load board, the contact is compressed by the device under test, and the contact backstop is not engaged with the housing backstop.

16. The contactor assembly according to claim 1, wherein when the contact is in the preload state, the housing backstop is closer to the tip than to the tail.

17. The contactor assembly according to claim 1, wherein the contact backstop is disposed closer to the tip than to the tail.

18. The contactor assembly according to claim 1, further comprising:
   a support configured to prevent the contact backstop from moving below the support.

19. The contactor assembly according to claim 1, wherein a width of the contact at the contact backstop including the curved tip portion and the contact backstop body is greater than a width of the contact at locations other than the contact backstop.

20. The contactor assembly according to claim 1, wherein the housing backstop includes an upper end, a lower end, and a portion between the upper end and the lower end,
   when the contact is in the preload state, the curved tip portion is biased against the housing backstop at a location above the lower end.

\* \* \* \* \*